United States Patent
Sasaki et al.

(10) Patent No.: US 10,349,487 B2
(45) Date of Patent: *Jul. 9, 2019

(54) METHOD FOR CONTROLLING INFORMATION APPARATUS AND COMPUTER-READABLE RECORDING MEDIUM

(71) Applicant: PANASONIC INTELLECTUAL PROPERTY CORPORATION OF AMERICA, Torrance, CA (US)

(72) Inventors: Takamitsu Sasaki, Osaka (JP); Kohei Tahara, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/029,297

(22) Filed: Jul. 6, 2018

(65) Prior Publication Data

US 2018/0317298 A1     Nov. 1, 2018

Related U.S. Application Data

(63) Continuation of application No. 14/943,513, filed as application No. PCT/JP2014/003623 on Jul. 8, 2014, now Pat. No. 10,064,253.

(Continued)

(51) Int. Cl.
*H05B 37/02*     (2006.01)
*G06F 3/0484*     (2013.01)
*G06F 3/0488*     (2013.01)

(52) U.S. Cl.
CPC .......... *H05B 37/02* (2013.01); *G06F 3/0488* (2013.01); *G06F 3/04842* (2013.01); *G06F 3/04847* (2013.01); *H05B 37/0245* (2013.01)

(58) Field of Classification Search
CPC .......... H05B 37/02; H05B 37/0245; H05B 3/04842; H05B 3/04847; H05B 3/94848
(Continued)

(56) References Cited

U.S. PATENT DOCUMENTS 8,579,452 B2    11/2013    Diederiks et al.
2007/0243862 A1*    10/2007    Coskun ............... G06Q 10/10
                                                                    455/418
(Continued)

FOREIGN PATENT DOCUMENTS

CN    1925527    3/2007
CN    101433473    5/2009
(Continued)

OTHER PUBLICATIONS

International Search Report in PCT/JP2014/003623, dated Aug. 12, 2014.
(Continued)

*Primary Examiner* — Douglas W Owens
*Assistant Examiner* — Syed M Kaiser
(74) *Attorney, Agent, or Firm* — Greenblum & Bernstein, P.L.C.

(57) ABSTRACT

A method of controlling information apparatus is provided. Illumination devices are displayed in room units. In response to a selection of a first illumination device in a first room unit, a first room corresponding to the first room unit is displayed with first brightness not lower than second brightness of a background image when the first illumination device is in an on-state. In response to a selection of the first illumination device, the first room is displayed with third brightness lower than the second brightness when the first illumination device is in an off-state. A first control command is output to network for turning off power of the first illumination device, when the first room with the first (Continued)

brightness is selected. A second control command is output to network for turning on power of the first illumination device, when the first room with the third brightness is selected.

10 Claims, 56 Drawing Sheets

Related U.S. Application Data

(60) Provisional application No. 61/955,373, filed on Mar. 19, 2014.

(58) Field of Classification Search
USPC .................. 315/131, 224, 307, 132, 360
See application file for complete search history.

(56) References Cited

U.S. PATENT DOCUMENTS

| | | |
|---|---|---|
| 2008/0316730 A1 | 12/2008 | Diederiks et al. |
| 2009/0131793 A1 | 5/2009 | Stonefield et al. |
| 2010/0083187 A1* | 4/2010 | Miyamoto ............ G06F 3/0482 715/862 |
| 2011/0160957 A1* | 6/2011 | Itoh ........................ B60K 35/00 701/36 |
| 2011/0301722 A1 | 12/2011 | Sato et al. |
| 2012/0054665 A1* | 3/2012 | Kano .................. G06F 3/04847 715/776 |
| 2014/0043791 A1 | 2/2014 | Diederiks et al. |
| 2014/0075377 A1* | 3/2014 | Kang .................. G06F 3/04842 715/788 |
| 2014/0184314 A1* | 7/2014 | Takahashi .......... G01R 31/3613 327/524 |
| 2015/0264205 A1* | 9/2015 | Isamikawa ......... H04N 1/00477 358/1.15 |
| 2016/0198093 A1* | 7/2016 | Ito ...................... H04N 5/23245 348/333.02 |

FOREIGN PATENT DOCUMENTS

| | | |
|---|---|---|
| JP | 2006-350819 | 12/2006 |
| JP | 5128489 | 11/2012 |
| JP | 2013-076493 | 4/2013 |
| WO | 2010/017588 | 2/2010 |

OTHER PUBLICATIONS

Remote Lighting Kit—Home Depot, Nov. 24, 2013, http://www.homedepot.com/catalog/pdfImages/7c/7c1463be-1607-41f0-8632-3319ff49b185.pdf.

* cited by examiner

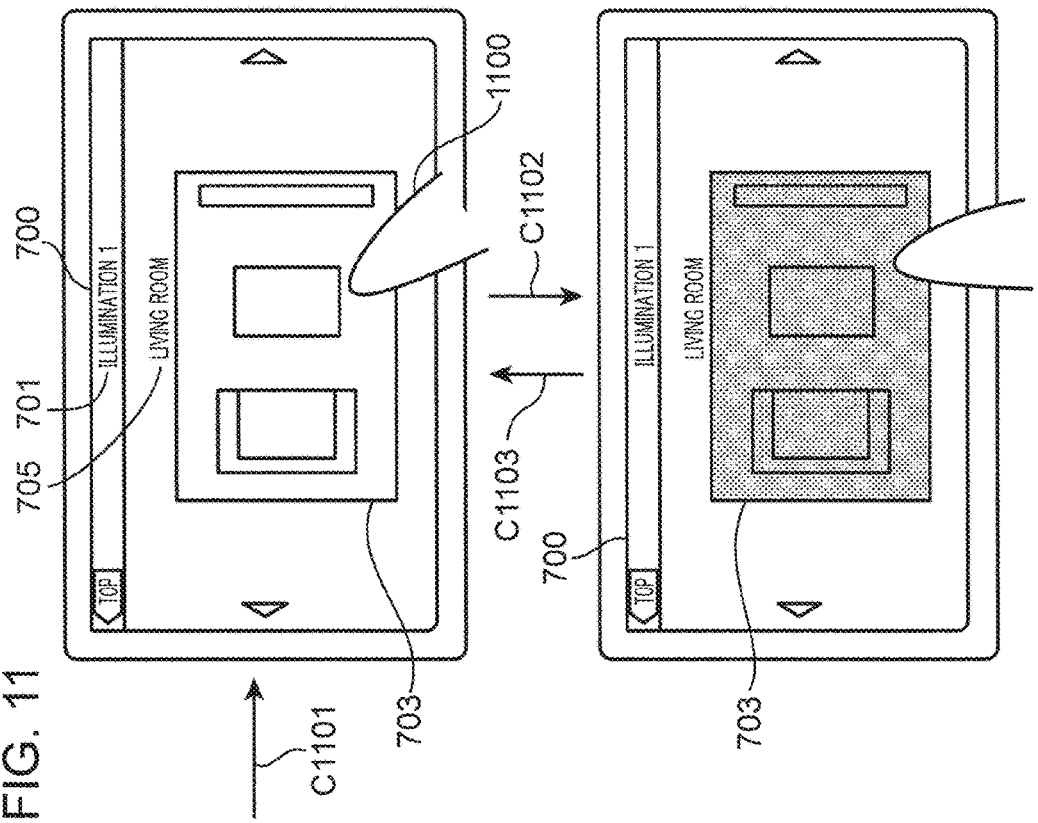
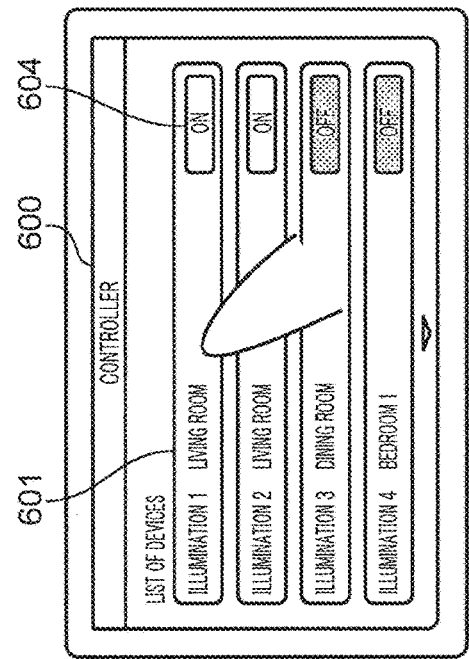
FIG. 11

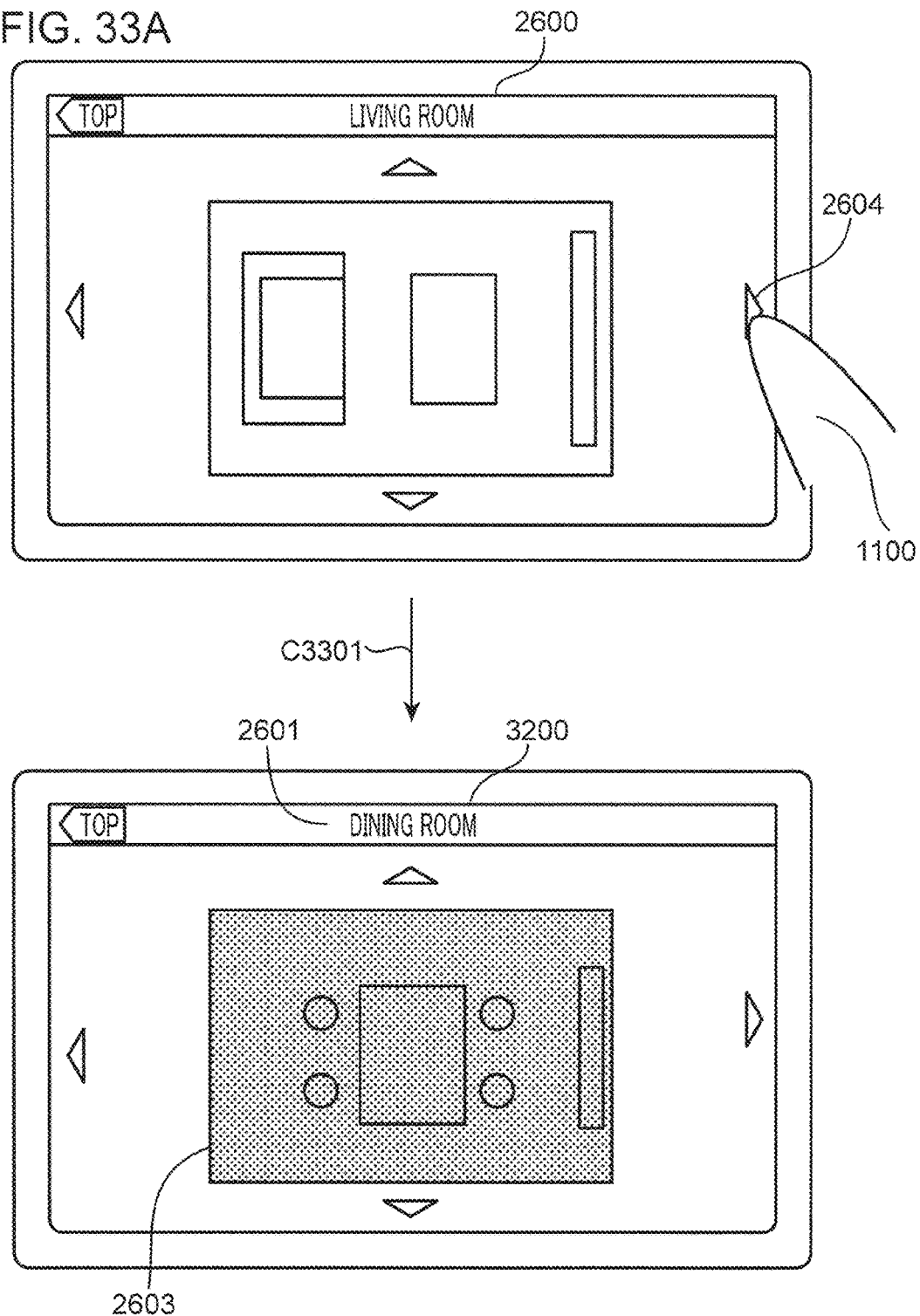

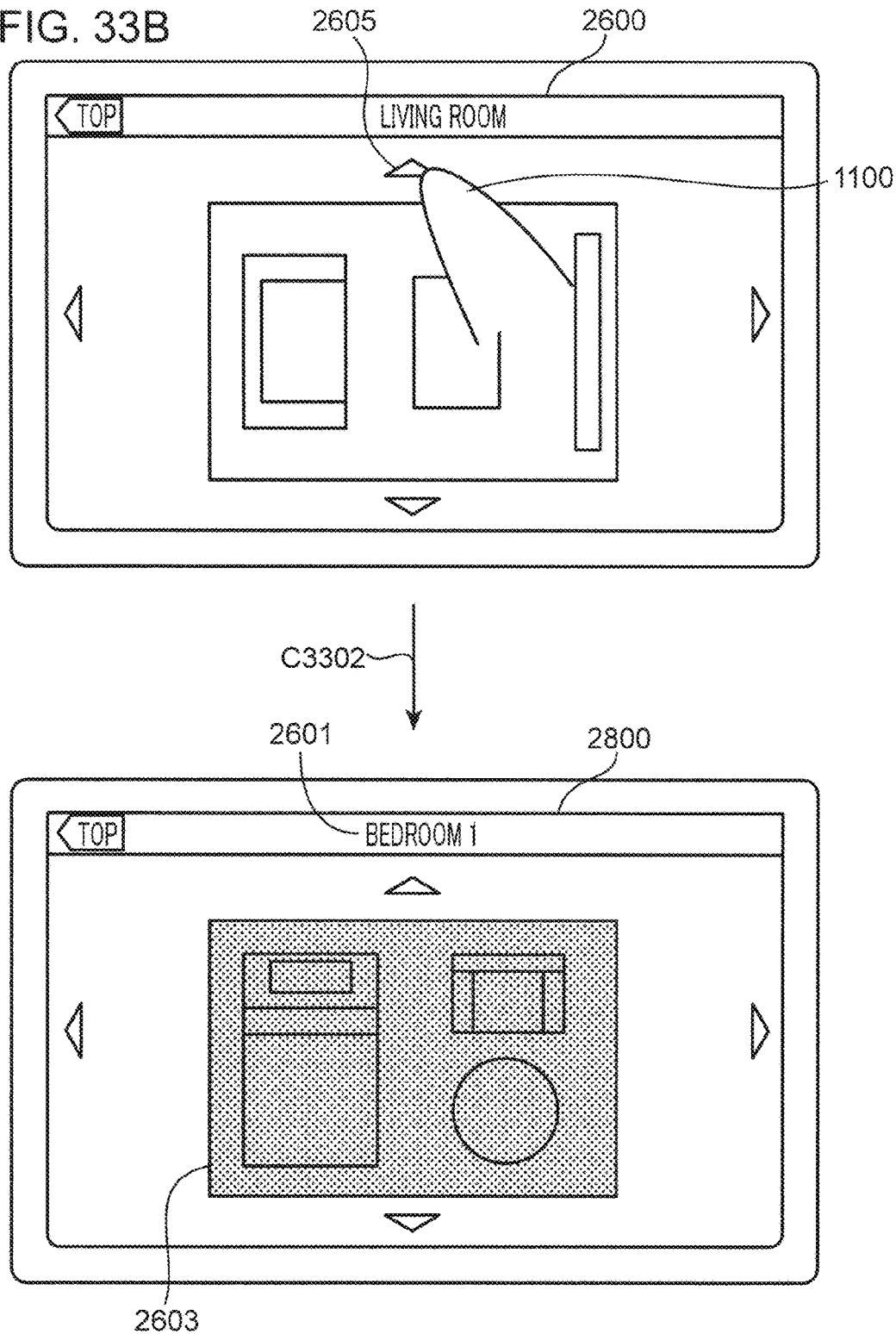

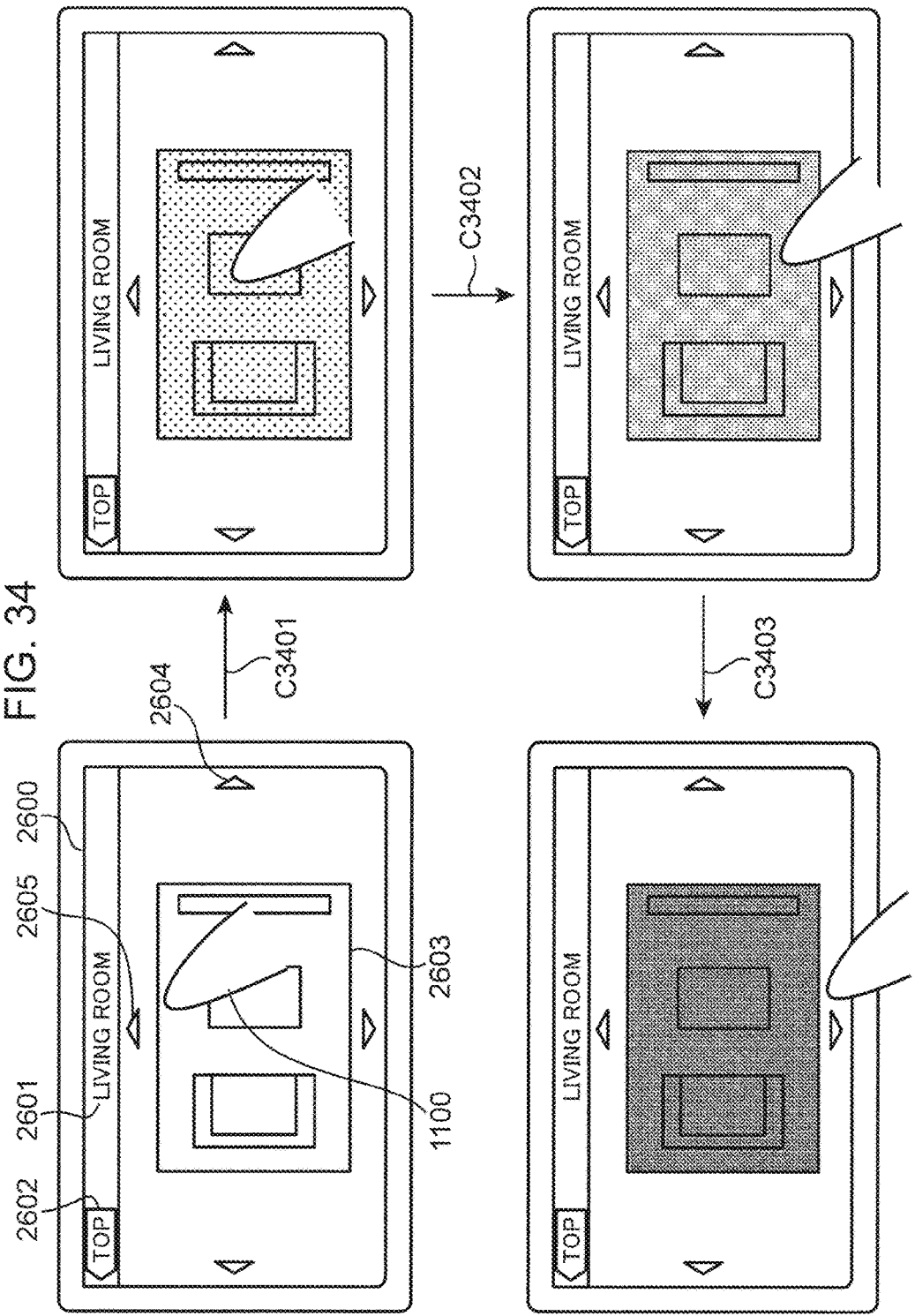

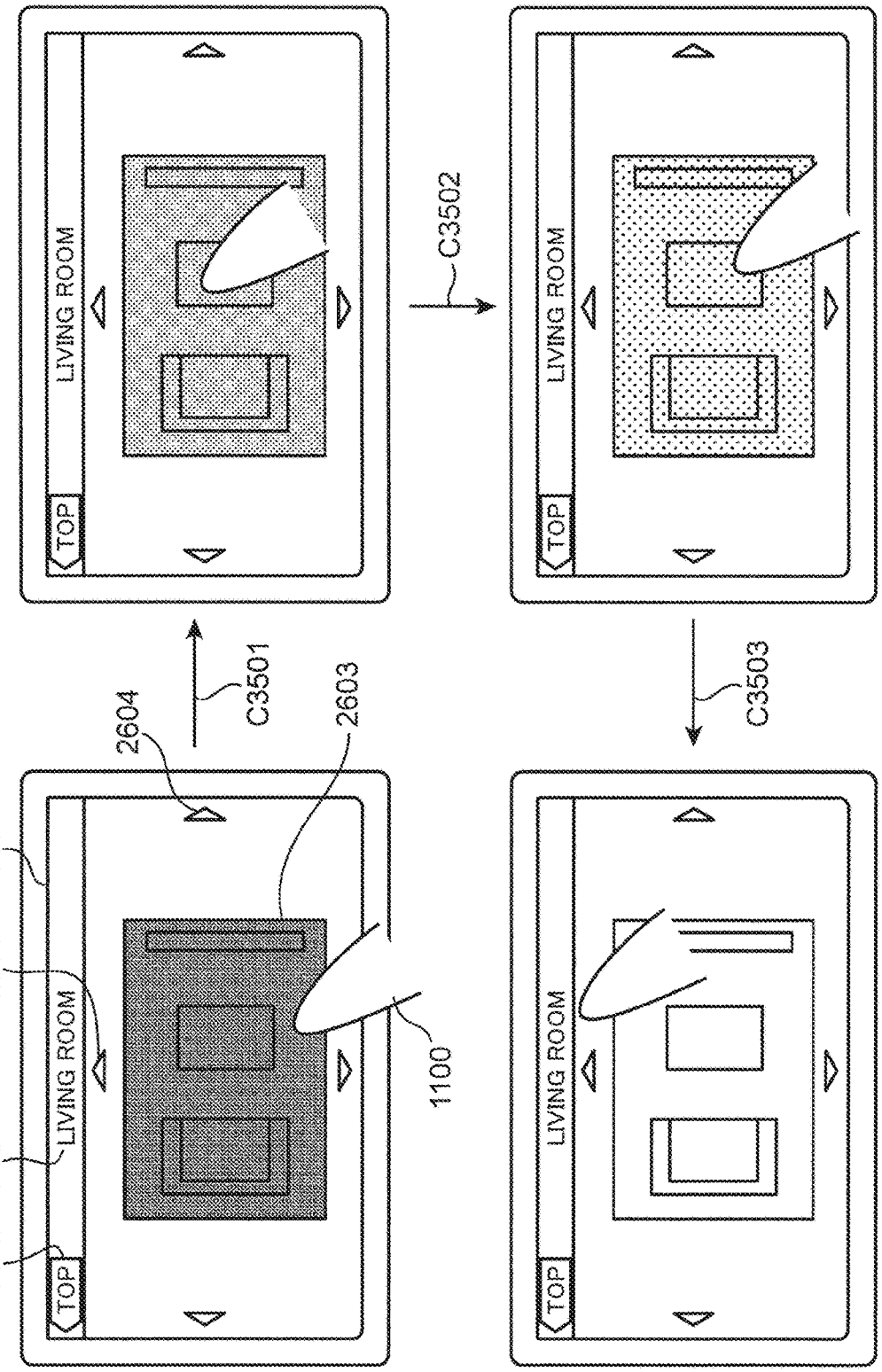

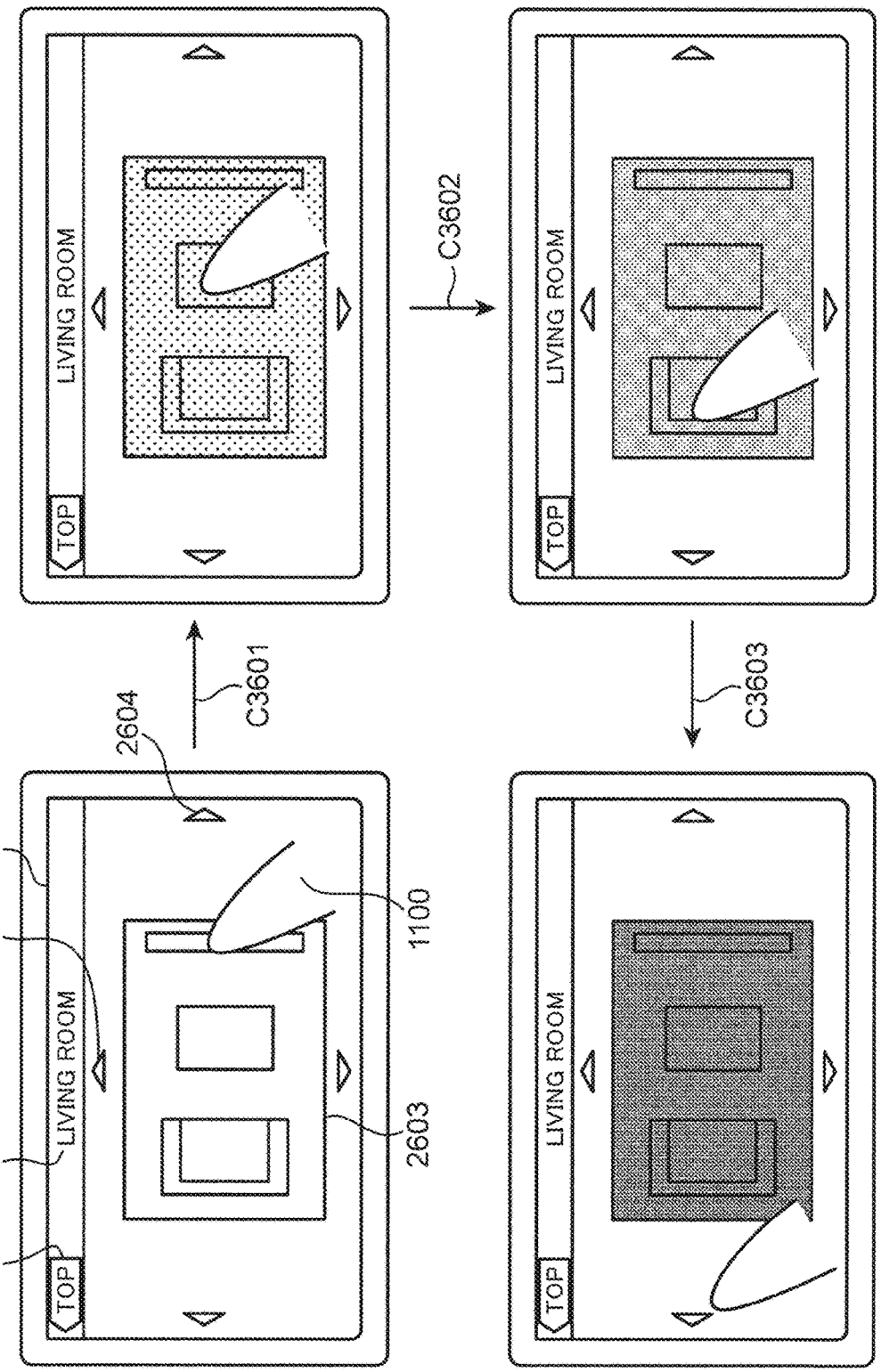

| DEVICE ID (3801) | DEVICE TYPE (3802) | MODEL NUMBER (3803) | ARRANGEMENT (3804) | CAPABILITY INFORMATION (3805) | CONTROL COMMAND TRANSMISSION DESTINATION (3806) | IP ADDRESS (3807) | STATUS (3808) |
|---|---|---|---|---|---|---|---|
| A | ILLUMINATION | HH-LC710A | LIVING ROOM | ON/OFF CONTROL, DIMMER CONTROL | DEVICE | 192.168.0.5 | ON, 100% LIGHT INTENSITY |
| B | ILLUMINATION | HH-LC710A | LIVING ROOM | ON/OFF CONTROL, DIMMER CONTROL | DEVICE | 192.168.0.6 | ON, 70% LIGHT INTENSITY |
| C | ILLUMINATION | HH-LC710A | DINING ROOM | ON/OFF CONTROL, DIMMER CONTROL | DEVICE | 192.168.0.7 | OFF |
| D | ILLUMINATION | HH-LC710A | BEDROOM 1 | ON/OFF CONTROL, DIMMER CONTROL | DEVICE | 192.168.0.8 | OFF |
| E | ILLUMINATION | HH-LC710A | BEDROOM 2 | ON/OFF CONTROL, DIMMER CONTROL | DEVICE | 192.168.0.9 | OFF |
| F | AIR CONDITIONER | CS-X404C | LIVING ROOM | ON/OFF CONTROL, TEMPERATURE CONTROL, MODE CONTROL, AIR DIRECTION CONTROL, AIR FLOW CONTROL | SERVER | 192.168.0.10 | COOLER ON, 27°C |
| G | SHUTTER | NK-NEA10 | LIVING ROOM | OPEN/CLOSE CONTROL | DEVICE | 192.168.0.11 | CLOSED STATE |
| H | ELECTRONIC LOCK | HH-LC710A | ENTRANCE | OPEN/CLOSE CONTROL | DEVICE | 192.168.0.12 | CLOSED STATE |
| ... | ... | ... | ... | ... | ... | ... | ... |

METHOD FOR CONTROLLING INFORMATION APPARATUS AND COMPUTER-READABLE RECORDING MEDIUM

CROSS-REFERENCE TO RELATED APPLICATIONS

This application is a continuation application of U.S. application Ser. No. 14/943,513, filed on Nov. 17, 2015, which is a continuation application of International Application No. PCT/JP2014/003623, filed on Jul. 8, 2014, and claims the benefit of U.S. Provisional application No. 61/955,373, filed on Mar. 19, 2014, the entire contents of which are hereby incorporated by reference.

TECHNICAL FIELD

The present disclosure relates to a method for controlling an information apparatus and a computer-readable recording medium.

BACKGROUND ART

Technologies for remotely monitoring or remotely controlling one or more target devices using one remote controller are proposed (see Patent Document 1).

Patent Document 1 discloses a user interface of an illumination system. When an icon associated with a certain light source is dragged into a target region on a screen and moved toward the center of the target region, the intensity of light from the corresponding light source is increased.

However, Patent Documents 1 described above needs a further improvement.

CITATION LIST

Patent Document

Patent Document 1: Japanese Patent No. 5128489

SUMMARY OF INVENTION

In one general aspect, the techniques disclosed here feature a method for controlling an information apparatus having a display and being connected to a network, one or more target devices being controlled over the network, the method causing a computer of the information apparatus to:

display on the display a display screen which specifies each of two or more illumination devices including a first illumination device;

when selection of the first illumination device is detected on the display screen, display on the display a first room screen representing a room in which the first illumination device is arranged, either with brightness not lower than predetermined brightness when the first illumination device is in an on-state or with brightness lower than the predetermined brightness when the first illumination device is in an off-state;

output to the network a first control command for turning off power of the first illumination device when selection inside a region of the first room screen is detected while the first room screen is being displayed on the display with brightness not lower than the predetermined brightness; and output to the network a second control command for turning on power of the first illumination device when selection inside a region of the first room screen is detected while the first room screen is being displayed on the display with brightness lower than the predetermined brightness.

According to the aspect described above, it is possible to embody a further improvement. These general and specific aspects may be implemented using a system, a method, and a computer program, and any combination of systems, methods, and computer programs.

BRIEF DESCRIPTION OF DRAWINGS

FIG. 11 is a diagram showing an example of a transition of a display screen in the first control pattern.

FIG. 33A is a diagram showing an example of a transition of a display screen due to a room switching button in the third control pattern.

FIG. 33B is a diagram showing an example of a transition of a display screen due to a floor switching button in the third control pattern.

FIG. 34 is a diagram showing a transition of a display screen according to an example of light quantity decrease control of an illumination device.

FIG. 35 is a diagram showing a transition of a display screen according to an example of light quantity increase control of an illumination device.

FIG. 36 is a diagram showing a transition of a display screen according to another example of light quantity decrease control of an illumination device.

FIG. 38 is a diagram showing a configuration of a device list.

DETAILED DESCRIPTION

Figure 1:
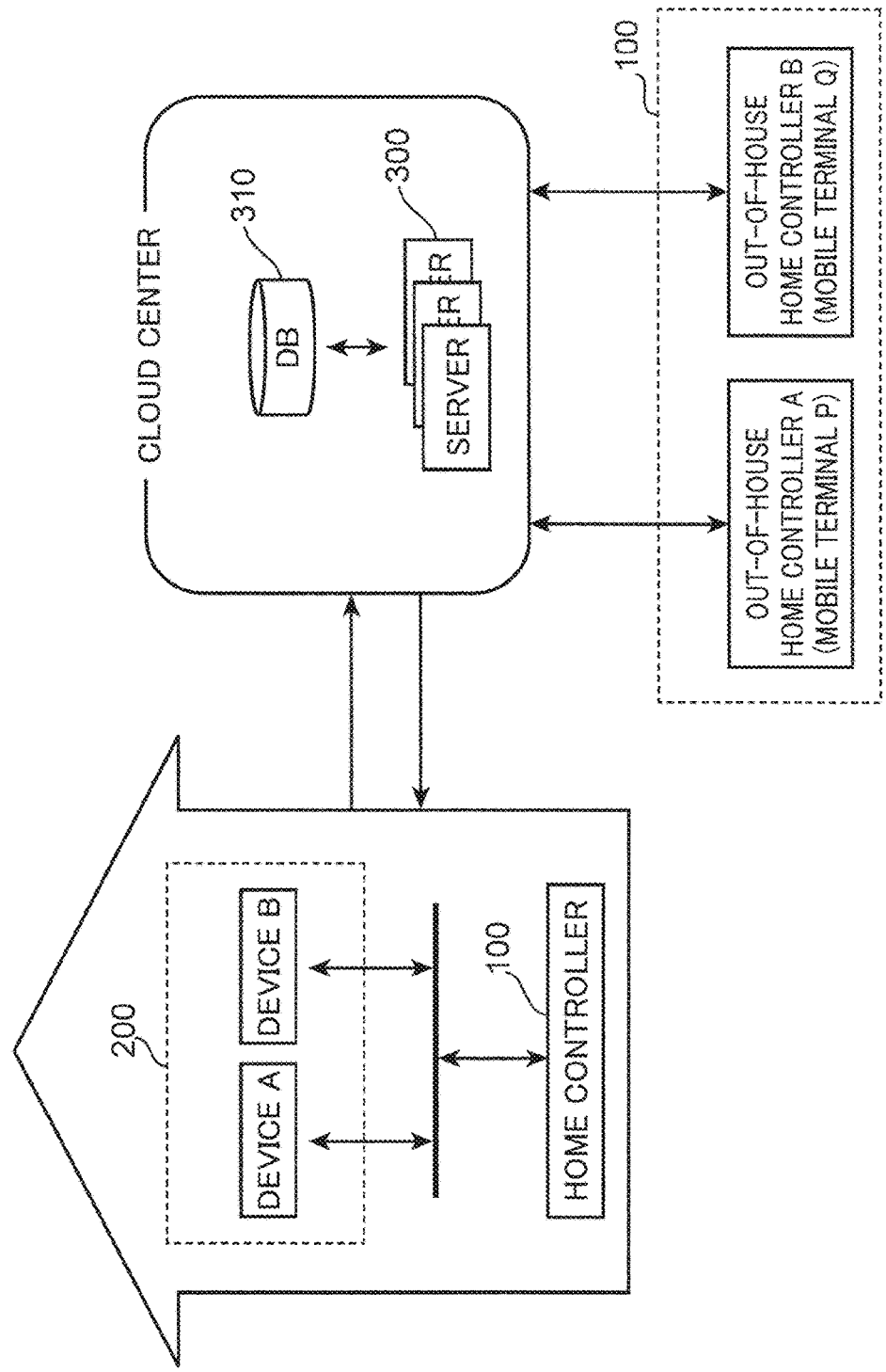
FIG. 1 is a diagram showing an overall configuration of a home control system to which a home controller according to an embodiment is applied.

Circumstances Leading to the Invention of an Aspect of the Present Disclosure

First, viewpoints of an aspect according to the present disclosure will be described.

Patent Document 1 described above only discloses controlling an illumination device for each room such as a bedroom. Therefore, Patent Document 1 does not consider controlling illumination devices used on one floor including two or more rooms. For example, an illumination device in a room corresponding to a first target region may be turned on by moving an icon from the outside of the first target region to the inside of the first target region. However, when an icon is moved from the first target region to a second target region that is adjacent to the first target region, the icon is moved into the second target region. Therefore, although an illumination device in a room corresponding to the second target region is turned on, an illumination device in a room corresponding to the first target region is turned off since the icon is moved out of the first target region, which is a problem.

In Patent Document 1 described above, in addition, the icon is initially positioned outside the target region, and moved into the target region to dim the illumination device. This leads to a problem in which it is difficult to discriminate to which room the icon corresponds in the case where Patent Document 1 is applied to a display screen representing a floor plan for one floor including two or more rooms.

This also complicates an operation of moving the icon itself into each of the two or more target regions. There is a problem that the operation is particularly complicated in the case where two rooms for which it is desired to turn on the illumination device are not adjacent to but away from each other.

Based on the considerations described above, the inventors have conceived various aspects of the present disclosure to be described below.

A first aspect of the present disclosure is a method for controlling an information apparatus having a display and being connected to a network, one or more target devices being controlled over the network, the method causing a computer of the information apparatus to:

display on the display a display screen which specifies each of two or more illumination devices including a first illumination device;

when selection of the first illumination device is detected on the display screen, display on the display a first room screen representing a first room in which the first illumination device is arranged, either with brightness not lower than predetermined brightness when the first illumination device is in an on-state or with brightness lower than the predetermined brightness when the first illumination device is in an off-state;

output to the network a first control command for turning off power of the first illumination device when selection inside a region of the first room screen is detected while the first room screen is being displayed on the display with brightness not lower than the predetermined brightness; and output to the network a second control command for turning on power of the first illumination device when selection inside a region of the first room screen is detected while the first room screen is being displayed on the display with brightness lower than the predetermined brightness.

According to the present aspect, when selection of the first illumination device (the second illumination device) is detected on the display screen, a first room screen (a second room screen) representing a first room in which the first illumination device (the second illumination device) is displayed on the display with brightness not lower than predetermined brightness when the first illumination device (the second illumination device) is in an on-state or displayed on the display with brightness lower than the predetermined brightness when the first illumination device (the second illumination device) is in an off-state.

Accordingly, in a first room in which the first illumination device (the second illumination device) whose selection has been detected is arranged, whether the first illumination device (the second illumination device) is in an on-state or an off-state can be identified immediately.

Therefore, in a first room in which the first illumination device (the second illumination device) whose selection has been detected is arranged, if the first illumination device (the second illumination device) is in an on-state, the first room screen (the second room screen) is displayed with brightness not lower than the predetermined brightness. As a result, an operation for turning on power of the first illumination device (the second illumination device) can be prevented from being performed by mistake. In this manner, a misoperation in which power of an illumination device arranged in a given room is turned on even though the illumination device is in an on-state can be prevented.

In a similar manner, in a first room in which the first illumination device (the second illumination device) whose selection has been detected is arranged, if the first illumination device (the second illumination device) is in an off-state, the first room screen (the second room screen) is displayed with brightness lower than the predetermined brightness. As a result, an operation for turning off power of the first illumination device (the second illumination device) can be prevented from being performed by mistake. In this manner, a misoperation in which power of an illumination device arranged in a given room is turned off even though the illumination device is in an off-state can be prevented.

In addition, a room screen corresponding to a room in which each of two or more illumination devices is arranged is displayed to represent an on/off state of an illumination device whose selection is detected on the room screen. Therefore, a misoperation of an illumination device arranged in a different room can be prevented from being performed.

Furthermore, by displaying a room screen corresponding to a room in which each of the two or more illumination devices is arranged, an illumination device arranged in a room corresponding to the room screen can be recognized as a control target.

According to the present aspect, when selection inside a region of the first room screen is detected, on/off of power of a first illumination device corresponding to the first room screen can be controlled. Therefore, the need to perform a complicated operation involving taking the trouble of moving an icon from outside of each object region to inside of each object region as in the case of Patent Document 1 can be eliminated. Instead, on/off of power of a first illumination device that is a control target can be readily controlled by a simple operation only involving selecting inside a region of the first room screen that corresponds to a room in which the first illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved.

Furthermore, a simple operation may suffice even when two rooms with illumination devices to be turned on are rooms that are separated from one another instead of adjacent rooms.

In addition, in the first aspect described above, for example, the two or more illumination devices may include a second illumination device, and the method may further cause the computer of the information apparatus to:

when selection of the second illumination device is detected on the display screen, display on the display a second room screen representing a second room in which the second illumination device is arranged, either with brightness not lower than the predetermined brightness when the second illumination device is in an on-state or with brightness lower than the predetermined brightness when the second illumination device is in an off-state;

output to the network a third control command for turning off power of the second illumination device when selection inside a region of the second room screen is detected while the second room screen is being displayed on the display with brightness not lower than the predetermined brightness; and output to the network a fourth control command for turning on power of the second illumination device when selection inside a region of the second room screen is detected while the second room screen is being displayed on the display with brightness lower than the predetermined brightness.

According to the present aspect, when selection inside a region of the second room screen is detected, on/off of power of a second illumination device corresponding to the second room screen can be controlled. Therefore, the need to perform a complicated operation involving taking the trouble of moving an icon from outside of each object region to inside of each object region as in the case of Patent Document 1 can be eliminated. Instead, on/off of power of a second illumination device that is a control target can be readily controlled by a simple operation only involving selecting inside a region of the second room screen that corresponds to a room in which the second illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved.

Furthermore, a simple operation may suffice even when two rooms with illumination devices to be turned on are rooms that are separated from one another instead of adjacent rooms.

In addition, in the first aspect described above, for example, the display may comprise a touch panel display.

In addition, in the first aspect described above, for example, the display may comprise a touch panel display, and the method may further cause the computer of the information apparatus to:

output to the network a fifth control command when a contact with the display is detected on the first room screen and when it is detected that the contact with the display moves on the first room screen, the fifth control command being used for changing a light quantity of the first illumination device in accordance with an amount of movement of the contact with the display.

According to the present aspect, a light quantity of the first illumination device is changed by simply detecting that a contact made with the display continues on the first room screen and that a contact position moves. Accordingly, there is no need to separately display a button or the like for changing the light quantity of the first illumination device on the first room screen. As a result, a plurality of operations including turning on/off power and dimming can be realized on the first room screen with a limited display area while minimizing display materials to be displayed.

In addition, in the first aspect described above, for example, the fifth control command may be used for changing the light quantity of the illumination device more as the amount of the movement increases.

In addition, in the first aspect described above, for example, the display may comprise a touch panel display, and the method may further cause the computer of the information apparatus to:

output to the network a sixth control command when a contact with the display is detected on the first room screen and when it is detected that the contact with the display moves on the first room screen, the sixth control command being used for changing a light quantity of the first illumination device in accordance with a direction of movement of the contact with the display.

According to the present aspect, a light quantity of the first illumination device is changed by simply detecting that a contact made with the display continues on the first room screen and that a contact position moves. Accordingly, there is no need to separately display a button or the like for changing the light quantity of the first illumination device on the first room screen. As a result, a plurality of operations including turning on/off power and dimming can be realized on the first room screen with a limited display area while minimizing display materials to be displayed.

In addition, in the first aspect described above, for example, the sixth control command may be used for increasing the light quantity of the first illumination device when the direction of movement is upward on the first room screen and may be used for decreasing the light quantity of the first illumination device when the direction of movement is downward on the first room screen.

In addition, in the first aspect described above, for example, the first room screen may be displayed on the display with brightness equal to the predetermined brightness when the first illumination device is in an on-state, and the second room screen may be displayed on the display with brightness equal to the predetermined brightness when the second illumination device is in an on-state.

According to the present aspect, the first room screen (the second room screen) is displayed on the display with brightness equal to predetermined brightness when the first illumination device (the second illumination device) is in an on-state. In other words, the first room screen (the second room screen) is displayed with brightness identical to that of the display screen when the first illumination device (the second illumination device) is in an on-state. On the other hand, the first room screen (the second room screen) is displayed on the display with brightness lower than the predetermined brightness when the first illumination device (the second illumination device) is in an off-state. Accordingly, even in the present aspect, in a room in which the first illumination device (the second illumination device) whose selection has been detected is arranged, whether the first illumination device (the second illumination device) is in an on-state or an off-state can be identified immediately in a similar manner to the first aspect described earlier.

A second aspect of the present disclosure is a method for controlling an information apparatus having a display and being connected to a network, one or more target devices being controlled over the network, the method causing a computer of the information apparatus to:

display on the display a display screen which specifies two or more illumination devices in room units;

when selection of any of the two or more illumination devices in a first room unit is detected on the display screen, display on the display a first room screen representing a first room corresponding to the first room unit in which the selection is detected, either with brightness not lower than predetermined brightness when a first illumination device arranged in the first room is in an on-state or with brightness lower than the predetermined brightness when the first illumination device arranged in the first room is in an off-state;

output to the network a first control command for turning off power of the first illumination device arranged in the first room, when selection inside a region of the first room screen is detected while the first room screen is being displayed on the display with brightness not lower than the predetermined brightness; and output to the network a second control command for turning on power of the first illumination device arranged in the first room, when selection inside a region of the first room screen is detected while the first room screen is being displayed on the display with brightness lower than the predetermined brightness.

According to the present aspect, when selection of any of the two or more illumination devices in the first room unit (the second room unit) is detected on the display screen, a first room screen (a second room screen) representing a first room (a second room) that corresponds to the first room unit (the second room unit) in which the selection is detected is displayed on the display with brightness not lower than predetermined brightness when an illumination device arranged in the first room (the second room) is in an on-state or displayed on the display with brightness lower than the predetermined brightness when the illumination device arranged in the first room (the second room) is in an off-state. The first room unit or the second room unit is, for example, a room unit such as a "living room" or a "bedroom". The first room or the second room is, for example, a room itself such as a "living room" or a "bedroom".

Accordingly, whether an illumination device arranged in a first room (a second room) that corresponds to the first room unit (the second room unit) in which the selection has been detected is in an on-state or an off-state can be identified immediately.

Therefore, if the illumination device arranged in the first room (the second room) that corresponds to the first room unit (the second room unit) in which the selection has been detected is in an on-state, the first room screen (the second room screen) is displayed with brightness not lower than the predetermined brightness. As a result, an operation for turning on power of the illumination device arranged in the first room (the second room) can be prevented from being performed by mistake. In this manner, a misoperation in which power of an illumination device arranged in a given room is turned on even though the illumination device is in an on-state can be prevented.

In a similar manner, if the illumination device arranged in the first room (the second room) that corresponds to the first room unit (the second room unit) in which the selection has been detected is in an off-state, the first room screen (the second room screen) is displayed with brightness lower than the predetermined brightness. As a result, an operation for turning off power of the illumination device arranged in the first room (the second room) can be prevented from being performed by mistake. In this manner, a misoperation in which power of an illumination device arranged in a given room is turned off even though the illumination device is in an off-state can be prevented.

In addition, since a room screen corresponding to a room in which each of two or more illumination devices is arranged is displayed to represent an on/off state of an illumination device whose selection is detected on the room screen, a misoperation of an illumination device arranged in a different room can be prevented.

Furthermore, when selection of any of the two or more illumination devices in the first room unit (the second room unit) is detected on the display screen, a first room screen (a second room screen) representing a first room (a second room) that corresponds to the first room unit (the second room unit) in which the selection is detected is displayed. Accordingly, the illumination device arranged in the first room (the second room) can be recognized as a control target.

According to the present aspect, when selection inside a region of the first room screen is detected, on/off of power of a first illumination device installed in the first room can be controlled. Therefore, the need to perform a complicated operation involving taking the trouble of moving an icon from outside of each object region to inside of each object region as in the case of Patent Document 1 can be eliminated. Instead, on/off of power of a first illumination device which is a control target and which is arranged in the first room can be readily controlled by a simple operation only involving selecting inside a region of the first room screen that corresponds to a room in which the first illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved.

Furthermore, a simple operation may suffice even when two rooms with illumination devices to be turned on are rooms that are separated from one another instead of adjacent rooms.

In addition, the second aspect described above, for example, may further cause the computer of the information apparatus to:

when selection of any of the two or more illumination devices in a second room unit is detected on the display screen, display on the display a second room screen representing a second room corresponding to the second room unit in which the selection is detected, either with brightness not lower than the predetermined brightness when a second illumination device arranged in the second room is in an on-state or with brightness lower than the predetermined brightness when the second illumination device arranged in the second room is in an off-state;

output to the network a third control command for turning off power of the second illumination device arranged in the second room, when selection inside a region of the second room screen is detected while the second room screen is being displayed on the display with brightness not lower than the predetermined brightness; and output to the network a fourth control command for turning on power of the second illumination device arranged in the second room, when selection inside a region of the second room screen is detected while the second room screen is being displayed on the display with brightness lower than the predetermined brightness.

According to the present aspect, when selection inside a region of the second room screen is detected, on/off of power of a second illumination device arranged in the second room can be controlled. Therefore, the need to perform a complicated operation involving taking the trouble of moving an icon from outside of each object region to inside of each object region as in the case of Patent Document 1 can be eliminated. Instead, on/off of power of a second illumination device which is a control target and which is arranged in the second room can be readily controlled by a simple operation only involving selecting inside a region of the second room screen that corresponds to a room in which the second illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved.

Furthermore, a simple operation may suffice even when two rooms with illumination devices to be turned on are rooms that are separated from one another instead of adjacent rooms.

In addition, in the second aspect described above, for example, when two or more illumination devices are arranged in the first room, the first control command may be used to turn off power of the two or more illumination devices, and the second eighth control command may be used to turn on power of the two or more illumination devices.

Generally, there are cases where two or more illumination devices are installed in a same room such as a living room. According to the present aspect, an operation of two or more illumination devices arranged in the first room that is represented by the first room screen is performed in room units instead of device units. In this manner, illumination devices arranged in each room can be controlled in room units instead of device units. Therefore, a batch process can be performed.

In addition, when displaying a room screen for each illumination device arranged in a same room, a room screen is to be individually displayed and operated for each illumination device even though the room in which each illumination device is displayed is the same room. According to the present aspect, if a room in which each illumination device is arranged is the same room, the number of room screens to be displayed is reduced. Therefore, an operation burden on the user can be reduced.

In addition, in the second aspect described above, for example, the display may comprise a touch panel display.

In addition, in the second aspect described above, for example, the display may comprise a touch panel display, and the method may further cause the computer of the information apparatus to:

output to the network a fifth control command when a contact with the display is detected on the first room screen and when it is detected that the contact with the display moves on the first room screen, the fifth control command being used for changing a light quantity of the first illumination device arranged in the first room in accordance with an amount of movement of the contact with the display.

According to the present aspect, a light quantity of an illumination device arranged in the first room is changed by simply detecting that a contact made with the display continues on the first room screen and that a contact position moves. Accordingly, there is no need to separately display a button or the like for changing the light quantity of the illumination device arranged in the first room on the first room screen. As a result, a plurality of operations including turning on/off power and dimming can be realized on the third room screen with a limited display area while minimizing display materials to be displayed.

In addition, in the second aspect described above, for example, the fifth control command may be used for changing the light quantity of the first illumination device more as the amount of the movement increases.

In addition, in the second aspect described above, for example, the display may comprise a touch panel display, and the method may further cause the computer of the information apparatus to:

output to the network a sixth control command when a contact with the display is detected on the first room screen and when it is detected that the contact with the display moves on the first room screen, the sixth control command being used for changing a light quantity of the first illumination device arranged in the first room in accordance with a direction of movement of the contact with the display.

According to the present aspect, a light quantity of an illumination device arranged in the first room is changed by simply detecting that a contact made with the display continues on the first room screen and that a contact position moves. Accordingly, there is no need to separately display a button or the like for changing the light quantity of the illumination device arranged in the first room on the first room screen. As a result, a plurality of operations including turning on/off power and dimming can be realized on the first room screen with a limited display area while minimizing display materials to be displayed.

In addition, in the second aspect described above, for example, the sixth control command may be used for increasing the light quantity of the first illumination device arranged in the first room when the direction of the movement is upward on the first room screen or is used for decreasing the light quantity of the first illumination device arranged in the first room when the direction of the movement is downward on the first room screen.

In addition, in the second aspect described above, for example, the first room screen may be displayed on the display with brightness equal to the predetermined brightness when the illumination device arranged in the first room is in an on-state, and the second room screen may be displayed on the display with brightness equal to the predetermined brightness when the illumination device arranged in the second room is in an on-state.

According to the present aspect, the first room screen (the second room screen) is displayed on the display with brightness equal to predetermined brightness when an illumination device arranged in the first room (the second room) is in an on-state. In other words, the first room screen (the second room screen) is displayed on the display with brightness identical to that of the display screen when the illumination device arranged in the first room (the second room) is in an on-state. On the other hand, the first room screen (the second room screen) is displayed on the display with brightness lower than the predetermined brightness when the illumination device arranged in the first room (the second room) is in an off-state. Accordingly, even in the present aspect, whether an illumination device arranged in a first room (a second room) that corresponds to the first room unit (the second room unit) in which the selection has been detected is in an on-state or an off-state can be identified immediately in a similar manner to the second aspect described earlier.

A third aspect of the present disclosure is a method for controlling an information apparatus having a display and being connected to a network, one or more target devices being controlled over the network, the method causing a computer of the information apparatus to:

display on the display a display screen including i) an instruction button for specifying a type of a target device that includes an illumination device and ii) a floor plan representing each room in a building;

display on the display a first room in the floor plan with brightness not lower than first brightness, when selection of the instruction button is detected on the display screen and when a first illumination device is in an on-state in the first room;

display a first room screen corresponding to the first room with brightness not lower than second brightness, when selection of the first room in the floor plan is detected and when the first room is displayed with brightness not lower than the first brightness; and output to the network a first control command for turning off power of the first illumination device arranged in the first room, when selection inside a region of the first room screen is detected.

According to the present aspect, a display screen including i) an instruction button for specifying a target device whose type is an illumination device and ii) a floor plan representing each room in a building is displayed on the display. In addition, when selection of the instruction button is detected on the display screen, a first room (for example, a "living room") in the floor plan in which the illumination device is in an on-state is displayed on the display with brightness not lower than first brightness.

Accordingly, in which room power of an illumination device is in an on-state or an off-state can be identified immediately.

Therefore, if the illumination device arranged in the first room is in an on-state, the first room (for example, the "living room") is displayed with brightness not lower than the first brightness. As a result, an operation for turning on power of the illumination device arranged in the first room can be prevented from being performed by mistake. In this manner, a misoperation in which power of an illumination device arranged in a given room is turned on even though the illumination device is in an on-state can be prevented.

In addition, the first room (for example, the "living room") in the floor plan in which the illumination device is in an on-state is displayed on the display with brightness not lower than the first brightness. Accordingly, an on/off state of an illumination device arranged in each room in the floor plan is represented. Therefore, a misoperation of an illumination device arranged in a different room can be prevented from being performed.

Furthermore, by representing an on/off state of an illumination device arranged in each room in the floor plan, in which room an illumination device to be a control target is arranged can be recognized.

According to the present aspect, if selection inside a region of the first room screen is detected, on/off of power of an illumination device arranged in a first room (for example, the "living room") corresponding to the first room screen can be controlled. Therefore, the need to perform a complicated operation involving taking the trouble of moving an icon from outside of each object region to inside of each object region as in the case of Patent Document 1 can be eliminated. Instead, on/off of power of an illumination device that is a control target can be readily controlled by a simple operation only involving selecting inside a region of a room screen that corresponds to a room in which the illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved. Furthermore, a simple operation may suffice even when two rooms with illumination devices to be turned on are rooms that are separated from one another instead of adjacent rooms.

In addition, the third aspect described above, for example, may further cause the computer of the information apparatus to:

display on the display a second room with brightness lower than the first brightness, when selection of the instruction button is detected on the display screen and when a second illumination device is in an off-state in the second room or is not yet installed in the second room;

display a second room screen corresponding to the second room with brightness lower than the second brightness, when selection of the second room in the floor plan is detected and when the second room is displayed with brightness lower than the first brightness; and output to the network a second control command for turning on power of the second illumination device arranged in the second room, when selection inside a region of the second room screen is detected and when the second illumination device is installed in the second room.

According to the present aspect, a display screen including an instruction button for specifying a target device whose type is an illumination device and a floor plan representing each room in a building is displayed on the display. In addition, when selection of the instruction button is detected on the display screen, a second room (for example, a "bathroom") in the floor plan in which an illumination device is in an off-state or an illumination device is not yet installed is displayed on the display with brightness lower than the first brightness.

In a similar manner, if the illumination device arranged in the second room is in an off-state, the second room is displayed with brightness lower than the first brightness. As a result, an operation for turning off power of the illumination device arranged in the second room can be prevented from being performed by mistake. In this manner, a misoperation in which power of an illumination device arranged in a given room is turned off even though the illumination device is in an off-state can be prevented.

In addition, the second room (for example, the "bathroom") in the floor plan in which an illumination device is in an off-state or an illumination device is not yet installed is displayed on the display with brightness lower than the first brightness. Accordingly, an on/off state of an illumination device arranged in each room in the floor plan is represented. Therefore, a misoperation of an illumination device arranged in a different room can be prevented from being performed.

According to the present aspect, if selection inside a region of the second room screen is detected, on/off of power of an illumination device arranged in a second room (for example, the "bathroom") corresponding to the second room screen can be controlled. Therefore, the need to perform a complicated operation involving taking the trouble of moving an icon from outside of each object region to inside of each object region as in the case of Patent Document 1 can be eliminated. Instead, on/off of power of an illumination device that is a control target can be readily controlled by a simple operation only involving selecting inside a region of a room screen that corresponds to a room in which the illumination device is arranged.

In addition, on/off of an illumination device is not controlled by moving an icon from outside of each object region to inside of each object region as in the case of Patent Document 1. Therefore, an inconvenience that, each time the icon is moved from a given room to an adjacent next room, an illumination device in the next room is turned on but an illumination device in the given room is turned off against the intention of a user can be resolved. Furthermore, a simple operation may suffice even when two rooms with illumination devices to be turned on are rooms that are separated from one another instead of adjacent rooms.

In addition, in the third aspect described above, for example, the display may comprise a touch panel display, and
the method may further cause the computer of the information apparatus to:

output to the network a third control command when a contact with the display is detected on the first room screen and when it is detected that the contact with the display moves on the first room screen, the third control command being used for changing a light quantity of the first illumination device arranged in the first room in accordance with an amount of movement of the contact with the display.

According to the present aspect, a light quantity of an illumination device arranged in the first room is changed by simply detecting that a contact made with the display continues on the first room screen and that a contact position moves. Accordingly, there is no need to separately display a button or the like for changing the light quantity of the first illumination device arranged in the first room on the first room screen. As a result, a plurality of operations including turning on/off power and dimming can be realized on the first room screen with a limited display area while minimizing display materials to be displayed.

In addition, in the third aspect described above, for example, the third control command may be used for changing the light quantity of the first illumination device more as the amount of the movement increases.

In addition, in the third aspect described above, for example, the display may comprise a touch panel display, and the method may further cause the computer of the information apparatus to:

output to the network a fourth control command when a contact with the display is detected on the first room screen and when it is detected that the contact with the display moves on the first room screen, the fourth control command being used for changing a light quantity of the first illumination device arranged in the first room in accordance with a direction of movement of the contact with the display.

According to the present aspect, a light quantity of a first illumination device arranged in the first room is changed by simply detecting that a contact made with the display continues on the first room screen and that a contact position moves. Accordingly, there is no need to separately display a button or the like for changing the light quantity of the first illumination device arranged in the first room on the first room screen. As a result, a plurality of operations including turning on/off power and dimming can be realized on the first room screen with a limited display area while minimizing display materials to be displayed.

In addition, in the third aspect described above, for example, the fourth control command may increase the light quantity of the first illumination device arranged in the first room when the direction of the movement is upward on the first room screen or may decrease the light quantity of the first illumination device arranged in the first room when the direction of the movement is downward on the first room screen.

In addition, in the third aspect described above, for example, the display screen may be displayed on the display with brightness equal to the first brightness, and the first room may be displayed on the display with brightness equal to the first brightness.

According to the present aspect, the first room is displayed on the display with brightness equal to the first brightness. In other words, the first room which is a room in which an illumination device is in an on-state is displayed on the display with brightness identical to that of the display screen. On the other hand, the second room which is a room in which an illumination device is in an off-state or an illumination device is not yet installed is displayed on the display with brightness lower than the first brightness. Accordingly, even in the present aspect, in which room power of an illumination device is in an on-state or an off-state can be identified immediately in a similar manner to the third aspect described above.

Embodiment

An embodiment of the present disclosure will be described below with reference to the drawings. In the drawings, the same symbols are used for the same constituent elements.

In the embodiment, a home controller which can singly control one or more devices will be described.

(Overall Configuration)

FIG. 1 is a diagram showing an overall configuration of a home control system to which a home controller according to the embodiment is applied. As shown in FIG. 1, the home control system includes a home controller 100, a device 200 (an example of a target device), and a server 300.

The home controller 100 and one or more devices 200 (for example, a device A 200 and a device B 200) are disposed in a house. The servers 300 and a database 310 are disposed in a cloud center. The home controller 100, the device 200, and the servers 300 communicate with each other via a wired or wireless network. For example, the device 200 and the home controller 100 are communicably connected to each other via a wireless or wired in-home network, and the home controller 100, the device 200, and the servers 300 are communicably connected to each other via an external network such as the Internet.

As shown in FIG. 1, the home controller 100 is not necessarily disposed in the house, and includes one disposed outside the house (an out-of-house home controller A100, an out-of-house home controller B100, for instance). The out-of-house home controller A100 and the out-of-house home controller B100 may be a mobile terminal P100 and a mobile terminal Q100, respectively. A user who owns the mobile terminal P100 and the mobile terminal Q100 controls the one or more devices 200 from a location away from the home via the server 300.

An information terminal such as a smartphone or a tablet terminal may be adopted as the home controller 100. It should be noted, however, that the smartphone and the tablet terminal are merely exemplary, and an information terminal of a button type such as a cellular phone may be adopted as the home controller 100.

Figure 2:
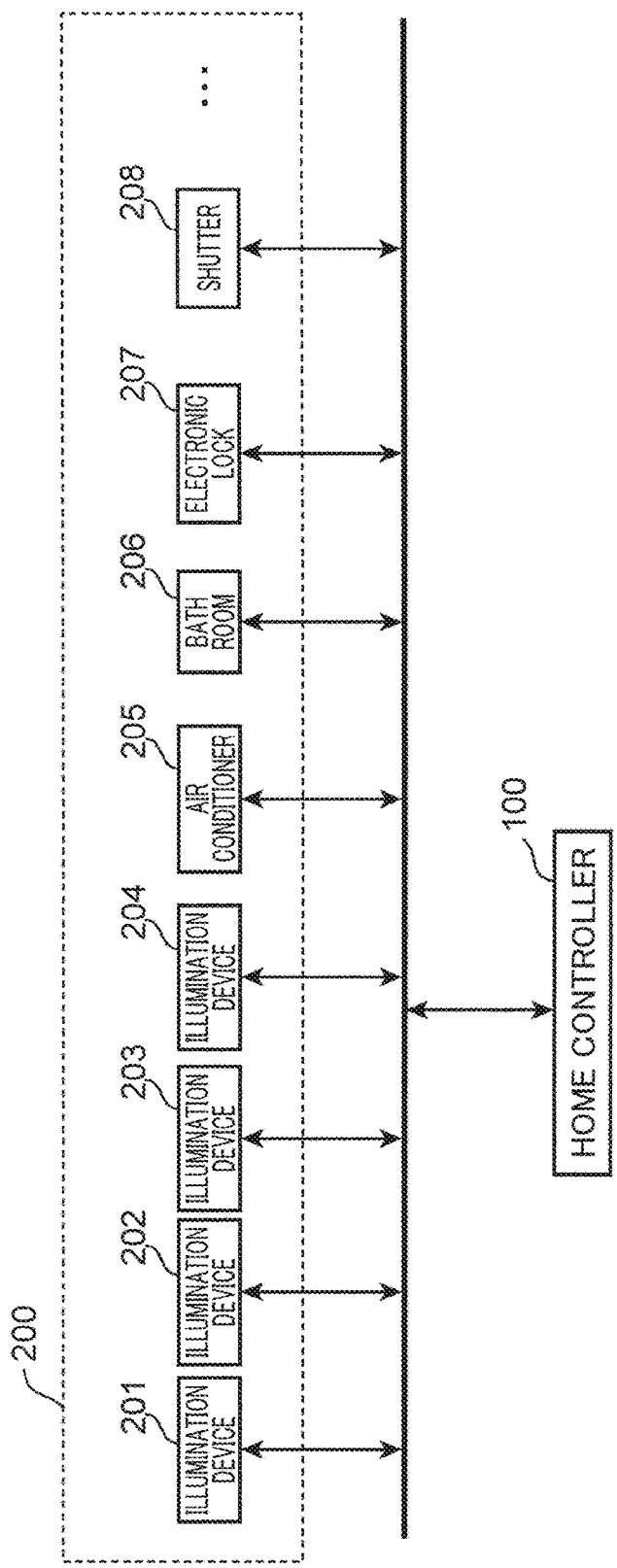
FIG. 2 is a diagram showing main devices to be controlled by the home controller.

FIG. 2 is a diagram showing the main devices 200 to be controlled by the home controller 100. The home controller 100 controls the devices 200 such as illumination devices 201, 202, 203 and 204, an air conditioning apparatus (hereinafter called "air conditioner") 205, a bath 206, an electronic lock 207, an electric shutter apparatus 208. The devices 200 to be controlled by the home controller 100 may include a plurality of devices 200 of the same type such as the illumination devices 201, 202, 203 and 204. An air conditioner is an apparatus for adjusting temperature, humidity, cleanliness, and the like of air inside a room. Air conditioners include a cooling apparatus, a heating apparatus, a cooling and heating apparatus, a humidifier, a dehumidifier, and an air cleaner. In this embodiment, the air conditioner 205 is a cooling and heating apparatus, for example.

The devices 200 such as the air conditioner 201 shown in FIG. 2 are merely exemplary, and a television set, or a Blu-ray recorder, or an audio device, or the like may be adopted as the devices 200. That is, any electrical device that functions to communicate with the home controller 100 may be adopted as the device 200. In FIG. 2, electrical devices for use in ordinary households are shown as the devices 200.

However, the embodiment is not limited thereto, and office devices for use in offices or the like may be adopted as the devices 200. Examples of the office devices include a printer, a personal computer, a scanner, and a copy machine.

Figure 3:
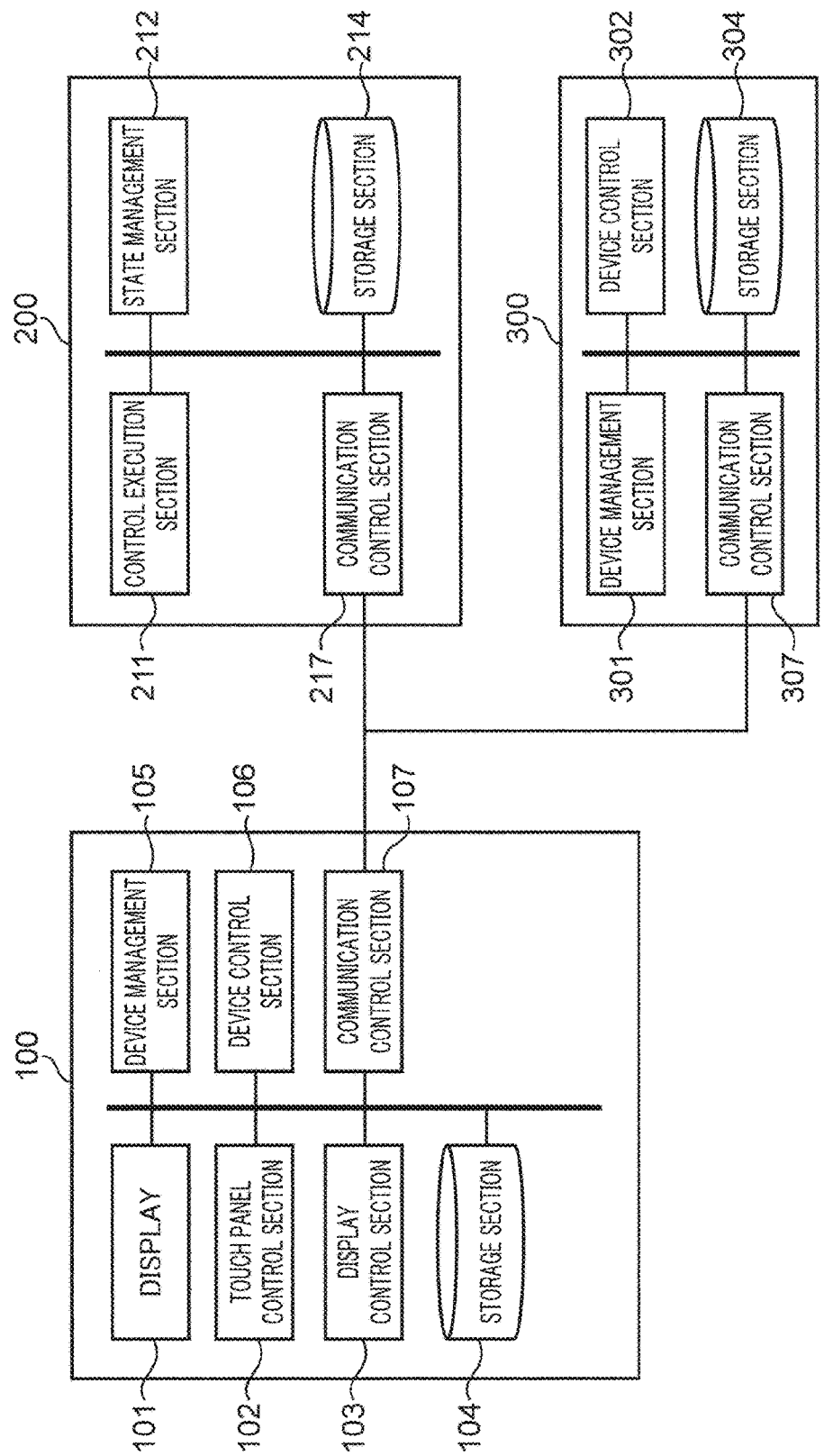
FIG. 3 is a block diagram showing the configuration of the home controller, a device, and a server.

FIG. 3 is a block diagram showing the configuration of the home controller 100, the device 200, and the server 300. As shown in FIG. 3, the home controller 100 includes a display 101, a touch panel control section 102, a display control section 103, a storage section 104, a device management section 105, a device control section 106, and a communication control section 107.

The display 101 is formed from a touch panel display, for example, and displays a user interface that allows the user to operate the home controller 100. The user can input various operations to the home controller 100 by contacting the display 101.

The touch panel control section 102 recognizes an operation performed on the display 101 by the user, interprets the content of the operation, and notifies the other constituent elements of the content of the operation. For example, if an object is displayed at a position on the display 101 tapped on by the user, the touch panel control section 102 determines that the object is selected by the user. A variety of GUI parts that receive a user operation such as buttons are adopted as the object.

The display control section 103 generates a GUI (Graphical User Interface) of the home controller 100, and causes the display 101 to display the GUI. The storage section 104 stores information that is necessary for operation of the home controller 100 such as a device list 3800 (FIG. 38 to be described later) managed by the device management section 105.

The device management section 105 manages the control target devices 200 using the device list 3800 stored in the storage section 104. In addition, the device management section 105 detects a device 200 when the device 200 is connected to the in-home network. Further, the device management section 105 acquires the device list 3800 and room information 3900 to be discussed later from the server 300, stores the acquired device list 3800 and room information 3900 in the storage section 104, and manages the device list 3800 and room information 3900. The device control section 106 issues a control command for the devices 200. The communication control section 107 controls communication between the home controller 100 and the devices 200 and communication between the home controller 100 and the server 300. In addition, the communication control section 107 transmits a variety of data to the devices 200 or the server 300 upon receiving a request to transmit such data from other blocks, and receives data transmitted from the devices 200 or the server 300 to deliver the data to the relevant block.

The display 101 may be a normal display rather than a touch panel display. In this case, the user may use an external input device such as a mouse (not shown) to input an instruction to select an object by moving a pointer displayed on the display 101 and clicking on a desired object. That is, in the embodiment, a series of operations performed by the user by contacting the display 101 may be replaced with operations of moving a pointer and clicking using an external input device such as a mouse.

As shown in FIG. 3, the device 200 includes a control execution section 211, a state management section 212, a storage section 214, and a communication control section 217. The control execution section 211 receives a control command from the home controller 100 or the server 300, and controls the device 200 in accordance with the received control command. The content of control of the device 200 performed by the control execution section 211 differs in accordance with the type of the device 200. For example, if the device 200 is an illumination device, the control execution section 211 turns on and off the illumination device. In addition, the control execution section 211 transmits the result of execution of the control command and the state of the device 200 to the home controller 100 or the server 300.

The state management section 212 manages the state of the device 200. The content of management of the device 200 performed by the state management section 212 differs in accordance with the type of the device 200. For example, if the device 200 is an illumination device, the state management section 212 manages whether the illumination device is currently turned on or turned off. The storage section 214 stores information related to the state of the device 200 managed by the state management section 212. The communication control section 217 controls communication between the device 200 and the home controller 100 and communication between the device 200 and the server 300. In addition, the communication control section 217 transmits a variety of data to the home controller 100 or the server 300 upon receiving a request to transmit such data from other blocks, and receives data transmitted from the home controller 100 or the server 300 to deliver the data to the relevant block.

As shown in FIG. 3, the server 300 includes a device management section 301, a device control section 302, a storage section 304, and a communication control section 307. The device management section 301 manages the devices 200 for each house or each user account. In addition, the device management section 301 transmits the device list 3800 and room information 3900 to the home controller 100 in response to a request from the home controller 100. Further, the device management section 301 acquires log information related to the use history of the device 200 and information related to the state of the device 200 from the device 200, stores the acquired information in the storage section 304, and manages the information.

The device control section 302 transmits a control command to the device 200 in response to a request from the home controller 100. The storage section 304 stores information that is necessary for operation of the server 300 such as the device list 3800 and room information 3900 and the information related to the state of the device 200 managed by the device management section 301. The communication control section 307 controls communication between the server 300 and the home controller 100 and communication between the server 300 and the device 200 as with the communication control section 107. In addition, the communication control section 307 transmits a variety of data to the home controller 100 or the device 200 upon receiving a request to transmit such data from other blocks, and receives data transmitted from the home controller 100 or the device 200 to deliver the data to the relevant block.

Figure 4:
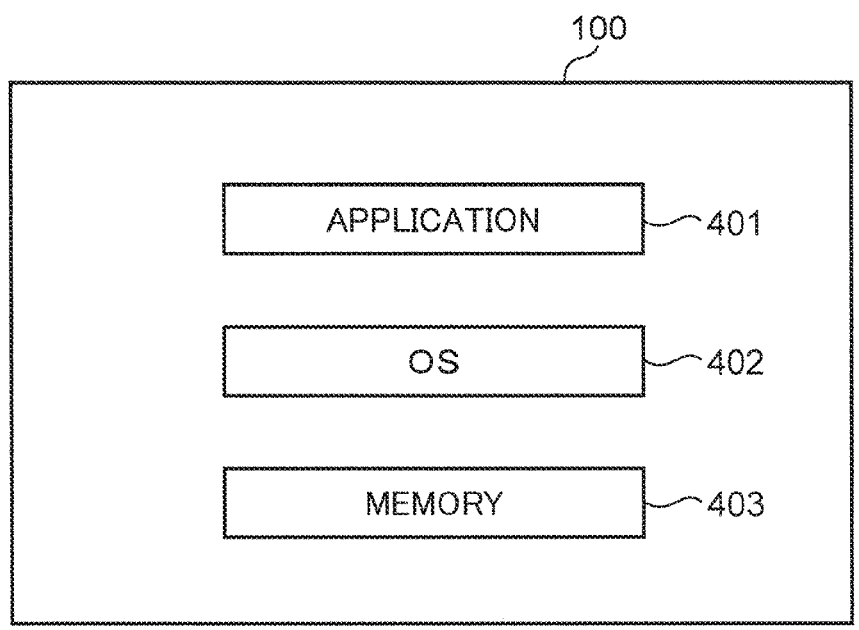
FIG. 4 is a diagram showing a configuration example of the form of implementation of the home controller.

FIG. 4 is a diagram showing a configuration example of the form of implementation of the home controller 100. As shown in FIG. 4, the home controller 100 includes an application 401, an OS (Operating System) 402, a memory 403, and other hardware (not shown).

The application 401 is application software for causing the information terminal to function as the home controller 100, and is executed by a processor of the home controller 100. The home controller 100 may read the application 401 from a computer readable recording medium to implement the application 401, or may download the application 401 from a network to implement the application 401. The OS 402 is basic software of the information terminal, and is executed by the processor of the home controller 100. The memory 403 is formed from a storage device such as a RAM and a ROM of the home controller 100, and stores a group of data included in the application 401. The processor of the home controller 100 executes the application 401 to embody the functions of the touch panel control section 102, the display control section 103, the storage section 104, the device management section 105, the device control section 106, and the communication control section 107 shown in FIG. 3. In addition, the processor of the home controller 100 executes the application 401 to cause the memory 403 to function as the storage section 104.

It should be noted, however, that in the embodiment, the home controller 100 may be implemented by the application 401 alone, may be implemented by the application 401 and the OS 402, may be implemented by the application 401, the OS 402, and the memory 403, or may be implemented by the application 401, the OS 402, the memory 403, and other hardware (not shown). In any embodiment, the home controller 100 according to the embodiment can be embodied. In the embodiment, the processor and the storage device forming the information terminal, for example, form a computer. One of a CPU, an FPGA, and an ASIC or a combination of two or more of these may be adopted as the processor. One of a ROM, a RAM, and a hard disk or a combination of two or more of these may be adopted as the storage device.

Figure 5:
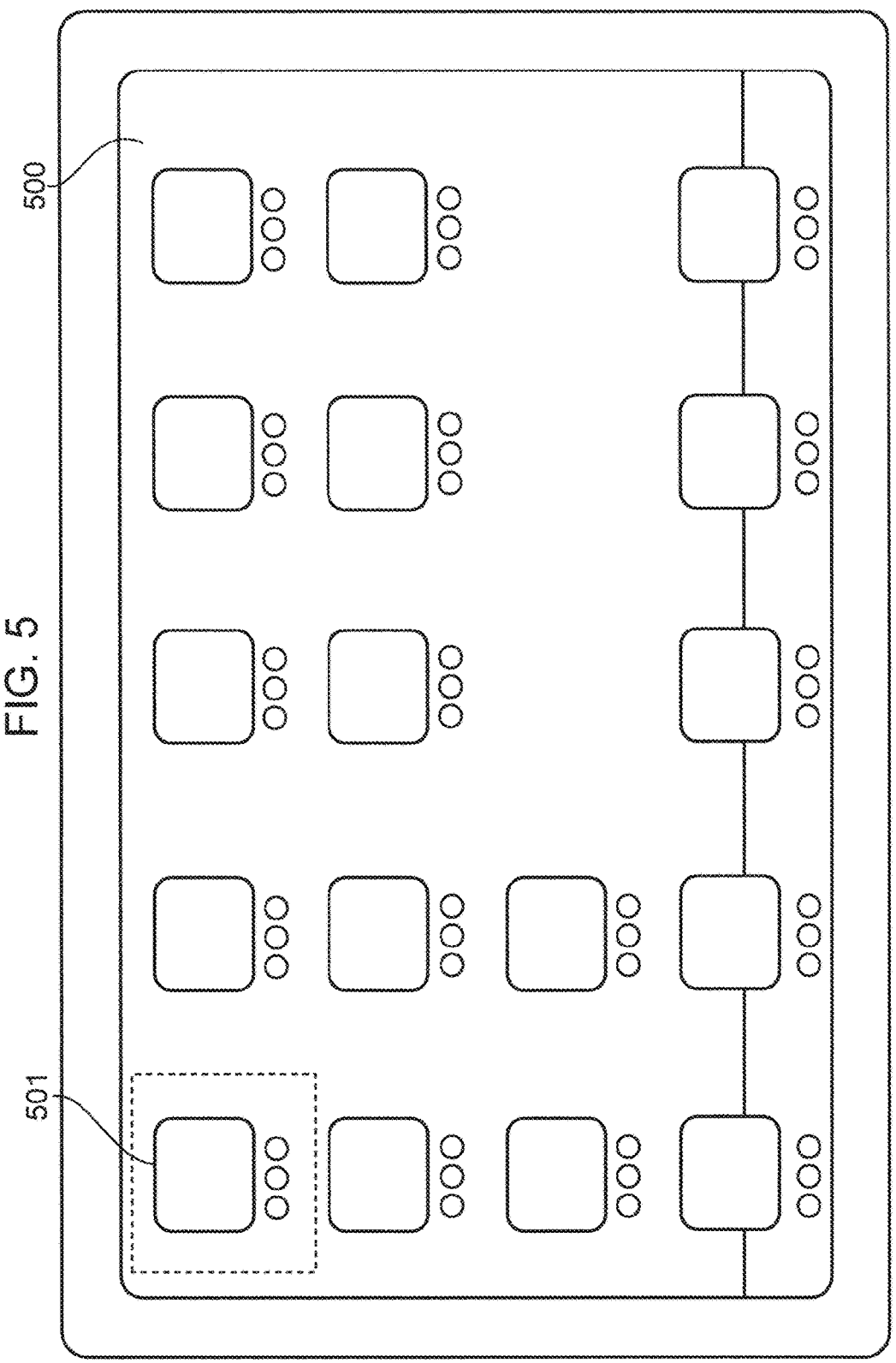
FIG. 5 is a diagram showing an example of a basic screen of the home controller.

FIG. 5 is a diagram showing an example of a basic screen 500. The basic screen 500 is a basic screen that is displayed by an ordinary smartphone or a tablet terminal. The basic screen 500 displays one or more icons for executing one or more applications in a matrix pattern. In addition, the one or more icons include a controller application icon 501 for starting up a home control system. In the example shown in FIG. 5, the controller application icon 501 is arranged at a top left position.

(First Control Pattern)

First, a first control pattern will be described. The first control pattern is a control pattern in which control is performed per device.

Figure 6:
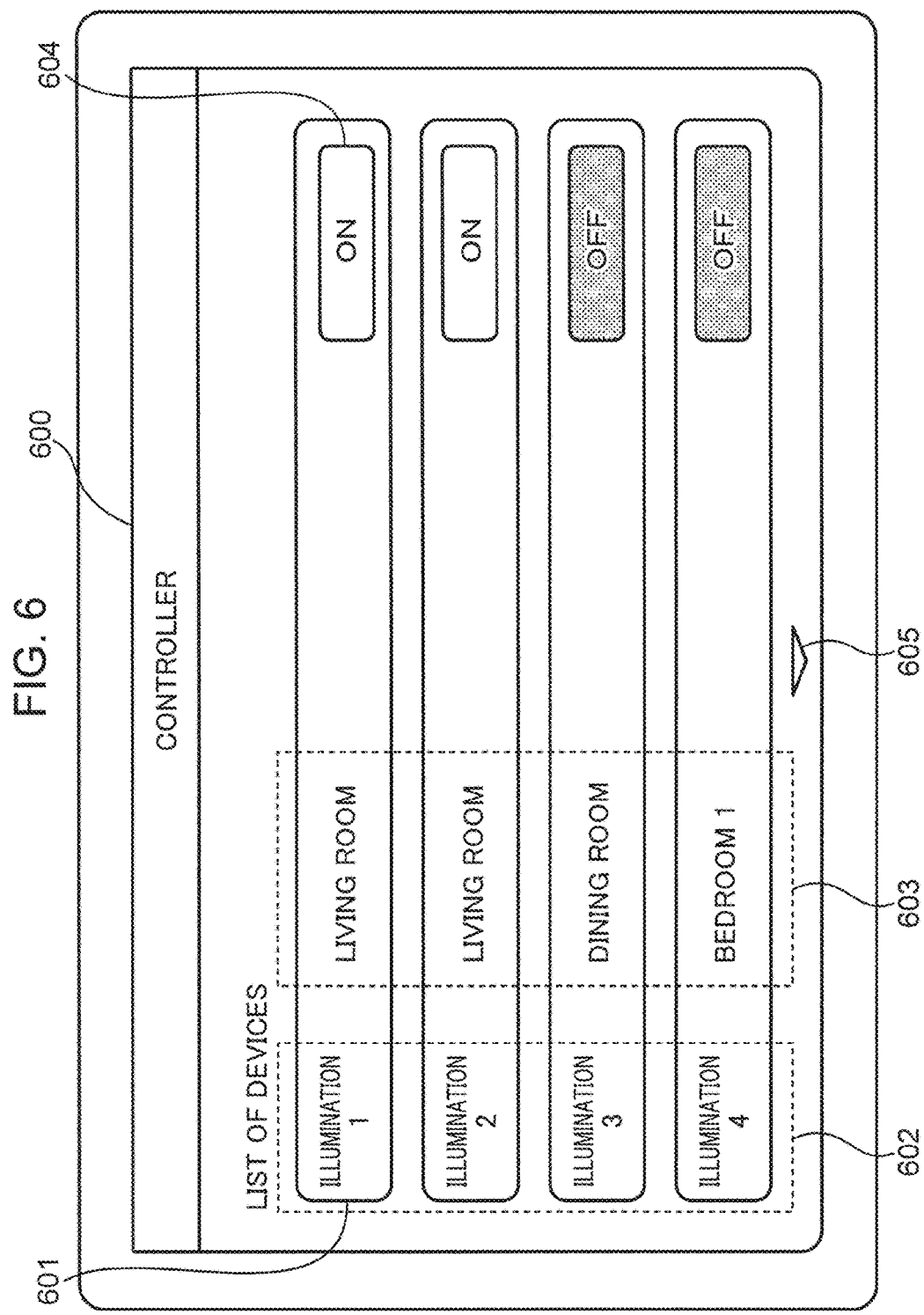
FIG. 6 is a diagram showing an example of a top screen in a first control pattern.

FIG. 6 is a diagram showing an example of a top screen 600 that is displayed on the display 101 of the home controller 100 in the first control pattern. The top screen 600 (an example of the display screen) is a top screen of a home control system. The top screen 600 shown in FIG. 6 is a screen that is displayed on the display 101 of the home controller 100 when the controller application icon 501 is tapped on the basic screen 500 in the first control pattern.

A heading that reads "controller" is displayed in an upper part of the top screen 600 to indicate that the screen is a screen of the home control system. Characters reading "list of devices" are displayed at a left end below the heading to explicitly indicate that a list of devices that can be controlled by the home control system is displayed below.

Device selection buttons 601 are displayed in a single vertical row below the characters reading "list of devices". The device selection button 601 is a button for selecting a device to be a control target. The device selection button 601 is provided for each device 200. The device selection button 601 includes a device name 602, a location name 603, and a simple control button 604.

The device name 602 represents a name of the device. The location name 603 represents a name of an installation location of the device represented by the device name 602. In the example shown in FIG. 6, "illumination 1", "illumination 2", "illumination 3", and "illumination 4" are displayed as device names 602. In addition, "living room", "living room", "dining room", and "bedroom 1" are displayed as location names 603 to respectively correspond to the "illumination 1", the "illumination 2", the "illumination 3", and the "illumination 4".

The simple control button 604 displays a current on/off state of power of a corresponding device. In the example shown in FIG. 6, "ON" is displayed for the simple control button 604 of the uppermost device selection button 601. Accordingly, it is shown that power of an illumination device named "illumination 1" which is installed in a room with a description reading "living room" is turned on. In addition, "OFF" is displayed for the simple control button 604 of a lowermost device selection button 601. Accordingly, it is shown that power of an illumination device named "illumination 4" which is installed in a room with a description reading "bedroom 1" is turned off.

As shown in FIG. 6, the simple control buttons 604 that are displayed as "ON" are displayed with brightness identical to brightness of other regions (initial brightness). In addition, the simple control buttons 604 that are displayed as "OFF" are displayed with brightness lower than the brightness of other regions. Accordingly, an on/off state of power of a corresponding device can be identified immediately.

The simple control button 604 is also a button for switching between on/off states of power of a corresponding device. For example, when the simple control button 604 of the uppermost device selection button 601 is tapped by a contact object (for example, a finger of a user), the touch panel control section 102 detects the tapping. As a result, the device control section 106 generates a control command for turning off power of the illumination device named "illumination 1" which is installed in the room with the description reading "living room". The communication control section 107 transmits the generated control command to the "illumination 1" that is installed in the room with the description reading "living room". Accordingly, the power of the illumination device named "illumination 1" is turned off. Moreover, when the power of the illumination device named "illumination 1" is turned off, the display control section 103 displays the simple control button 604 of the uppermost device selection button 601 with brightness lower than the initial brightness.

In addition, for example, when the simple control button 604 of the lowermost device selection button 601 is tapped by the contact object, the touch panel control section 102 detects the tapping. As a result, the device control section 106 generates a control command for turning on power of the illumination device named "illumination 4" which is installed in the room with the description reading "bedroom 1". The communication control section 107 transmits the generated control command to the "illumination 4" that is installed in the room with the description reading "bedroom 1". Accordingly, the power of the illumination device named "illumination 4" is turned on. Moreover, when the power of the illumination device named "illumination 4" is turned on, the display control section 103 displays the simple control button 604 of the lowermost device selection button 601 with brightness equal to the initial brightness.

A next page button 605 is displayed in a lower part of the top screen 600. When the next page button 605 is tapped with the contact object, the touch panel control section 102 detects the tapping. As a result, the display control section 103 displays a top screen 600 for a second page which displays a list of device selection buttons 601 that could not be displayed on the first page. Moreover, the next page button 605 may be a scroll button that displays one device selection button 601 at a time which could not be displayed on the first page.

FIGS. 7 to 10 are, respectively, diagrams showing an example of a control screen that is displayed on the display 101 of the home controller 100. When a position which is inside a region of the device selection button 601 and which is outside a region of the simple control button 604 is tapped by the contact object on the top screen 600 shown in FIG. 6, the touch panel control section 102 detects the tapping. As a result, the display control section 103 displays the control screens shown in FIGS. 7 to 10.

Figure 7:
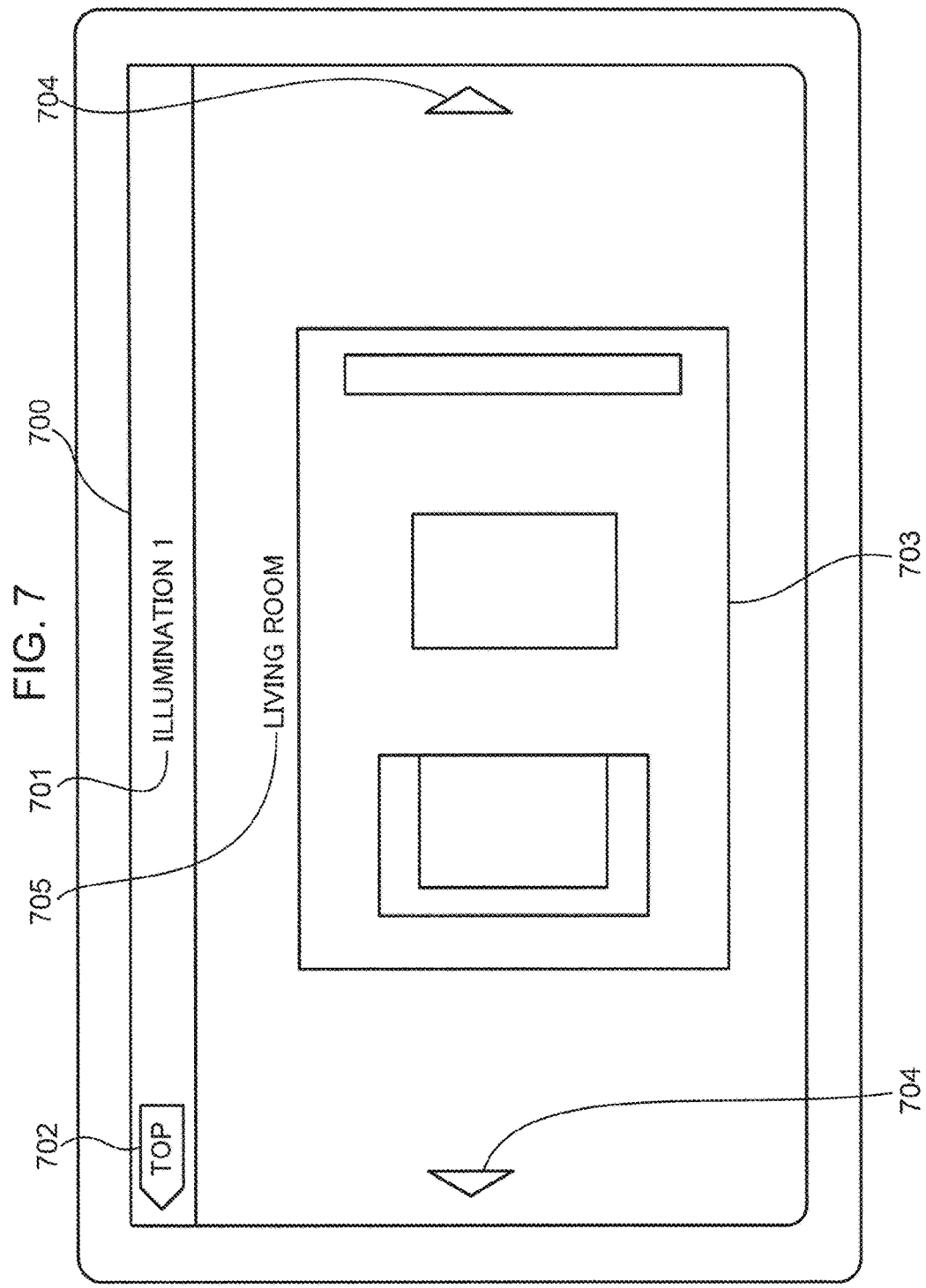
FIG. 7 is a diagram showing an example of a control screen in the first control pattern.
Figure 8:
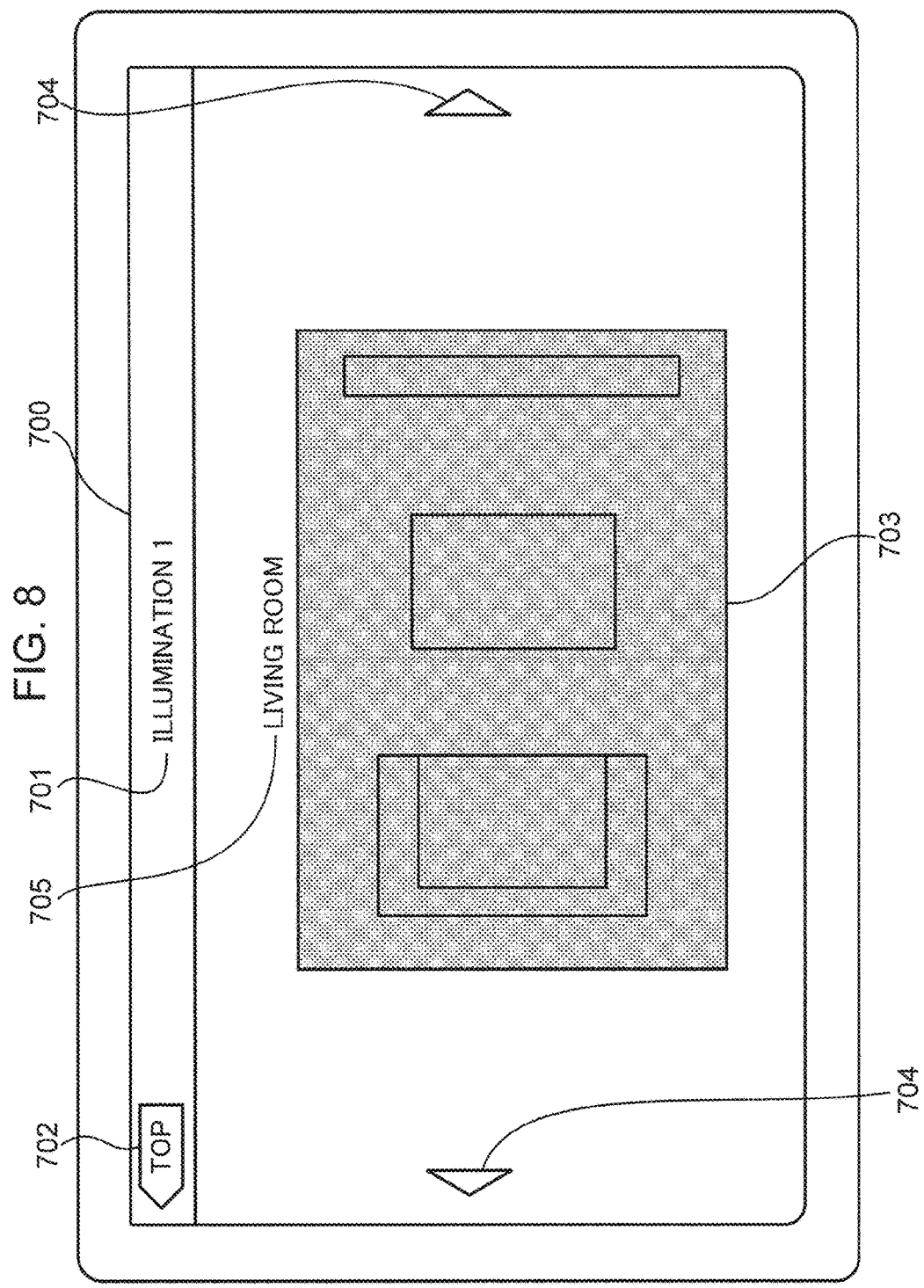
FIG. 8 is a diagram showing an example of a control screen in the first control pattern.

A control screen 700 shown in FIGS. 7 and 8 includes a device name 701, a location name 705, a room screen 703, a top screen switching button 702, and a device switching button 704. A control screen 900 shown in FIGS. 9 and 10 includes the device name 701, the location name 705, the room screen 703, the top screen switching button 702, and the device switching button 704 in a similar manner to the control screen 700 shown in FIGS. 7 and 8.

The device name 701 corresponds to the device name 602 on the top screen 600 shown in FIG. 6. The location name 705 corresponds to the location name 603 on the top screen 600 shown in FIG. 6.

In the example shown in FIGS. 7 and 8, "illumination 1" is indicated as the device name 701 and "living room" is indicated as the location name 705. In other words, the control screen 700 shown in FIGS. 7 and 8 corresponds to the uppermost device selection button 601 shown in FIG. 6. In the example shown in FIGS. 9 and 10, "illumination 4" is indicated as the device name 701 and "bedroom 1" is indicated as the location name 705. In other words, the control screen 900 shown in FIGS. 9 and 10 corresponds to the lowermost device selection button 601 shown in FIG. 6.

The room screen 703 is a screen showing a layout of a room corresponding to the location name 705 as viewed down from a ceiling side. When the room screen 703 is tapped by the user, on/off of power of a corresponding device is switched. In addition, the room screen 703 displays a current on/off state of power of the corresponding device.

Figure 9:
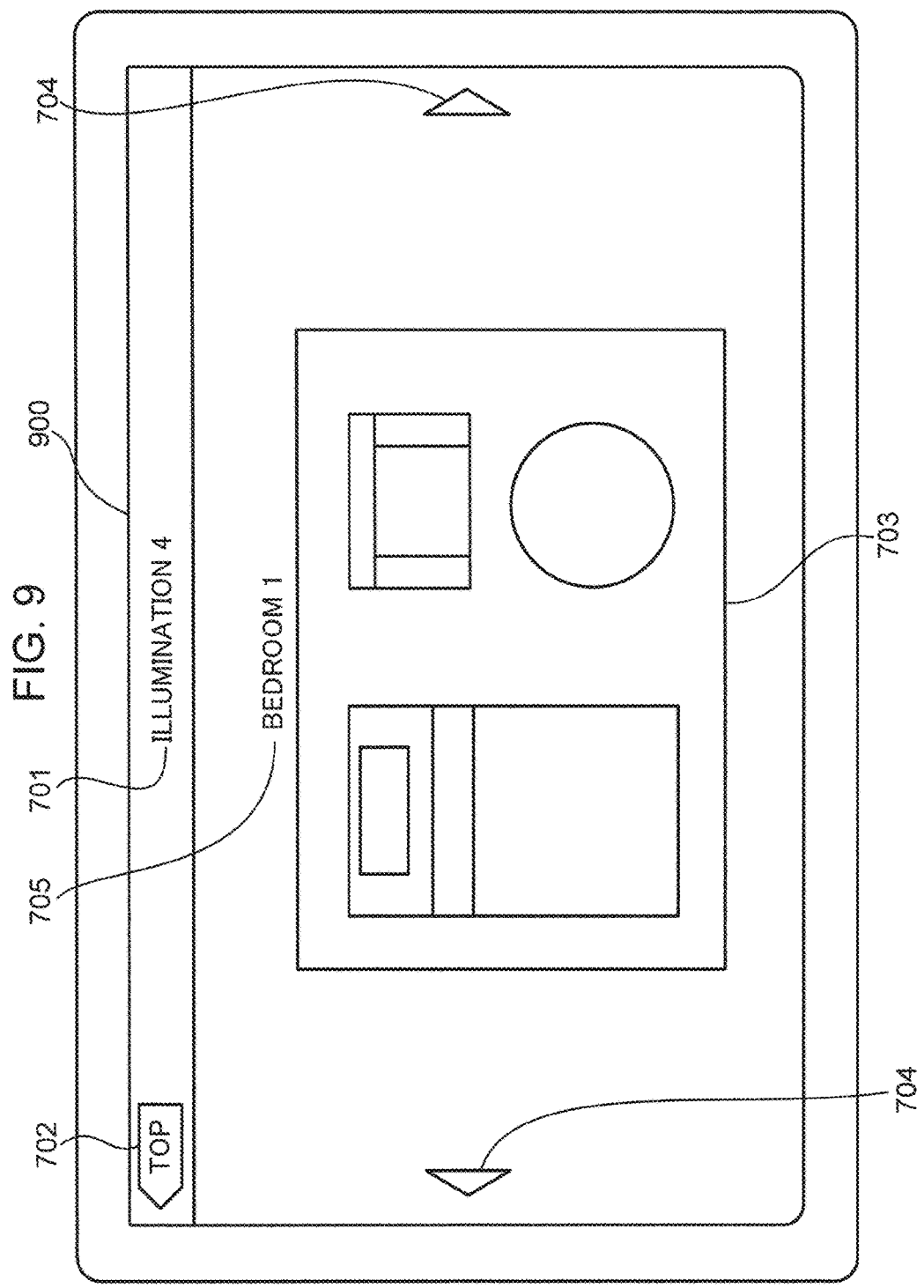
FIG. 9 is a diagram showing an example of a control screen in the first control pattern.
Figure 10:
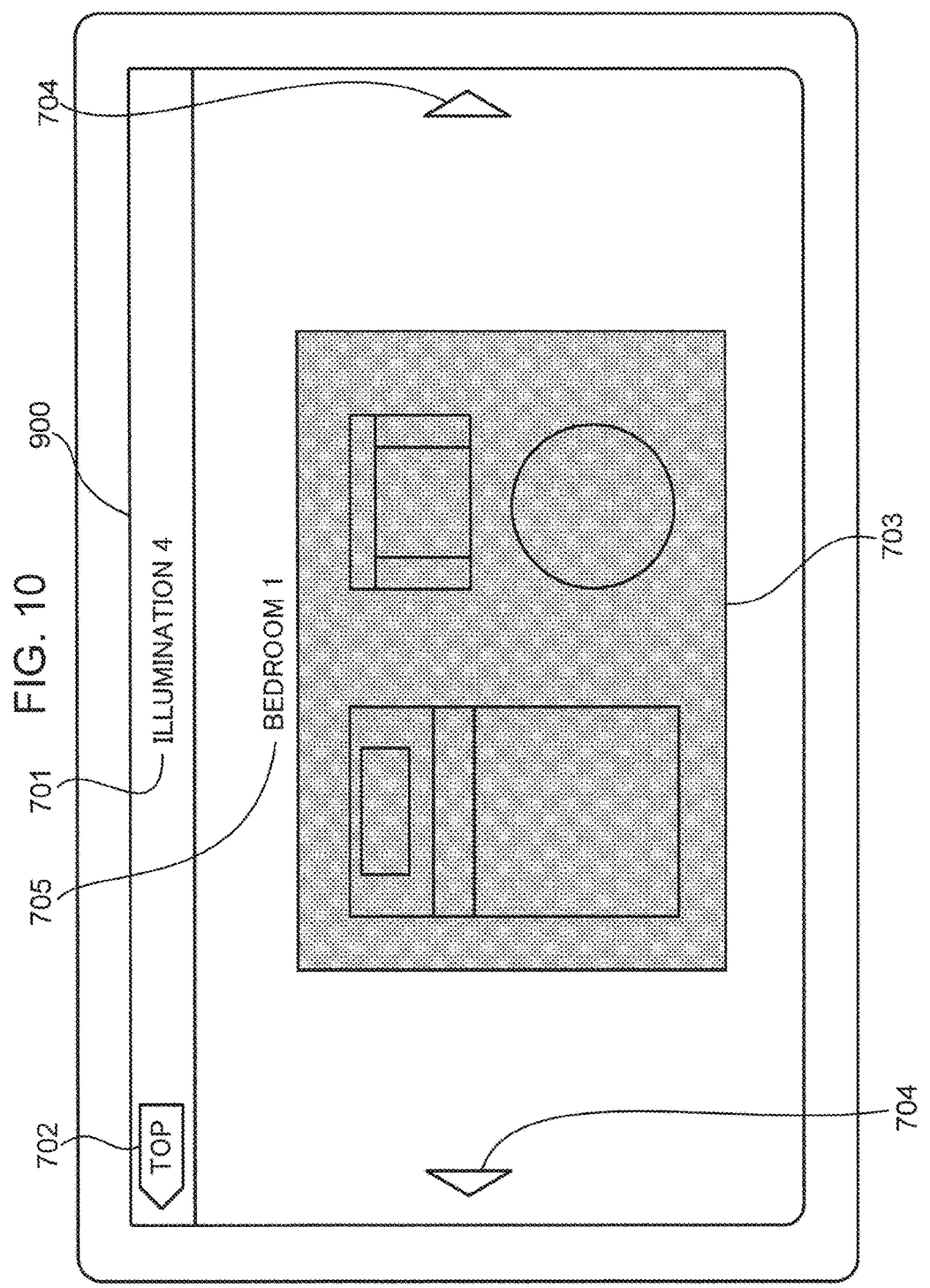
FIG. 10 is a diagram showing an example of a control screen in the first control pattern.

In the example shown in FIG. 7, the room screen 703 is displayed with brightness identical to the brightness of other regions (initial brightness). Accordingly, it is shown that power of an illumination device named "illumination 1" which is installed in a room with the description reading "living room" is turned on. In addition, in the example shown in FIG. 8, the room screen 703 is displayed with brightness lower than the brightness of the other regions. Accordingly, it is shown that the power of the illumination device named "illumination 1" is turned off. In a similar manner, the example in FIG. 9 shows that power of an illumination device named "illumination 4" which is installed in a room with the description reading "bedroom 1" is turned on and the example in FIG. 10 shows that power of the illumination device named "illumination 4" is turned off.

Figure 14:
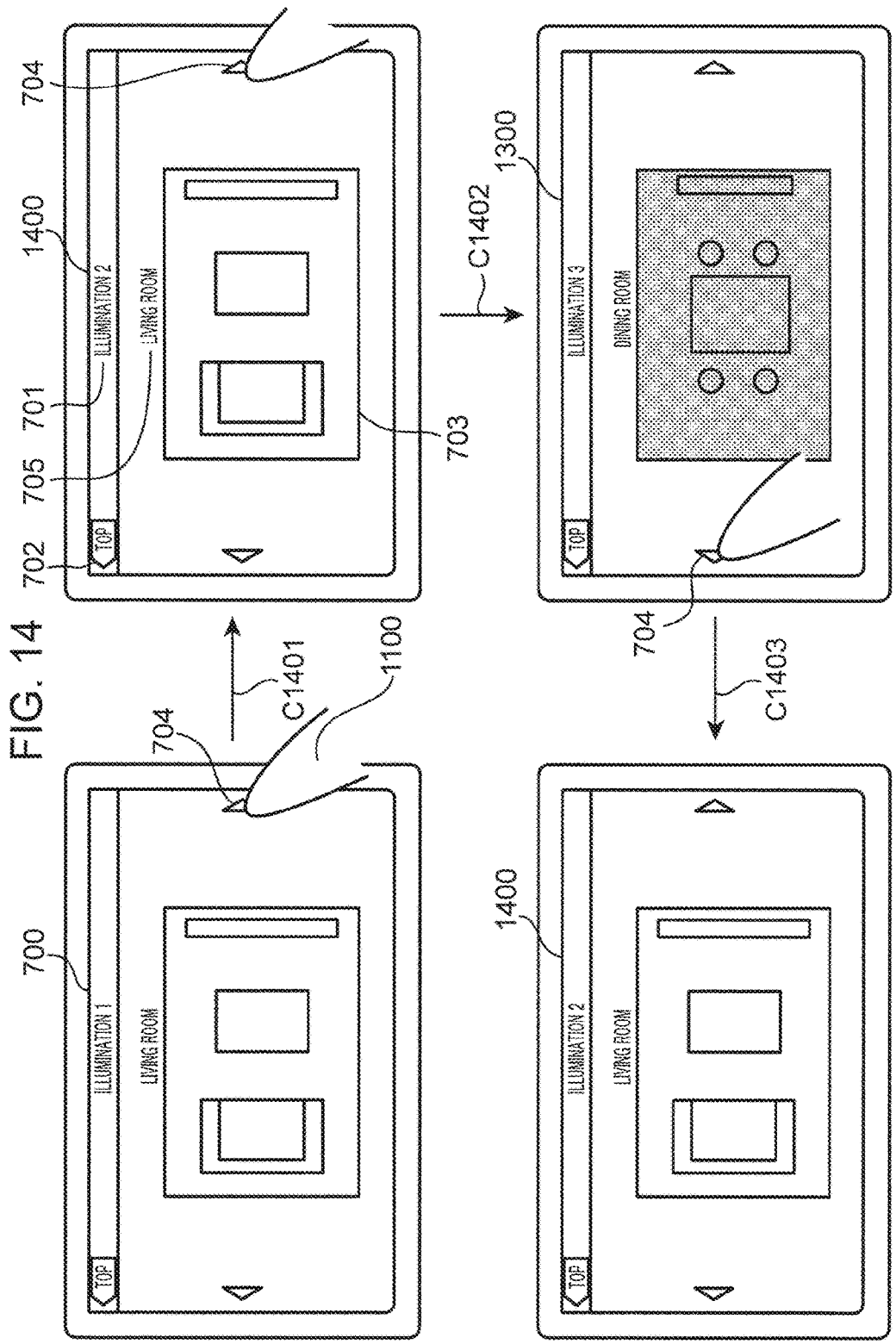
FIG. 14 is a diagram showing an example of a transition of a display screen due to a device switching button in the first control pattern.

The top screen switching button 702 is a button for switching the display screen on the display 101 of the home controller 100 to the top screen 600 (FIG. 6). As shown in FIG. 14 (to be described later), the device switching button 704 is a button for switching the device selection button 601 corresponding to a displayed control screen.

FIG. 11 is a diagram showing an example of a transition of the display screen on the display 101 of the home controller 100 in the first control pattern. An upper left diagram in FIG. 11 represents the top screen 600 shown in FIG. 6. An upper right diagram in FIG. 11 represents the control screen 700 shown in FIG. 7. A lower right diagram in FIG. 11 represents the control screen 700 shown in FIG. 8.

When the user taps a position which is inside a region of the uppermost device selection button 601 and which is outside a region of the simple control button 604 with a contact object 1100 on the top screen 600 shown in the upper left diagram in FIG. 11, the touch panel control section 102 detects the tapping. As a result, the display control section 103 switches the display screen from the top screen 600 shown in the upper left diagram in FIG. 11 to the control screen 700 shown in the upper right diagram in FIG. 11 (C1101).

As shown in the upper left diagram in FIG. 11, the simple control button 604 in the region tapped by the contact object 1100 is displayed as "ON". Therefore, the display control section 103 displays the room screen 703 (an example of the first room screen of the first aspect of the present disclosure) on the control screen 700 shown in the upper right diagram in FIG. 11 with brightness equal to the initial brightness.

When the user taps inside a region of the room screen 703 with the contact object 1100 on the control screen 700 that is shown in the upper right diagram in FIG. 11, the touch panel control section 102 detects the tapping. As a result, the device control section 106 generates a control command (an example of the first control command of the first aspect of the present disclosure) for turning off power of an illumination device named "illumination 1" (an example of the first illumination device). The communication control section 107 transmits the generated control command to the illumination device named "illumination 1". Accordingly, the power of the illumination device named "illumination 1" is turned off.

In addition, the display control section 103 switches the display screen from the control screen 700 shown in the upper right diagram in FIG. 11 to the control screen 700 shown in the lower right diagram in FIG. 11 (C1102). As shown in the lower right diagram in FIG. 11, the display control section 103 displays the room screen 703 with brightness lower than the initial brightness.

When the user taps inside a region of the room screen 703 with the contact object 1100 on the control screen 700 that is shown in the lower right diagram in FIG. 11, the touch panel control section 102 detects the tapping. As a result, the device control section 106 generates a control command (an example of the second control command of the first aspect of the present disclosure) for turning on power of the illumination device named "illumination 1" (an example of the first illumination device). The communication control section 107 transmits the generated control command to the illumination device named "illumination 1". Accordingly, the power of the illumination device named "illumination 1" is turned on.

Furthermore, the display control section 103 switches the display screen from the control screen 700 shown in the lower right diagram in FIG. 11 to the control screen 700 shown in the upper right diagram in FIG. 11 (C1103). As shown in the upper right diagram in FIG. 11, the display control section 103 displays the room screen 703 with brightness equal to the initial brightness.

Figure 12:
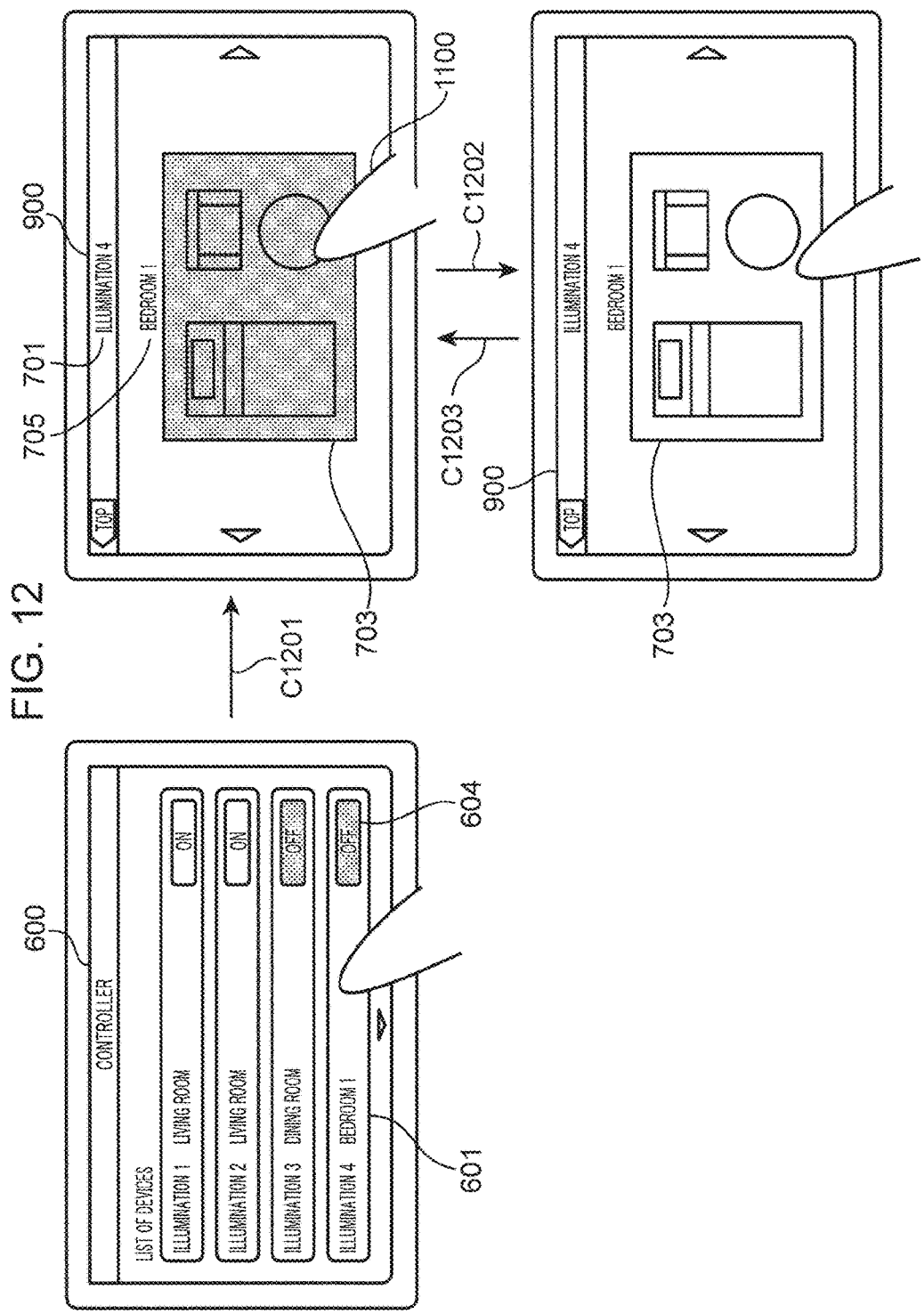
FIG. 12 is a diagram showing another example of a transition of a display screen in the first control pattern.

FIG. 12 is a diagram showing another example of a transition of the display screen on the display 101 of the home controller 100 in the first control pattern. An upper left diagram in FIG. 12 represents the top screen 600 shown in FIG. 6. An upper right diagram in FIG. 12 represents the control screen 900 shown in FIG. 10. A lower right diagram in FIG. 12 represents the control screen 900 shown in FIG. 9.

When the user taps a position which is inside a region of the lowermost device selection button 601 and which is outside a region of the simple control button 604 with the contact object 1100 on the top screen 600 shown in the upper left diagram in FIG. 12, the touch panel control section 102 detects the tapping. As a result, the display control section 103 switches the display screen from the top screen 600 shown in the upper left diagram in FIG. 12 to the control screen 900 shown in the upper right diagram in FIG. 12 (C1201).

As shown in the upper left diagram in FIG. 12, the simple control button 604 in the region tapped by the contact object 1100 is displayed as "OFF". Therefore, the display control section 103 displays the room screen 703 (an example of the second room screen of the first aspect of the present disclosure) on the control screen 900 shown in the upper right diagram in FIG. 12 with brightness lower than the initial brightness.

When the user taps inside a region of the room screen 703 with the contact object 1100 on the control screen 900 that is shown in the upper right diagram in FIG. 12, the touch panel control section 102 detects the tapping. As a result, the device control section 106 generates a control command (an example of the fourth control command of the first aspect of the present disclosure) for turning on power of the illumination device named "illumination 4" (an example of the second illumination device). The communication control section 107 transmits the generated control command to the illumination device named "illumination 4". Accordingly, the power of the illumination device named "illumination 4" is turned on.

In addition, the display control section 103 switches the display screen from the control screen 900 shown in the upper right diagram in FIG. 12 to the control screen 900 shown in the lower right diagram in FIG. 12 (C1202). As shown in the lower right diagram in FIG. 12, the display control section 103 displays the room screen 703 with brightness equal to the initial brightness.

When the user taps inside a region of the room screen 703 with the contact object 1100 on the control screen 900 that is shown in the lower right diagram in FIG. 12, the touch panel control section 102 detects the tapping. As a result, the device control section 106 generates a control command (an example of the third control command of the first aspect of the present disclosure) for turning off power of the illumination device named "illumination 4" (an example of the second illumination device). The communication control section 107 transmits the generated control command to the illumination device named "illumination 4". Accordingly, the power of the illumination device named "illumination 4" is turned off.

Furthermore, the display control section 103 switches the display screen from the control screen 900 shown in the lower right diagram in FIG. 12 to the control screen 900 shown in the upper right diagram in FIG. 12 (C1203). As shown in the upper right diagram in FIG. 12, the display control section 103 displays the room screen 703 with brightness lower than the initial brightness.

Figure 13:
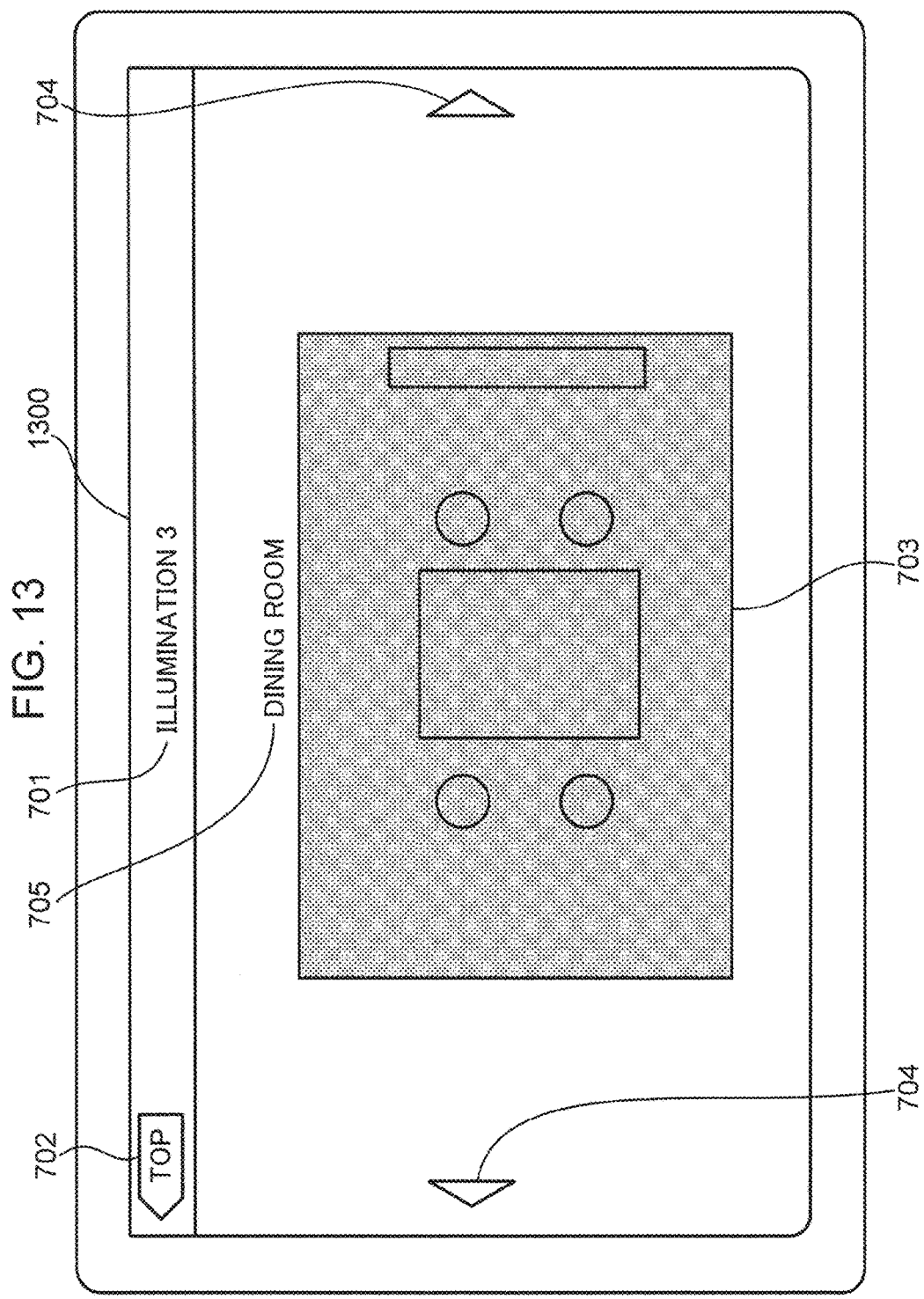
FIG. 13 is a diagram showing another example of a control screen in the first control pattern.

FIG. 13 is a diagram showing another example of a control screen displayed on the display 101 of the home controller 100. A control screen 1300 shown in FIG. 13 includes the device name 701, the location name 705, the room screen 703, the top screen switching button 702, and the device switching button 704 in a similar manner to the control screens shown in FIGS. 7 to 10. In the example shown in FIG. 13, "illumination 3" is indicated as the device name 701 and "dining room" is indicated as the location name 705. In other words, the control screen 1300 shown in FIG. 13 corresponds to the third-from-top device selection button 601 shown in FIG. 6.

"OFF" is displayed for the simple control button 604 of the third-from-top device selection button 601 shown in FIG. 6. Therefore, as shown in FIG. 13, the display control section 103 displays the room screen 703 on the control screen 700 with brightness lower than the initial brightness.

FIG. 14 is a diagram showing an example of a transition due to the device switching button 704 of the display screen on the display 101 of the home controller 100. An upper left diagram in FIG. 14 represents the control screen 700 shown in FIG. 7. A lower right diagram in FIG. 14 represents the control screen 1300 shown in FIG. 13.

The control screen 700 (FIG. 7) shown in the upper left diagram in FIG. 14 corresponds to the uppermost device selection button 601 shown in FIG. 6. The control screen 1300 (FIG. 13) shown in the lower right diagram in FIG. 14 corresponds to the third-from-top device selection button 601 shown in FIG. 6 as described above.

A control screen 1400 shown in an upper right diagram in FIG. 14 and a lower left diagram in FIG. 14 includes the device name 701, the location name 705, the room screen 703, the top screen switching button 702, and the device switching button 704 in a similar manner to the control screens shown in FIGS. 7 to 10. On the control screen 1400 shown in the upper right diagram in FIG. 14 and the lower left diagram in FIG. 14, "illumination 2" is indicated as the device name 701 and "living room" is indicated as the location name 705. In other words, the control screen 1400 shown in the upper right diagram in FIG. 14 and the lower left diagram in FIG. 14 corresponds to the second-from-top device selection button 601 shown in FIG. 6.

"ON" is displayed for the simple control button 604 of the second-from-top device selection button 601 shown in FIG. 6. Therefore, as shown in the upper right diagram in FIG. 14 and the lower left diagram in FIG. 14, the display control section 103 displays the room screen 703 on the control screen 1400 with brightness equal to the initial brightness.

When the user taps the right-side device switching button 704 with the contact object 1100 on the control screen 700 that is shown in the upper left diagram in FIG. 14, the touch panel control section 102 detects the tapping. As a result, the display control section 103 switches the display screen from the control screen 700 shown in the upper left diagram in FIG. 14 to the control screen 1400 shown in the upper right diagram in FIG. 14 (C1401). In other words, the display screen makes a transition from the control screen 700 corresponding to the uppermost device selection button 601 shown in FIG. 6 to the control screen 1400 corresponding to the second-from-top device selection button 601 shown in FIG. 6.

When the user taps the right-side device switching button 704 with the contact object 1100 on the control screen 1400 that is shown in the upper right diagram in FIG. 14, the touch panel control section 102 detects the tapping. As a result, the display control section 103 switches the display screen from the control screen 1400 shown in the upper right diagram in FIG. 14 to the control screen 1300 shown in the lower right diagram in FIG. 14 (C1402). In other words, the display screen makes a transition from the control screen 1400 corresponding to the second-from-top device selection button 601 shown in FIG. 6 to the control screen 1300 corresponding to the third-from-top device selection button 601 shown in FIG. 6.

When the user taps a left-side device switching button 704 with the contact object 1100 on the control screen 1300 that is shown in the lower right diagram in FIG. 14, the touch panel control section 102 detects the tapping. As a result, the display control section 103 switches the display screen from the control screen 1300 shown in the lower right diagram in FIG. 14 to the control screen 1400 shown in the lower left diagram in FIG. 14 (C1403). In other words, the display screen makes a transition from the control screen 1300 corresponding to the third-from-top device selection button 601 shown in FIG. 6 to the control screen 1400 corresponding to the second-from-top device selection button 601 shown in FIG. 6.

As shown, when the device switching button 704 is tapped, control screens corresponding to the device selection buttons 601 are displayed in an order of the device selection buttons 601 arranged in a single vertical row on the top screen 600 shown in FIG. 6. When the right-side device switching button 704 is tapped, the device selection button 601 (FIG. 6) to be displayed moves downward, and when the left-side device switching button 704 is tapped, the device selection button 601 (FIG. 6) to be displayed moves upward.

As described above, in the first control pattern, when the user taps the device selection button 601 provided for each device 200 with the contact object 1100, the room screen 703 in which a corresponding device is installed is displayed on the display 101. The room screen 703 is displayed with brightness equal to the initial brightness if power of the corresponding device is in an on-state and is displayed with brightness lower than the initial brightness when power of the corresponding device is in an off-state. Accordingly, an on/off state of power of the corresponding device can be identified immediately.

In addition, when the room screen 703 is tapped, on/off of power of the corresponding device is switched. Accordingly, there is no need to separately provide an operation button for turning power on/off on the control screen 700. As a result, display materials to be displayed on the control screen 700 with a limited display area can be minimized.

Moreover, the brightness of the room screen 703 which displays an on/off state of power of a corresponding device is not limited to those described above. When power of a corresponding device is in an on-state, the brightness of the room screen 703 may be set to brightness that is higher than the brightness of other regions (initial brightness), and when the power of a corresponding device is in an off-state, the brightness of the room screen 703 may be set to brightness equal to the brightness of other regions (initial brightness) or to brightness lower than the brightness of other regions (initial brightness). Even in this case, an on/off state of power of a corresponding device can be identified immediately.

(Second Control Pattern)

Next, a second control pattern will be described. The second control pattern is a control pattern in which devices are controlled per room.

Figure 15:
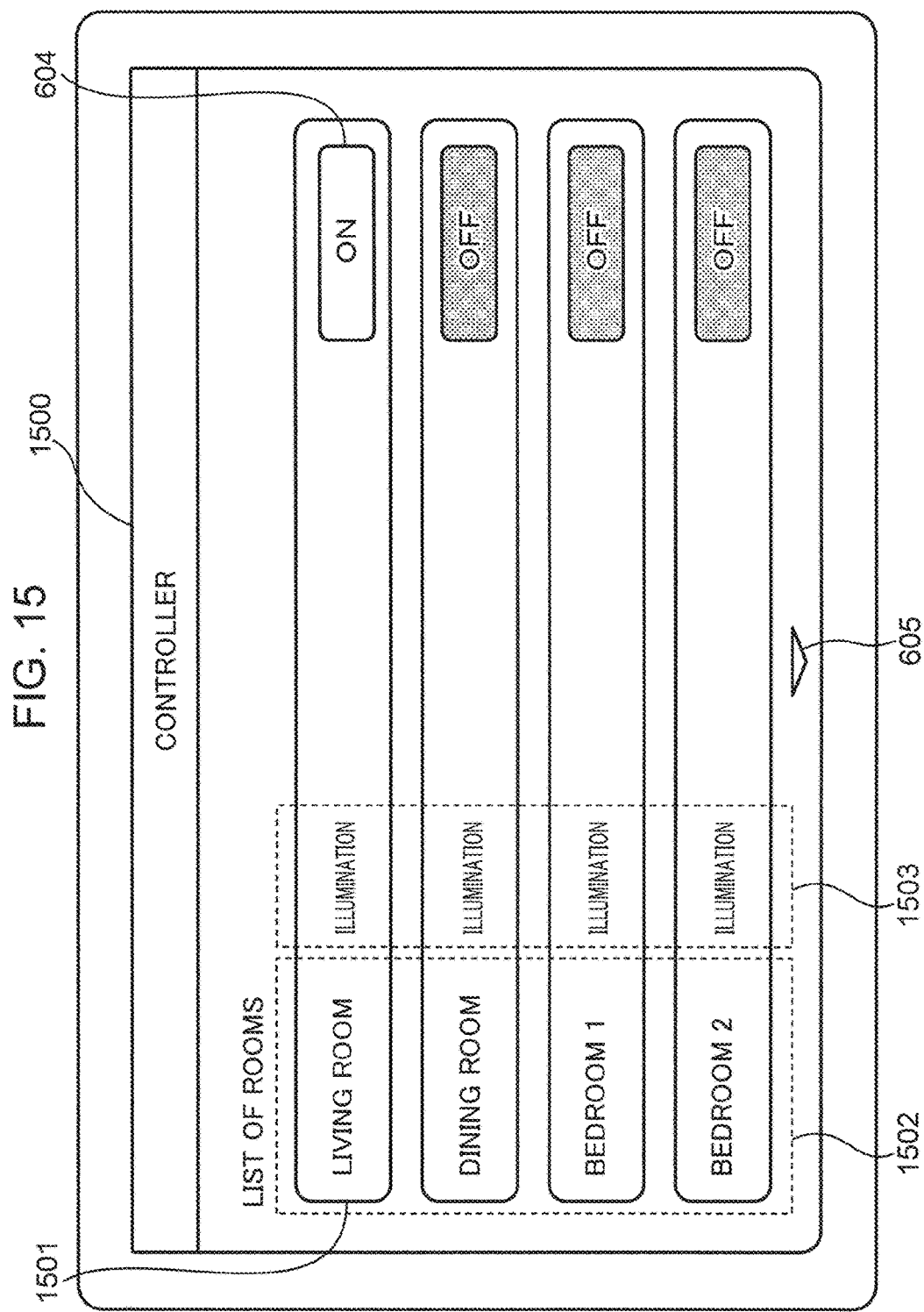
FIG. 15 is a diagram showing an example of a top screen in a second control pattern.

FIG. 15 is a diagram showing an example of a top screen 1500 that is displayed on the display 101 of the home controller 100 in the second control pattern. The top screen 1500 (an example of the display screen) is a top screen of the home control system. The top screen 1500 shown in FIG. 15 is a screen that is displayed on the display 101 of the home controller 100 when the controller application icon 501 is tapped on the basic screen 500 in the second control pattern.

A heading that reads "controller" is displayed in an upper part of the top screen 1500 to indicate that the screen is a screen of the home control system. Characters reading "list of rooms" are displayed at a left end below the heading to explicitly indicate that a list of devices that can be controlled by the home control system is displayed below in room units.

Room selection buttons 1501 are displayed in a single vertical row below the characters reading "list of rooms". The room selection button 1501 is a button for selecting a device to be a control target in room units. The room selection button 1501 includes a room name 1502, a device name 1503, and the simple control button 604. The next page button 605 is displayed in a lower part of the top screen 1500. The simple control button 604 and the next page button 605 are the same as the simple control button 604 and the next page button 605 on the top screen 600 shown in FIG. 6.

The room name 1502 represents a name of a room. The device name 1503 represents a name of a device that is installed in the room represented by the room name 1502. In the example shown in FIG. 15, "living room", "dining room", "bedroom 1", and "bedroom 2" are displayed as room names 1502. In addition, "illumination, "illumination", "illumination", and "illumination" are displayed as device names 1503 to respectively correspond to the "living room", the "dining room", the "bedroom 1", and the "bedroom 2".

When the room selection buttons 1501 are advanced to a next page or scrolled using the next page button 605, for example, another room selection button 1501 with "living room" as the room name 1502 and "air conditioner" as the device name 1503 is displayed on the top screen 1500.

FIGS. 16 to 19 are, respectively, diagrams showing an example of a control screen that is displayed on the display 101 of the home controller 100. When a position which is inside a region of the room selection button 1501 and which is outside a region of the simple control button 604 is tapped by a contact object on the top screen 1500 shown in FIG. 15, the touch panel control section 102 detects the tapping. As a result, the display control section 103 displays the control screens shown in FIGS. 16 to 19.

Figure 16:
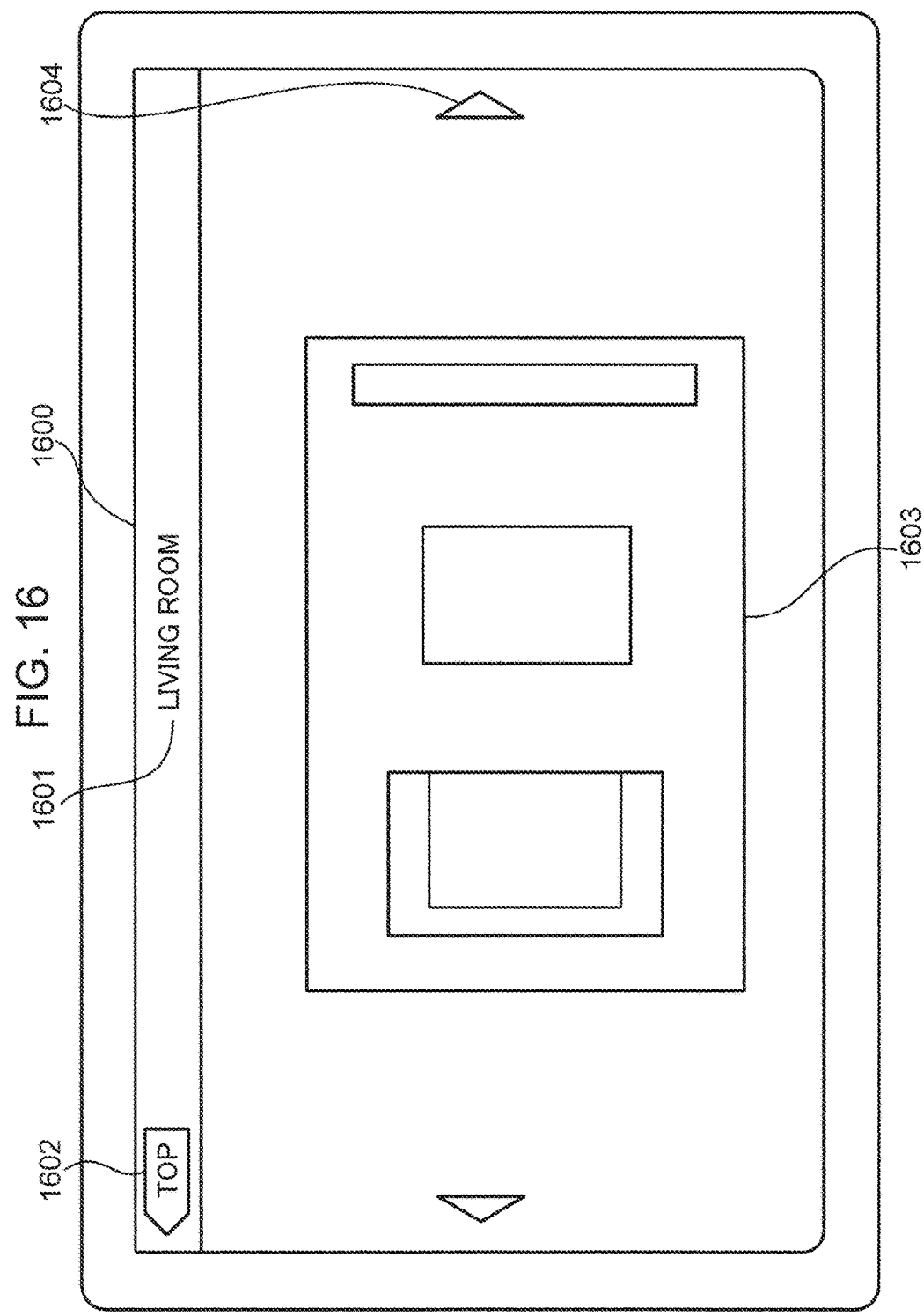
FIG. 16 is a diagram showing an example of a control screen in the second control pattern.
Figure 17:
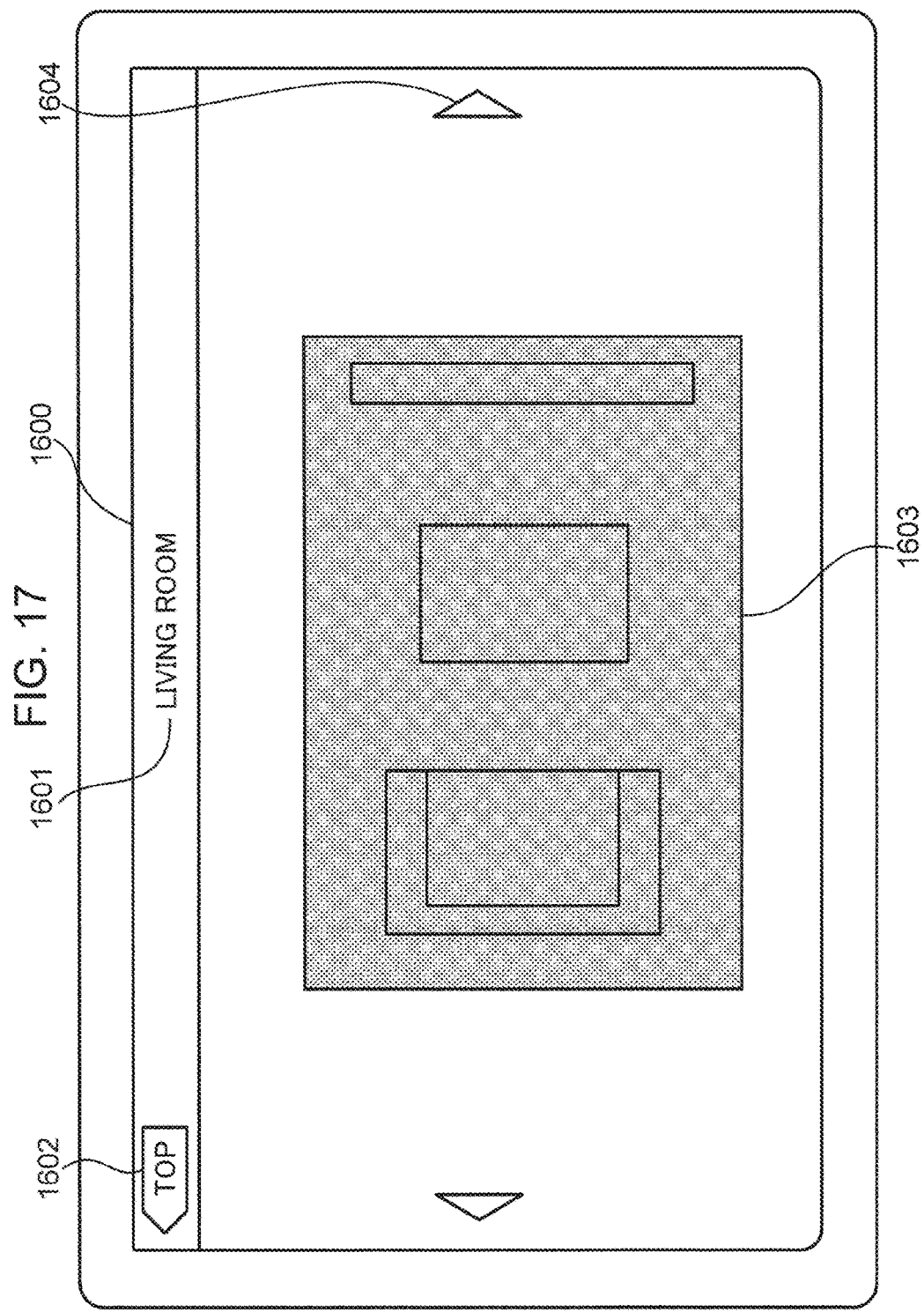
FIG. 17 is a diagram showing an example of a control screen in the second control pattern.

A control screen 1600 shown in FIGS. 16 and 17 includes a room name 1601, a room screen 1603, a top screen switching button 1602, and a room switching button 1604. A control screen 1800 shown in FIGS. 18 and 19 includes the room name 1601, the room screen 1603, the top screen switching button 1602, and the room switching button 1604 in a similar manner to the control screen 1600 shown in FIGS. 16 and 17.

For example, when the user taps the uppermost room selection button 1501 on the top screen 1500 shown in FIG. 15, since the room name 1502 and the device name 1503 are associated with each other on the top screen 1500, the user is aware that a device that is an operation target is an illumination device. Therefore, the control screens shown in FIGS. 16 to 19 do not include device names. Alternatively, device names may be displayed on the control screens shown in FIGS. 16 to 19 by the display control section 103.

Figure 18:
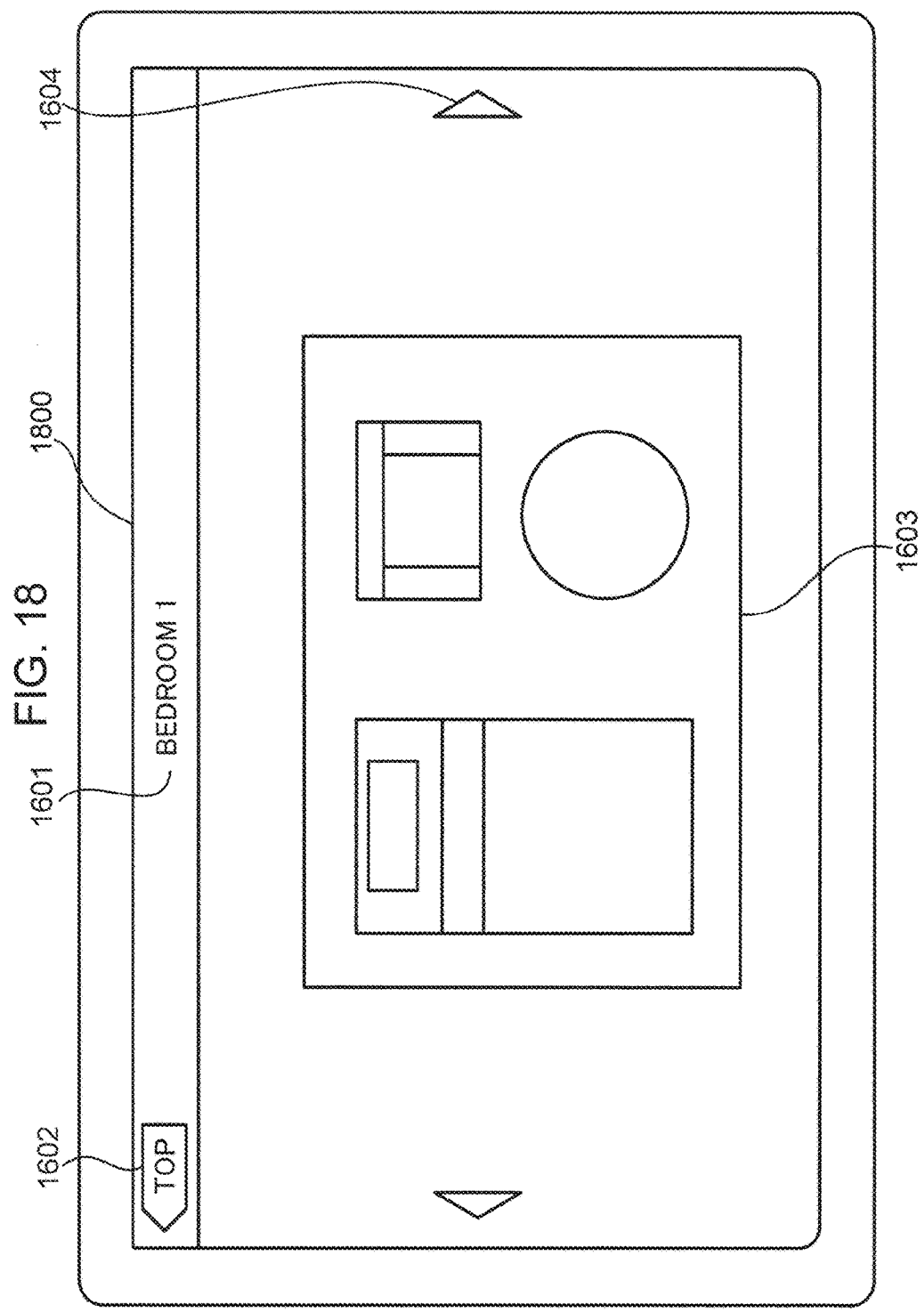
FIG. 18 is a diagram showing an example of a control screen in the second control pattern.
Figure 19:
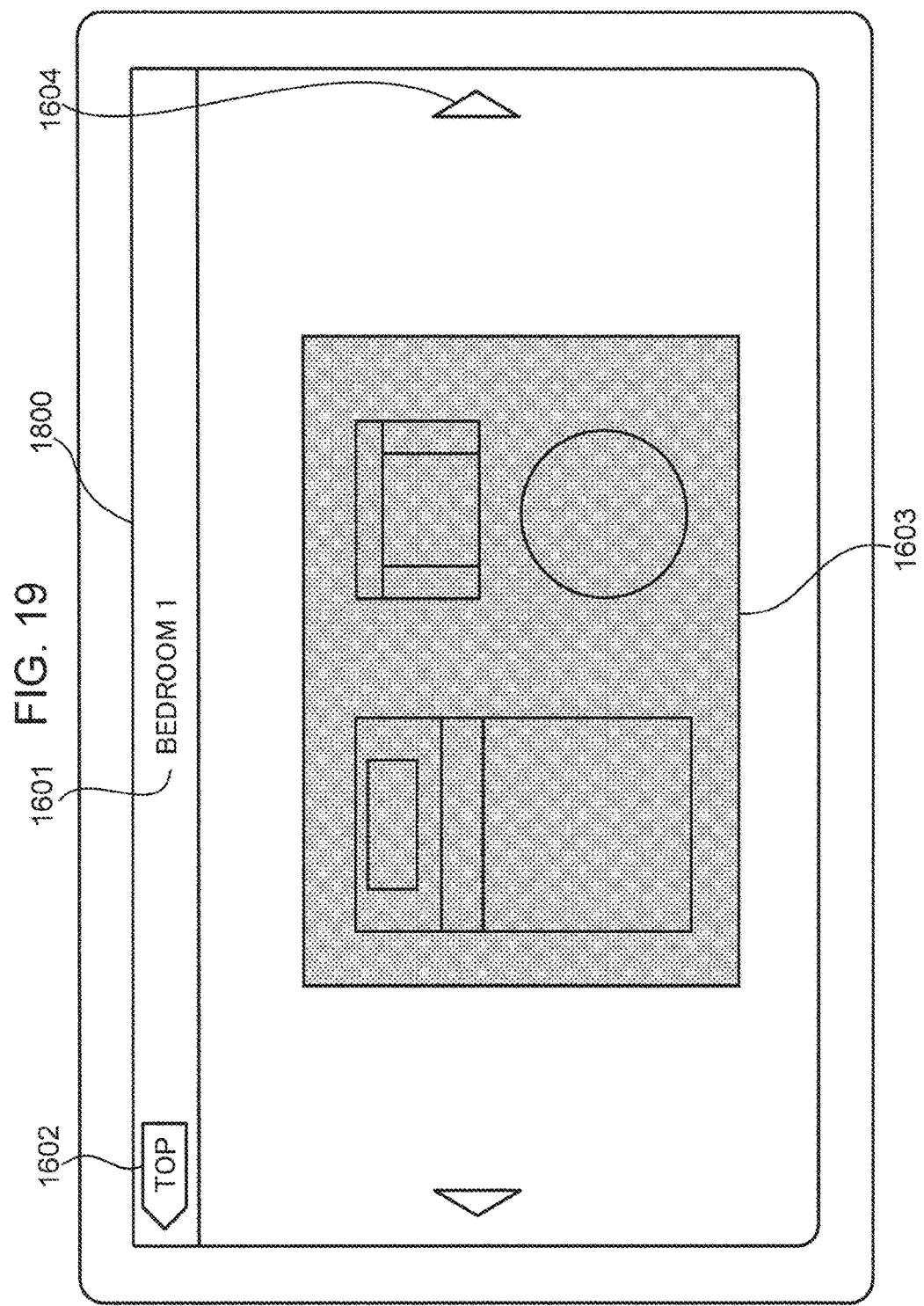
FIG. 19 is a diagram showing an example of a control screen in the second control pattern.

The room name 1601 corresponds to the room name 1502 on the top screen 1500 shown in FIG. 15. In the example shown in FIGS. 16 and 17, "living room" is displayed as the room name 1601. When the uppermost room selection button 1501 shown in FIG. 15 is selected, the control screen 1600 shown in FIGS. 16 and 17 is displayed. In the example shown in FIGS. 18 and 19, "bedroom 1" is displayed as the room name 1601. When the third-from-top room selection button 1501 shown in FIG. 15 is selected, the control screen 1800 shown in FIGS. 18 and 19 is displayed.

The room screen 1603 is a screen showing a layout of a room corresponding to the room name 1601 as viewed down from a ceiling side. When the room screen 1603 is tapped by the user, on/off of power of devices installed in the room is switched in room units. For example, in a case where two or more illumination devices are installed in the room and power of at least one illumination device is in an on-state, when inside a region of the room screen 1603 is tapped by the user, power of the illumination device in an on-state is turned off. For example, in a case where two or more illumination devices are installed in the room and power of all of the illumination devices is in an on-state or an off-state, when inside a region of the room screen 1603 is tapped by the user, on/off of power of all illumination devices is switched.

In addition, the room screen 1603 displays a current on/off state of power of devices installed in a room in room units. For example, in a case where two or more devices are installed in the room, the room screen 1603 displays power to be in an on-state if power of even one device installed in the room is in an on-state, and displays power to be in an off-state if power of all of the devices installed in the room is in an off-state.

In the example shown in FIG. 16, the room screen 1603 is displayed with brightness identical to the brightness of other regions (initial brightness). Accordingly, it is shown that power of at least one illumination device among illumination devices installed in a room with the description reading "living room" is turned on. In addition, in the example shown in FIG. 17, the room screen 1603 is displayed with brightness lower than the brightness of the other regions. Accordingly, it is shown that power of all of the illumination devices installed in the room with the description reading "living room" is turned off.

In a similar manner, the example in FIG. 18 shows that power of at least one illumination device among illumination devices installed in a room with the description reading "bedroom 1" is turned on. The example in FIG. 19 shows that power of all of the illumination devices installed in the room with the description reading "bedroom 1" is turned off.

Figure 23:
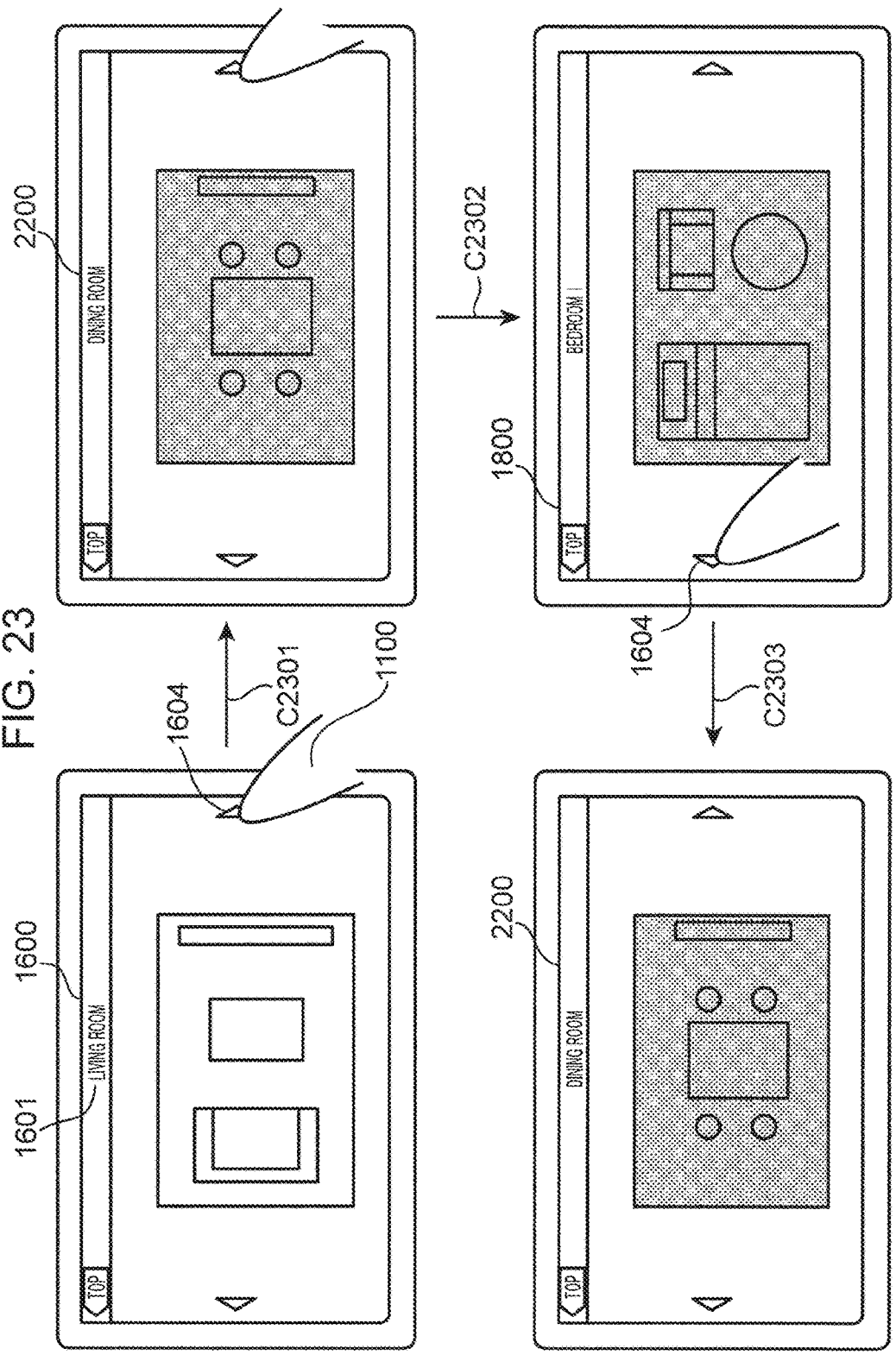
FIG. 23 is a diagram showing an example of a transition of a display screen due to a room switching button in the second control pattern.

The top screen switching button 1602 is a button for switching the display screen on the display 101 of the home controller 100 to the top screen 1500 (FIG. 15). As shown in FIG. 23 (to be described later), the room switching button 1604 is a button for switching the room selection button 1501 corresponding to a displayed control screen.

Figure 20:
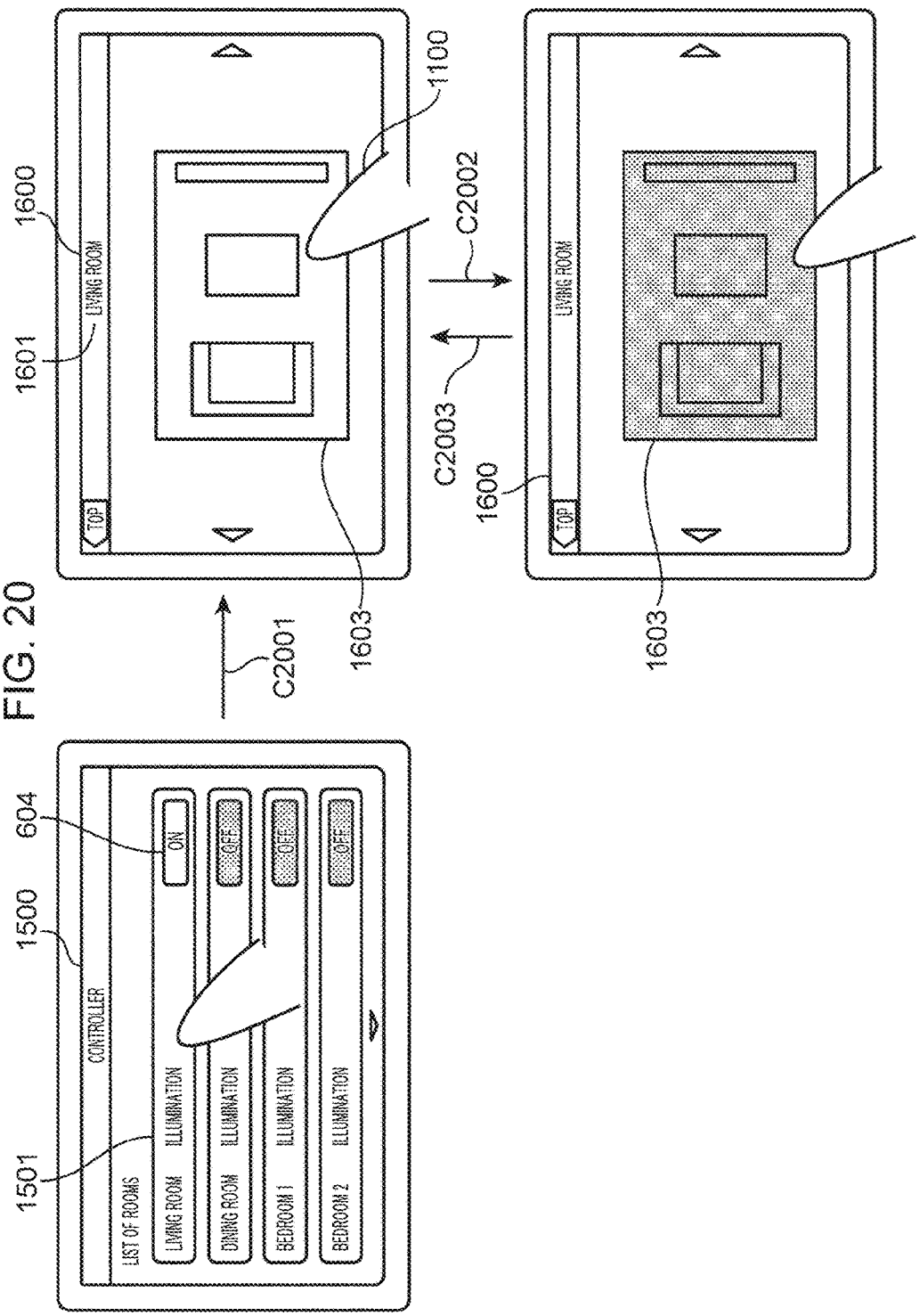
FIG. 20 is a diagram showing an example of a transition of a display screen in the second control pattern.

FIG. 20 is a diagram showing an example of a transition of the display screen on the display 101 of the home controller 100 in the second control pattern. An upper left diagram in FIG. 20 represents the top screen 1500 shown in FIG. 15. An upper right diagram in FIG. 20 represents the control screen 1600 shown in FIG. 16. A lower right diagram in FIG. 20 represents the control screen 1600 shown in FIG. 17.

When the user taps a position which is inside a region of the uppermost room selection button 1501 and which is outside a region of the simple control button 604 with the contact object 1100 on the top screen 1500 shown in the upper left diagram in FIG. 20, the touch panel control section 102 detects the tapping. As a result, the display control section 103 switches the display screen from the top screen 1500 shown in the upper left diagram in FIG. 20 to the control screen 1600 shown in the upper right diagram in FIG. 20 (C2001).

As shown in the upper left diagram in FIG. 20, the simple control button 604 in the region tapped by the contact object 1100 is displayed as "ON". In other words, power of at least one illumination device among illumination devices installed in a room with the description reading "living room" is turned on. Therefore, the display control section 103 displays the room screen 1603 (an example of the first room screen of the second aspect of the present disclosure) on the control screen 1600 shown in the upper right diagram in FIG. 20 with brightness equal to the initial brightness.

When the user taps inside a region of the room screen 1603 with the contact object 1100 on the control screen 1600 that is shown in the upper right diagram in FIG. 20, the touch panel control section 102 detects the tapping. As a result, the device control section 106 generates a control command (an example of the first control command of the second aspect of the present disclosure) for turning off power of all of the illumination devices that are installed in the room with the description reading "living room". The communication control section 107 transmits the generated control command to all of the illumination devices that are installed in the room with the description reading "living room". Accordingly, power of all of the illumination devices installed in the room with the description reading "living room" is turned off.

In addition, the display control section 103 switches the display screen from the control screen 1600 shown in the upper right diagram in FIG. 20 to the control screen 1600 shown in the lower right diagram in FIG. 20 (C2002). As shown in the lower right diagram in FIG. 20, the display control section 103 displays the room screen 1603 with brightness lower than the initial brightness.

When the user taps inside a region of the room screen 1603 with the contact object 1100 on the control screen 1600 that is shown in the lower right diagram in FIG. 20, the touch panel control section 102 detects the tapping. As a result, the device control section 106 generates a control command (an example of the second control command of the second aspect of the present disclosure) for turning on power of all of the illumination devices that are installed in the room with the description reading "living room". The communication control section 107 transmits the generated control command to all of the illumination devices that are installed in the room with the description reading "living room". Accordingly, power of all of the illumination devices installed in the room with the description reading "living room" is turned on.

Furthermore, the display control section 103 switches the display screen from the control screen 1600 shown in the lower right diagram in FIG. 20 to the control screen 1600 shown in the upper right diagram in FIG. 20 (C2003). As shown in the upper right diagram in FIG. 20, the display control section 103 displays the room screen 1603 with brightness equal to the initial brightness.

Figure 21:
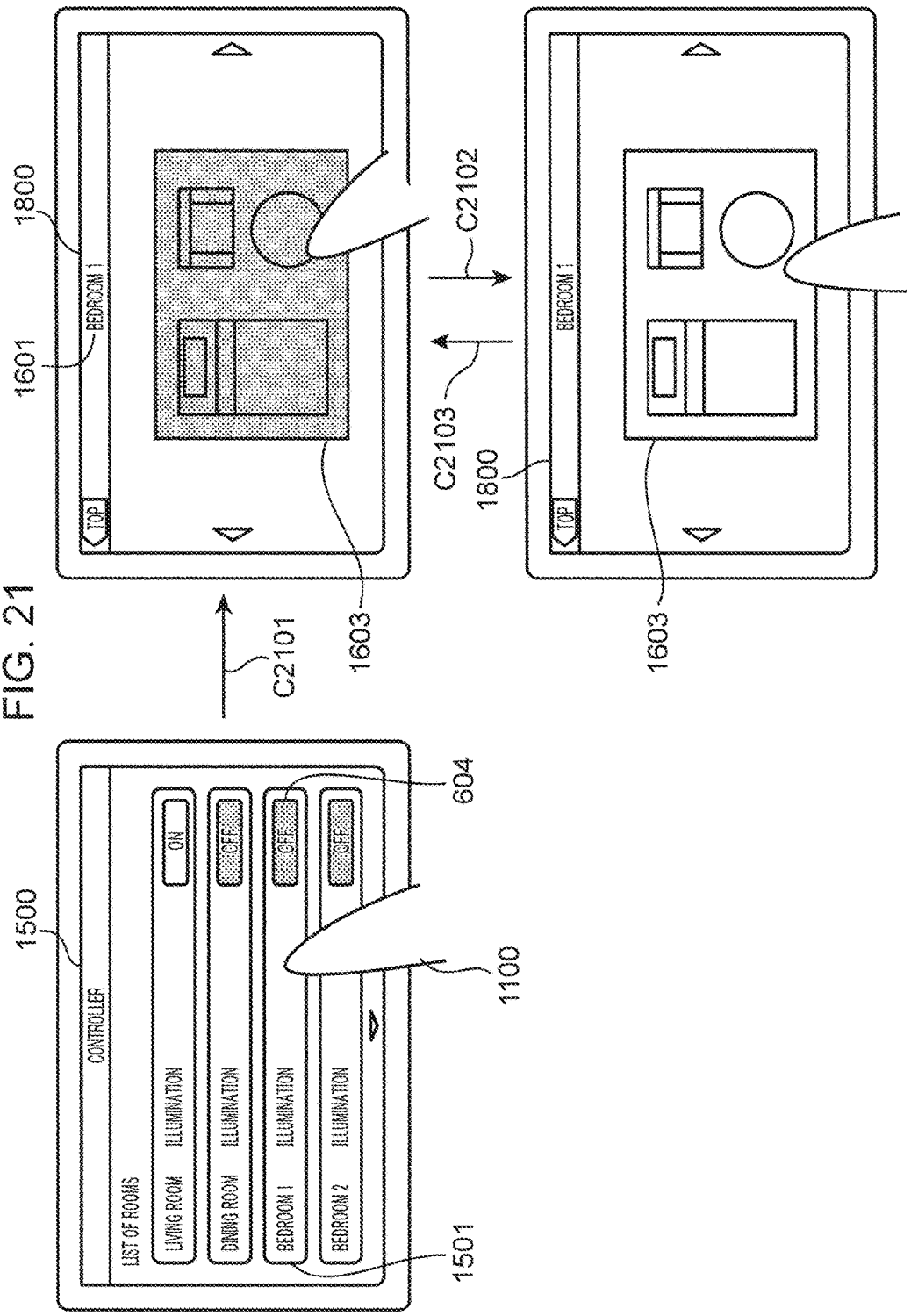
FIG. 21 is a diagram showing another example of a transition of a display screen in the second control pattern.

FIG. 21 is a diagram showing another example of a transition of the display screen on the display 101 of the home controller 100 in the second control pattern. An upper left diagram in FIG. 21 represents the top screen 1500 shown in FIG. 15. An upper right diagram in FIG. 21 represents the control screen 1800 shown in FIG. 19. A lower right diagram in FIG. 21 represents the control screen 1800 shown in FIG. 18.

When the user taps a position which is inside a region of the third-from-top room selection button 1501 and which is outside a region of the simple control button 604 with the contact object 1100 on the top screen 1500 shown in the upper left diagram in FIG. 21, the touch panel control section 102 detects the tapping. As a result, the display control section 103 switches the display screen from the top screen 1500 shown in the upper left diagram in FIG. 21 to the control screen 1800 shown in the upper right diagram in FIG. 21 (C2101).

As shown in the upper left diagram in FIG. 21, the simple control button 604 of the third-from-top room selection button 1501 tapped by the contact object 1100 is displayed as "OFF". Therefore, the display control section 103 displays the room screen 1603 (an example of the second room screen of the second aspect of the present disclosure) on the control screen 1800 shown in the upper right diagram in FIG. 21 with brightness lower than the initial brightness.

When the user taps inside a region of the room screen 1603 with the contact object 1100 on the control screen 1800 that is shown in the upper right diagram in FIG. 21, the touch panel control section 102 detects the tapping. As a result, the device control section 106 generates a control command (an example of the fourth control command of the second aspect of the present disclosure) for turning on power of all of the illumination devices that are installed in the room with the description reading "bedroom 1". The communication control section 107 transmits the generated control command to all of the illumination devices that are installed in the room with the description reading "bedroom 1". Accordingly, power of all of the illumination devices installed in the room with the description reading "bedroom 1" is turned on.

In addition, the display control section 103 switches the display screen from the control screen 1800 shown in the upper right diagram in FIG. 21 to the control screen 1800 shown in the lower right diagram in FIG. 21 (C2102). As shown in the lower right diagram in FIG. 21, the display control section 103 displays the room screen 1603 with brightness equal to the initial brightness.

When the user taps inside a region of the room screen 1603 with the contact object 1100 on the control screen 1800 that is shown in the lower right diagram in FIG. 21, the touch panel control section 102 detects the tapping. As a result, the device control section 106 generates a control command (an example of the third control command of the second aspect of the present disclosure) for turning off power of all of the illumination devices that are installed in the room with the description reading "bedroom 1". The communication control section 107 transmits the generated control command to all of the illumination devices that are installed in the room with the description reading "bedroom 1". Accordingly, power of all of the illumination devices installed in the room with the description reading "bedroom 1" is turned off.

Furthermore, the display control section 103 switches the display screen from the control screen 1800 shown in the lower right diagram in FIG. 21 to the control screen 1800 shown in the upper right diagram in FIG. 21 (C2103). As shown in the upper right diagram in FIG. 21, the display control section 103 displays the room screen 1603 with brightness lower than the initial brightness.

Figure 22:
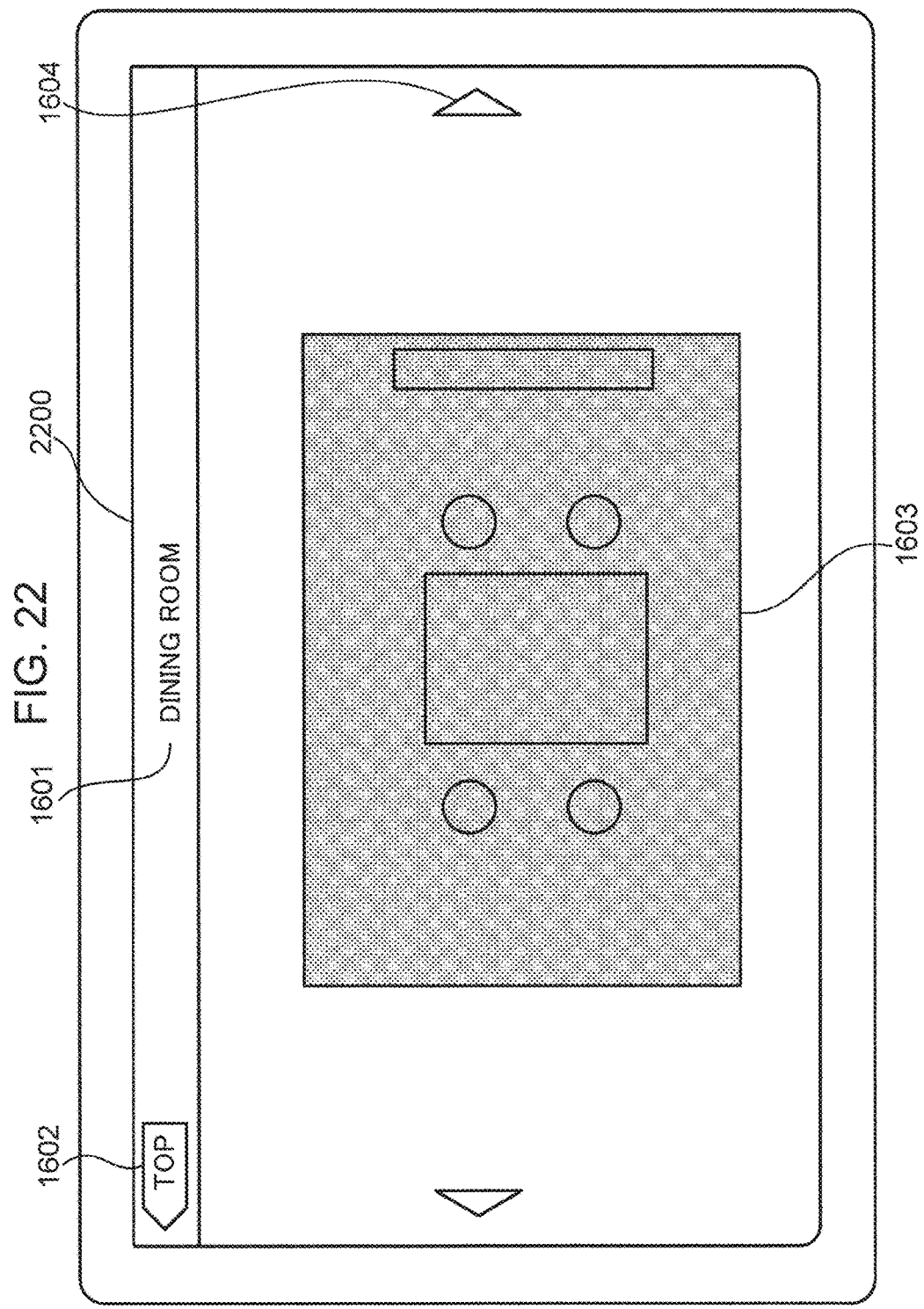
FIG. 22 is a diagram showing another example of a control screen in the second control pattern.

FIG. 22 is a diagram showing another example of a control screen displayed on the display 101 of the home controller 100. A control screen 2200 shown in FIG. 22 includes the room name 1601, the room screen 1603, the top screen switching button 1602, and the room switching button 1604 in a similar manner to the control screens shown in FIGS. 16 to 19.

In the example shown in FIG. 22, "dining room" is indicated as the room name 1601. When the second-from-top room selection button 1501 with "dining room" as the room name 1502 shown in FIG. 15 is selected, the control screen 2200 shown in FIG. 22 is displayed.

"OFF" is displayed for the simple control button 604 of the second-from-top room selection button 1501 shown in FIG. 15. Therefore, as shown in FIG. 22, the display control section 103 displays the room screen 1603 on the control screen 2200 with brightness lower than the initial brightness.

FIG. 23 is a diagram showing an example of a transition due to the room switching button 1604 of the display screen on the display 101 of the home controller 100. An upper left diagram in FIG. 23 represents the control screen 1600 shown in FIG. 16. An upper right diagram and a lower left diagram in FIG. 23 represent the control screen 2200 shown in FIG. 22. A lower right diagram in FIG. 23 represents the control screen 1800 shown in FIG. 19.

The control screen 1600 (FIG. 16) shown in the upper left diagram in FIG. 23 is displayed when the uppermost room selection button 1501 shown in FIG. 15 is selected. The control screen 2200 (FIG. 22) shown in the upper right diagram and the lower left diagram in FIG. 23 is displayed when the second-from-top room selection button 1501 shown in FIG. 15 is selected. The control screen 1800 (FIG. 19) shown in the lower right diagram in FIG. 23 is displayed when the third-from-top room selection button 1501 shown in FIG. 15 is selected.

When the user taps the right-side room switching button 1604 with the contact object 1100 on the control screen 1600 that is shown in the upper left diagram in FIG. 23, the touch panel control section 102 detects the tapping. As a result, the display control section 103 switches the display screen from the control screen 1600 shown in the upper left diagram in FIG. 23 to the control screen 2200 shown in the upper right diagram in FIG. 23 (C2301). In other words, the display screen makes a transition from the control screen 1600 corresponding to the uppermost room selection button 1501 shown in FIG. 15 to the control screen 2200 corresponding to the second-from-top room selection button 1501 shown in FIG. 15.

When the user taps the right-side room switching button 1604 with the contact object 1100 on the control screen 2200 that is shown in the upper right diagram in FIG. 23, the touch panel control section 102 detects the tapping. As a result, the display control section 103 switches the display screen from the control screen 2200 shown in the upper right diagram in FIG. 23 to the control screen 1800 shown in the lower right diagram in FIG. 23 (C2302). In other words, the display screen makes a transition from the control screen 2200 corresponding to the second-from-top room selection button 1501 shown in FIG. 15 to the control screen 1800 corresponding to the third-from-top room selection button 1501 shown in FIG. 15.

When the user taps a left-side room switching button 1604 with the contact object 1100 on the control screen 1800 that is shown in the lower right diagram in FIG. 23, the touch panel control section 102 detects the tapping. As a result, the display control section 103 switches the display screen from the control screen 1800 shown in the lower right diagram in FIG. 23 to the control screen 2200 shown in the lower left diagram in FIG. 23 (C2303). In other words, the display screen makes a transition from the control screen 1800 corresponding to the third-from-top room selection button 1501 shown in FIG. 15 to the control screen 2200 corresponding to the second-from-top room selection button 1501 shown in FIG. 15.

As shown, when the room switching button 1604 is tapped, control screens corresponding to the room selection buttons 1501 are displayed in an order of the room selection buttons 1501 arranged in a single vertical row on the top screen 1500 shown in FIG. 15. When the right-side room switching button 1604 is tapped, the room selection button 1501 (FIG. 15) to be displayed moves downward, and when the left-side room switching button 1604 is tapped, the room selection button 1501 (FIG. 15) to be displayed moves upward.

As described above, in the second control pattern, when the user taps the room selection button 1501 with the contact object 1100, the room screen 1603 representing a corresponding room is displayed on the display 101. When two or more devices are installed in the room, the room screen 1603 is displayed with brightness equal to the initial brightness if power of at least one device is in an on-state and is displayed with brightness lower than the initial brightness if power of all devices is in an off-state. As a result, according to the second control pattern, an on/off state of power of a device installed in a room can be identified immediately.

In addition, when the room screen 1603 is tapped, on/off of power of a device installed in a room is switched. Accordingly, there is no need to separately provide an operation button for turning power on/off on the control screen 1600. As a result, display materials to be displayed on the control screen 1600 with a limited display area can be minimized.

(Third Control Pattern)

Next, a third control pattern will be described. The third control pattern is a control pattern in which a device type is specified and devices of the specified type are controlled in room units.

Figure 24:
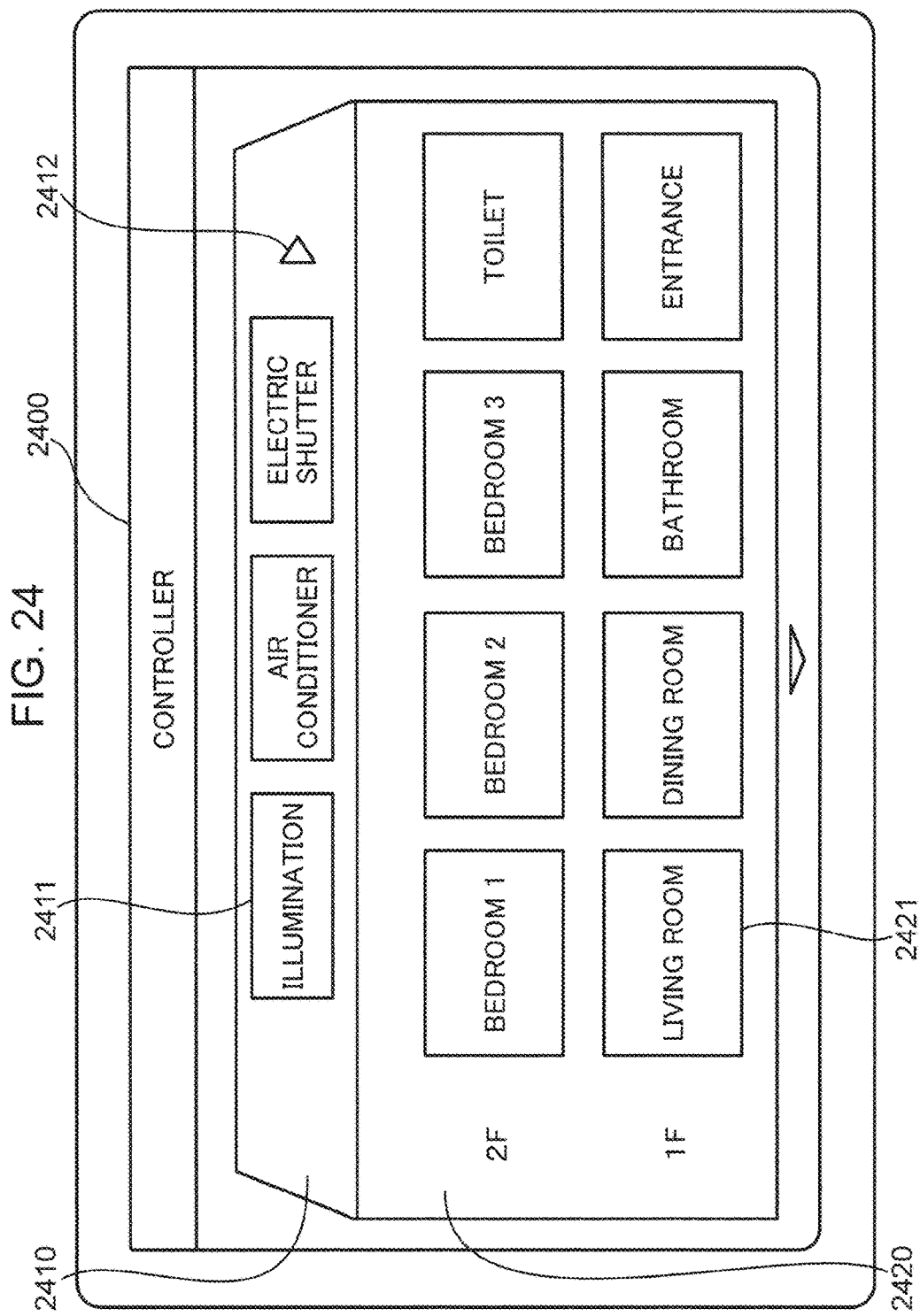
FIG. 24 is a diagram showing an example of a top screen in a third control pattern.
Figure 25:
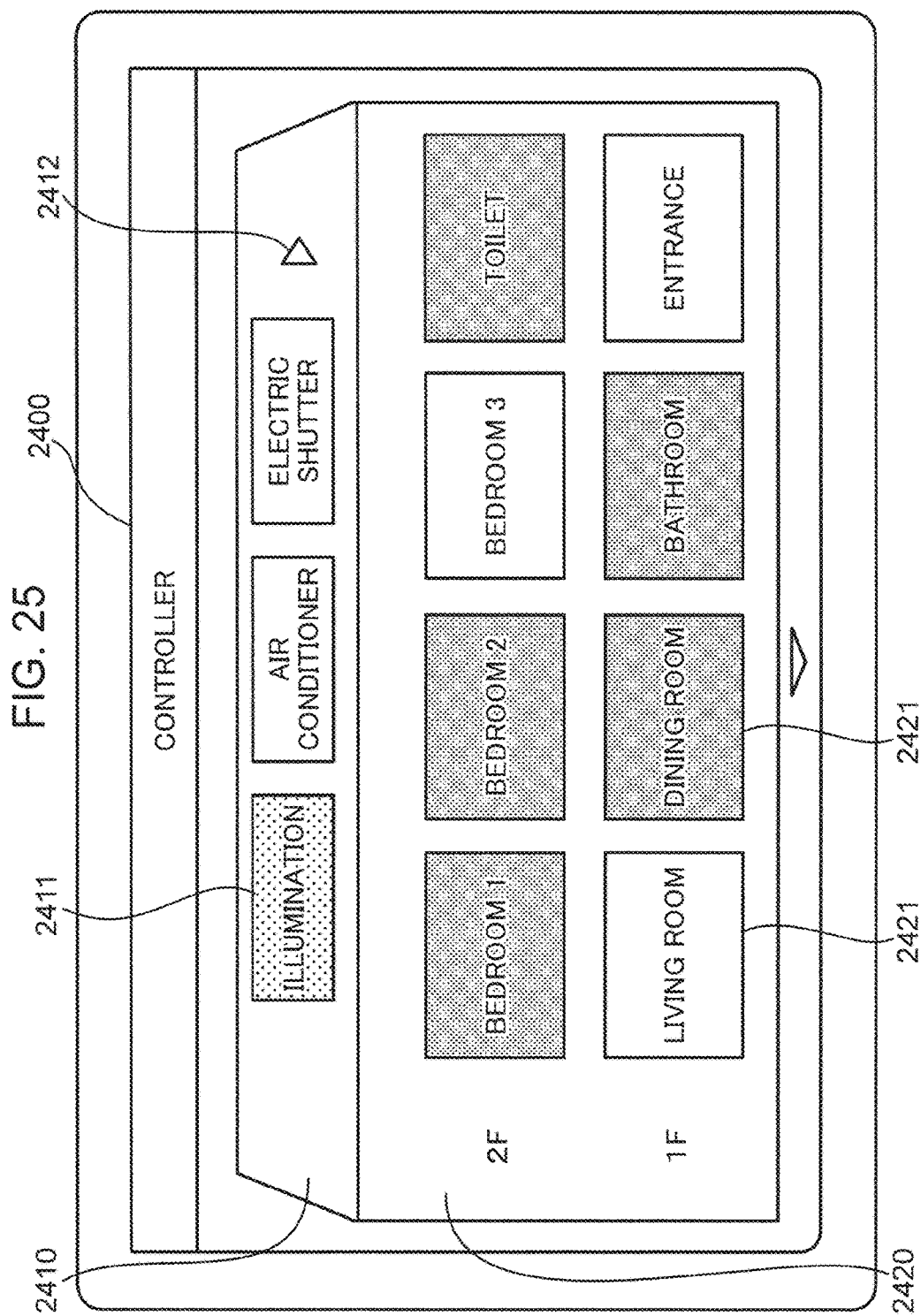
FIG. 25 is a diagram showing an example of a top screen in the third control pattern.

FIGS. 24 and 25 are diagrams showing an example of a top screen 2400 that is displayed on the display 101 of the home controller 100 in the third control pattern. The top screen 2400 (an example of the display screen) is a top screen of the home control system. The top screen 2400 shown in FIG. 24 is a screen that is displayed on the display 101 of the home controller 100 when the controller application icon 501 is tapped on the basic screen 500 in the third control pattern.

A heading that reads "controller" is displayed in an upper part of the top screen 2400 to indicate that the screen is a screen of the home control system. A device selection region 2410 and a floor plan 2420 are displayed below the heading.

The device selection region 2410 includes a device type icon 2411 (an example of the instruction button) and a device type switching button 2412.

The device type icon 2411 is an icon representing a type of the device 200. The device type icon 2411 is prepared for each type of the device 200. The device type icon 2411 includes a description of a name or an abbreviation of a device.

In the present embodiment, the display control section 103 arranges the device type icons 2411 in the device selection region 2410 in, for example, a single horizontal row. In the example shown in FIG. 24, the display control section 103 displays, from left to right, a device type icon 2411 representing an illumination device, a device type icon 2411 representing an air conditioner, and a device type icon 2411 representing an electric shutter apparatus.

The device type switching button 2412 is for switching displays of the device type icons 2411. When the device type switching button 2412 is tapped, the displayed device type icon 2411 is scrolled one at a time for each tap and another device type icon 2411 is displayed. Alternatively, when the device type switching button 2412 is tapped, all of the device type icons 2411 being displayed may be switched to other device type icons 2411 by page feeding.

The floor plan 2420 is a diagram schematically showing an arrangement of one or more rooms that constitute each floor of a house. The floor plan 2420 includes a room icon 2421 representing a room. The room icon 2421 schematically represents a room and is expressed as a square block. On the floor plan 2420, each room icon 2421 representing each room that constitutes each floor is arranged in a matrix pattern.

As shown in FIG. 24, the room icons 2421 are represented by blocks of a same size. In addition, floor numbers are displayed in a vertical direction, and room icons 2421 representing rooms constituting a same floor are arranged in a single horizontal row.

In the example shown in FIG. 24, a house is constituted by two floors, namely, a first floor and a second floor. Therefore, the room icons 2421 representing rooms constituting the second floor are arranged in a first row and the room icons 2421 representing rooms constituting the first floor are arranged in a second row. In addition, a floor number such as 1F and 2F is shown at a left end of each row.

The room icon 2421 includes a description of a room name. In the example shown in FIG. 24, room icons 2421 including the descriptions "bedroom 1", "bedroom 2", "bedroom 3", and "toilet" are displayed with respect to the second floor. In addition, room icons 2421 including the descriptions "living room", "dining room", "bathroom", and "entrance" are displayed with respect to the first floor.

In this manner, in the present embodiment, the room icons 2421 are represented by blocks of the same size. Therefore, the floor plan 2420 can also be commonly applied to buildings with different floor plans. In addition, the user may move to a building with a different floor plan. Even in this case, by adjusting a correspondence relationship between devices 200 to be used and rooms in which the devices 200 are to be installed, the room icon 2421 shown in FIG. 24 may be continuously used without modification.

For example, when the device type icon 2411 representing an illumination device is tapped by the user on the top screen 2400 shown in FIG. 24, the touch panel control section 102 detects the tapping. As a result, the display control section 103 changes a display color of the device type icon 2411 representing an illumination device as shown in FIG. 25.

In addition, the display control section 103 controls brightness of the room icon 2421 in accordance with an on/off state of power of a device which is installed in the room and which is represented by the tapped device type icon 2411.

In the example shown in FIG. 25, the display control section 103 displays the room icons 2421 with the descriptions "bedroom 3", "living room", and "entrance" with brightness equal to initial brightness. This means that, among illumination devices installed in each of the "bedroom 3", "living room", and "entrance", power of at least one illumination device is in an on-state.

In addition, in the example shown in FIG. 25, the display control section 103 displays the room icons 2421 with the descriptions "bedroom 1", "bedroom 2", "toilet", "dining room", and "bathroom" with brightness lower than the initial brightness. This means that power of all illumination devices installed in each of the "bedroom 1", "bedroom 2", "toilet", "dining room", and "bathroom" is in an off-state. Moreover, the display control section 103 displays the room icon 2421 representing a room in which a device represented by the tapped device type icon 2411 is not installed with the same brightness as the off-state, the brightness being lower than the initial brightness.

FIGS. 26 to 29 are, respectively, diagrams showing an example of a control screen that is displayed on the display 101 of the home controller 100. When the user taps inside a region of the room icon 2421 with a contact object on the top screen 2400 shown in FIG. 25, the touch panel control section 102 detects the tapping. As a result, the display control section 103 displays the control screens shown in, for example, FIGS. 26 to 29.

Figure 26:
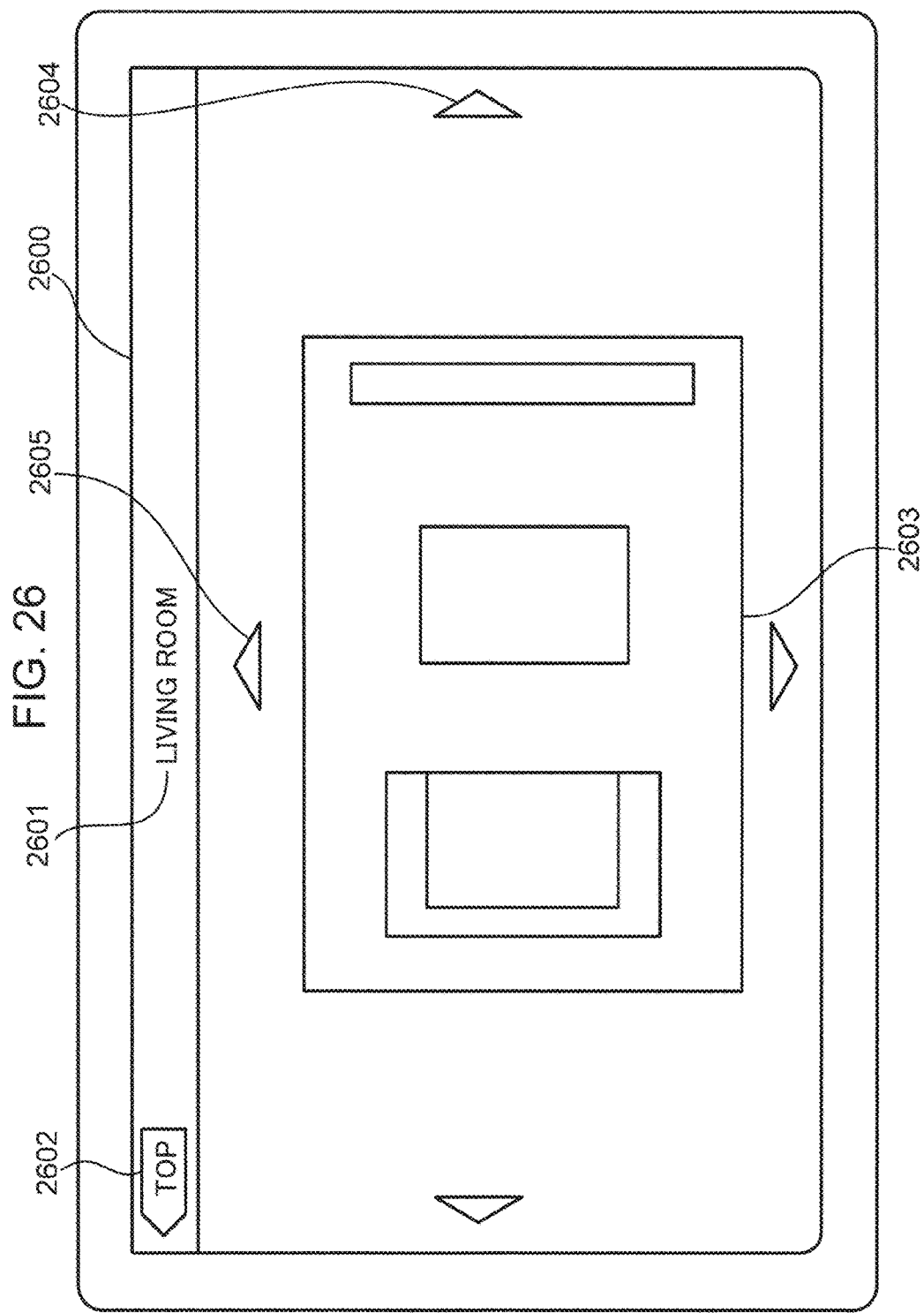
FIG. 26 is a diagram showing an example of a control screen in the third control pattern.
Figure 27:
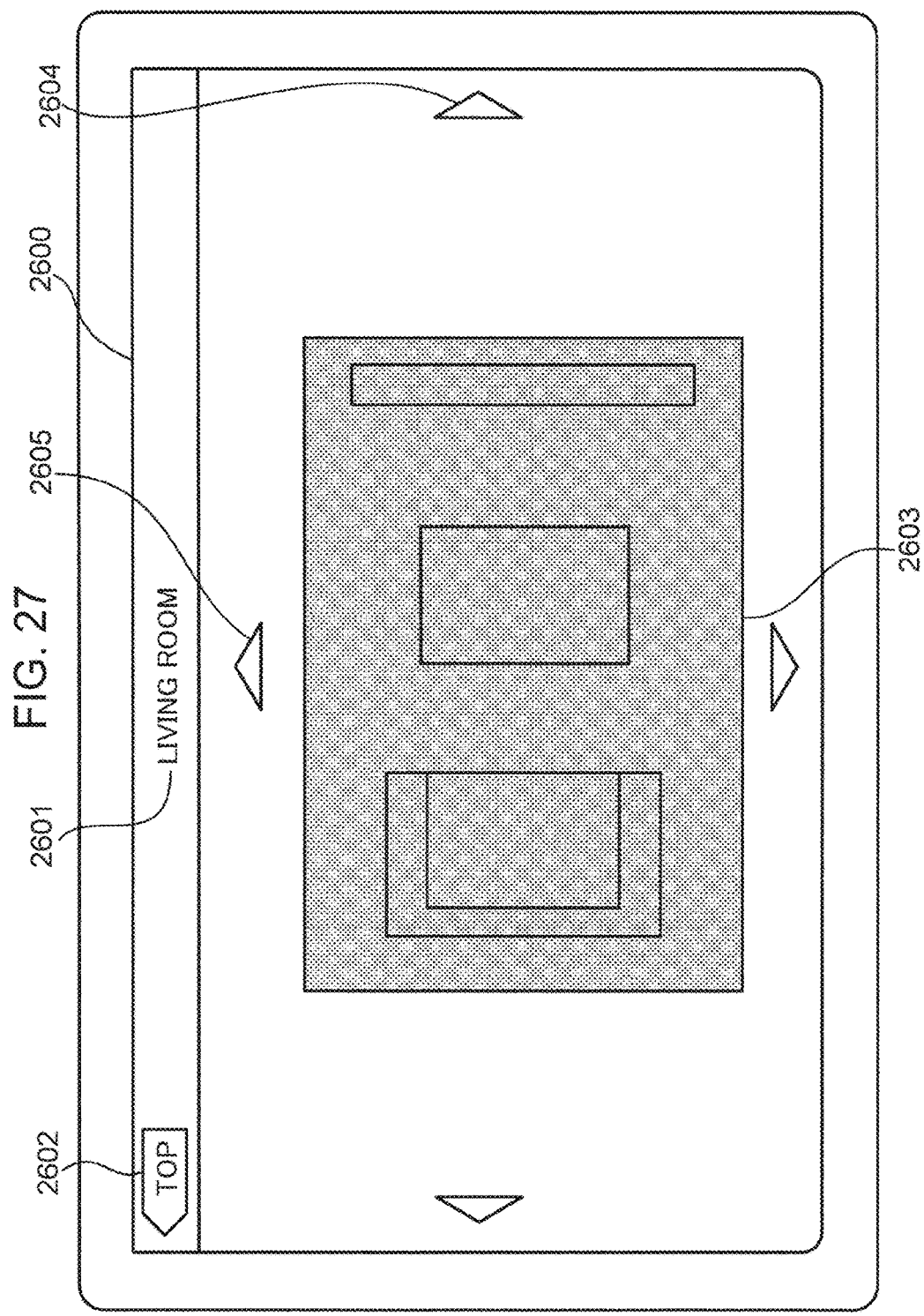
FIG. 27 is a diagram showing an example of a control screen in the third control pattern.

A control screen 2600 shown in FIGS. 26 and 27 includes a room name 2601, a room screen 2603, a top screen switching button 2602, a room switching button 2604, and a floor switching button 2605. A control screen 2800 shown in FIGS. 28 and 29 includes the room name 2601, the room screen 2603, the top screen switching button 2602, the room switching button 2604, and the floor switching button 2605 in a similar manner to the control screen 2600 shown in FIGS. 26 and 27.

The room name 2601 corresponds to the name described in the room icon 2421 on the top screen 2400 shown in FIG. 25. In the example shown in FIGS. 26 and 27, "living room" is described in the room name 2601. The control screen 2600 shown in FIGS. 26 and 27 is displayed when the user taps inside a region of the room icon 2421 which is at a left end of the first floor in FIG. 25 and which includes a description reading "living room".

Figure 28:
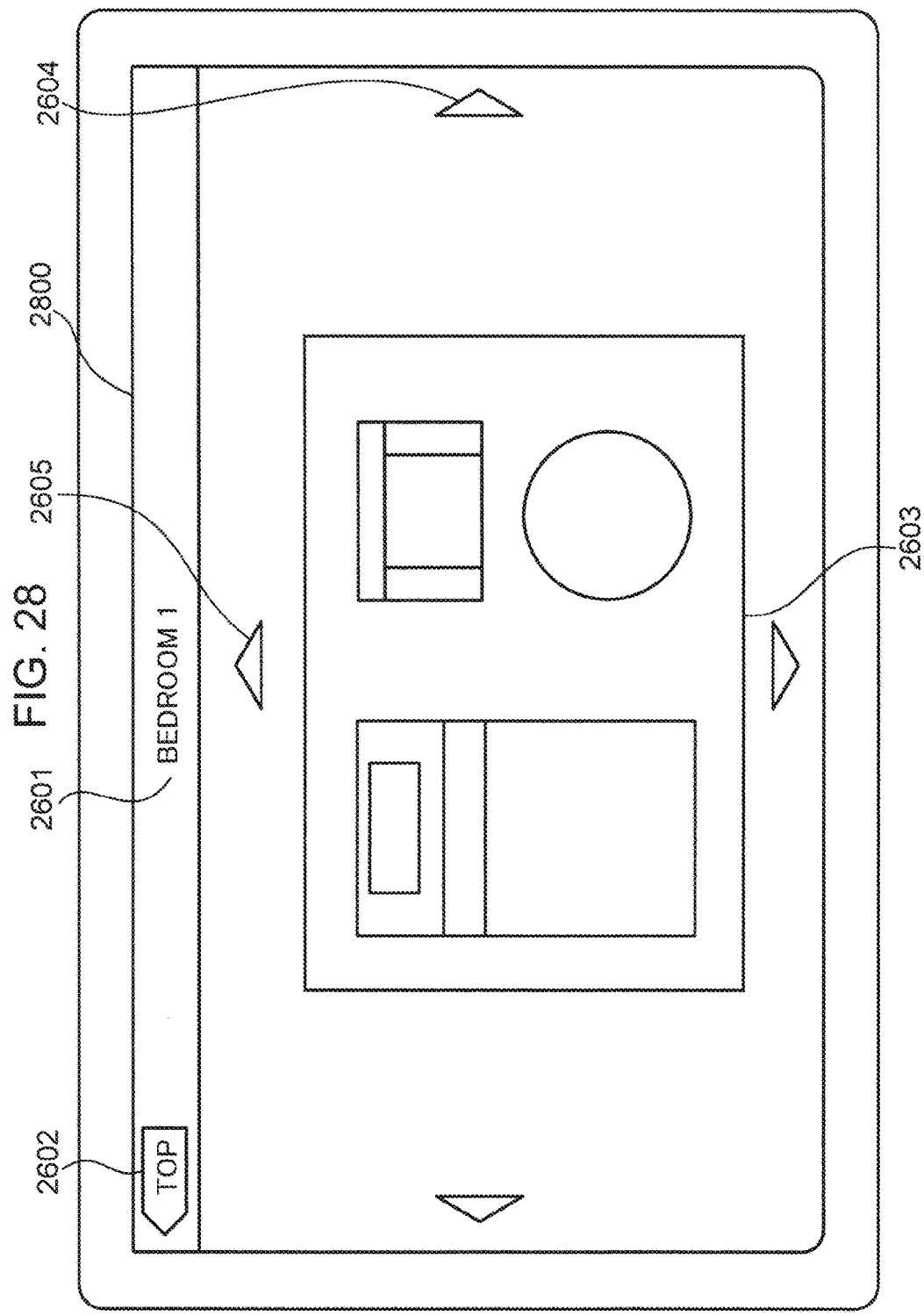
FIG. 28 is a diagram showing an example of a control screen in the third control pattern.
Figure 29:
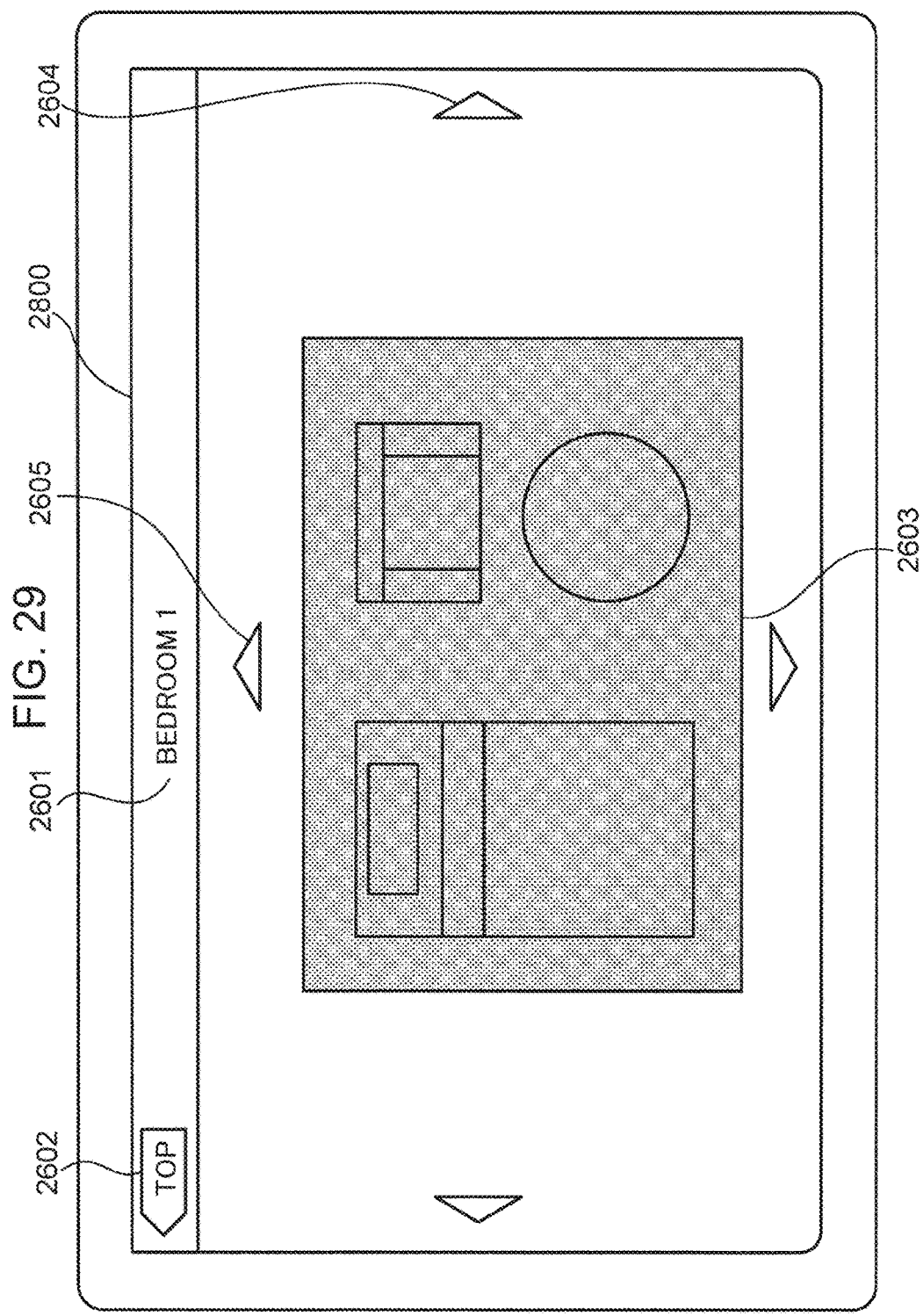
FIG. 29 is a diagram showing an example of a control screen in the third control pattern.

In the example shown in FIGS. 28 and 29, "bedroom 1" is described in the room name 2601. The control screen 2800 shown in FIGS. 28 and 29 is displayed when the user taps inside a region of the room icon 2421 which is at a left end of the second floor in FIG. 25 and which includes a description reading "bedroom 1".

The room screen 2603 is a screen showing a layout of a room corresponding to the room name 2601 as viewed down from a ceiling side. When the room screen 2603 is tapped by the user, on/off of power of devices installed in the room is switched in room units. For example, in a case where two or more illumination devices are installed in the room and power of at least one illumination device is in an on-state, when inside a region of the room screen 2603 is tapped by the user, power of the illumination device in an on-state is turned off. For example, in a case where two or more illumination devices are installed in the room and power of all of the illumination devices is in an on-state or an off-state, when inside a region of the room screen 2603 is tapped by the user, on/off of power of all illumination devices is switched.

In addition, the room screen 2603 displays a current on/off state of power of devices installed in a room in room units. For example, in a case where two or more devices are installed in the room, the room screen 2603 displays power to be in an on-state if power of even one device installed in the room is in an on-state and displays power to be in an off-state if power of all of the devices installed in the room is in an off-state.

In the example shown in FIG. 26, the room screen 2603 is displayed with brightness identical to the brightness of other regions (initial brightness). Therefore, power of at least one illumination device among illumination devices installed in a room with the description reading "living room" is in an on-state. In the example shown in FIG. 27, the room screen 2603 is displayed with brightness lower than the brightness of the other regions. Therefore, power of all of the illumination devices installed in the room with the description reading "living room" is in an off-state.

In a similar manner, in the example shown in FIG. 28, the room screen 2603 is displayed with brightness identical to the brightness of other regions (initial brightness). Therefore, power of at least one illumination device among illumination devices installed in a room with the description reading "bedroom 1" is in an on-state. In the example shown in FIG. 29, the room screen 2603 is displayed with brightness lower than the brightness of the other regions. Therefore, power of all of the illumination devices installed in the room with the description reading "bedroom 1" is in an off-state.

The top screen switching button 2602 is a button for switching the display screen on the display 101 of the home controller 100 to the top screen 2400 (FIG. 25). As shown in FIG. 33A (to be described later), the room switching button 2604 is a button for switching rooms corresponding to a displayed control screen within a same floor. As shown in FIG. 33B (to be described later), the floor switching button 2605 is a button for switching floors of rooms corresponding to a displayed control screen.

Figure 30:
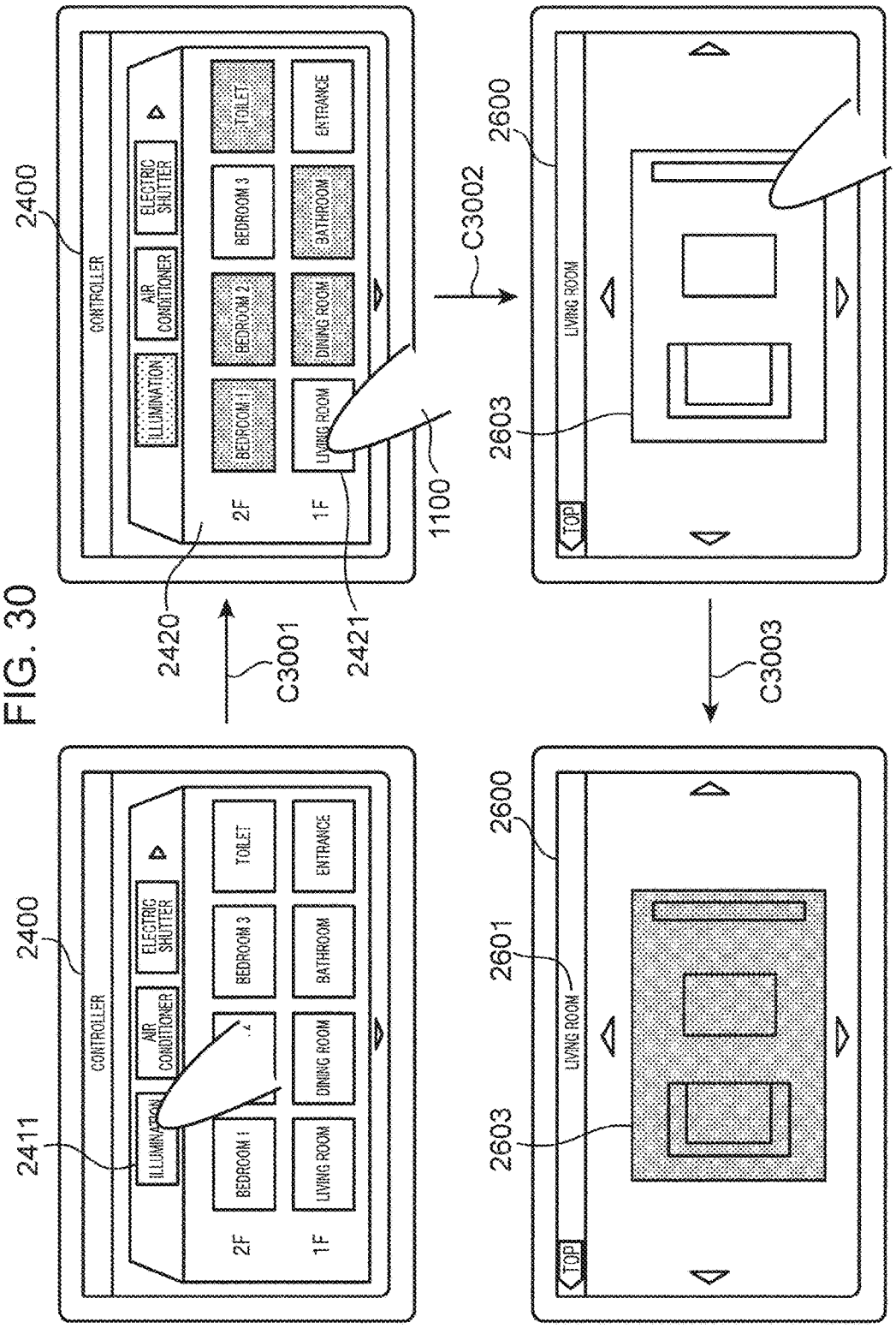
FIG. 30 is a diagram showing an example of a transition of a display screen in the third control pattern.

FIG. 30 is a diagram showing an example of a transition of the display screen on the display 101 of the home controller 100 in the third control pattern. An upper left diagram in FIG. 30 represents the top screen 2400 shown in FIG. 24. An upper right diagram in FIG. 30 represents the top screen 2400 shown in FIG. 25. A lower right diagram in FIG. 30 represents the control screen 2600 shown in FIG. 26. A lower left diagram in FIG. 30 represents the control screen 2600 shown in FIG. 27.

When the user taps inside a region of the device type icon 2411 representing an illumination device with the contact object 1100 on the top screen 2400 that is shown in the upper left diagram in FIG. 30, the touch panel control section 102 detects the tapping. As a result, as shown in the upper right diagram in FIG. 30, the display control section 103 changes a display color of the device type icon 2411 representing an illumination device and changes brightness of each room icon 2421 on the floor plan 2420 in accordance with an on/off state of power of an illumination device installed in each room (C3001).

When the user taps inside a region of the room icon 2421 with the description reading "living room" with the contact object 1100 on the floor plan 2420 on the top screen 2400 that is shown in the upper right diagram in FIG. 30, the touch panel control section 102 detects the tapping. As a result, the display control section 103 switches the display screen from the top screen 2400 shown in the upper right diagram in FIG. 30 to the control screen 2600 shown in the lower right diagram in FIG. 30 (C3002).

As shown in the upper right diagram in FIG. 30, the room icon 2421 (an example of the first room of the third aspect of the present disclosure) with the description reading "living room" is displayed with brightness equal to the initial brightness (an example of the first brightness). Therefore, as shown in the lower right diagram in FIG. 30, the display control section 103 displays the room screen 2603 (an example of the first room screen of the third aspect of the present disclosure) with brightness equal to the initial brightness (an example of the second brightness).

When the user taps inside a region of the room screen 2603 with the contact object 1100 on the control screen 2600 that is shown in the lower right diagram in FIG. 30, the touch panel control section 102 detects the tapping. As a result, the device control section 106 generates a control command (an example of the first control command of the third aspect of the present disclosure) for turning off power of all of the illumination devices that are installed in the room with the description reading "living room". The communication control section 107 transmits the generated control command to all of the illumination devices that are installed in the room with the description reading "living room". Accordingly, power of all of the illumination devices installed in the room with the description reading "living room" is turned off.

In addition, the display control section 103 switches the display screen from the control screen 2600 shown in the lower right diagram in FIG. 30 to the control screen 2600 shown in the lower left diagram in FIG. 30 (C3003). As shown in the lower left diagram in FIG. 30, the display control section 103 displays the room screen 2603 with brightness lower than the initial brightness.

Figure 31:
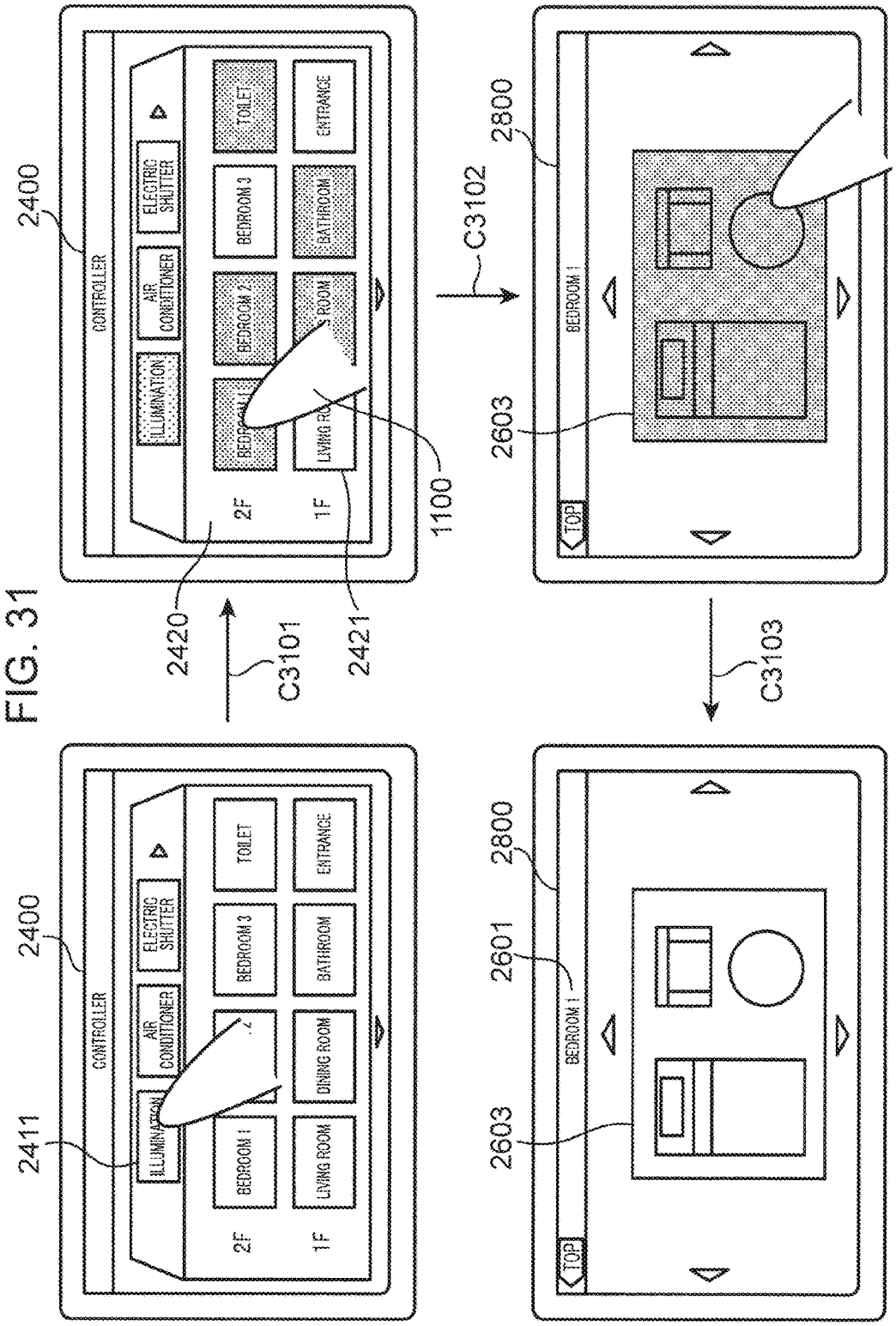
FIG. 31 is a diagram showing another example of a transition of a display screen in the third control pattern.

FIG. 31 is a diagram showing another example of a transition of the display screen on the display 101 of the home controller 100 in the third control pattern. An upper left diagram in FIG. 31 represents the top screen 2400 shown in FIG. 24. An upper right diagram in FIG. 31 represents the top screen 2400 shown in FIG. 25. A lower right diagram in FIG. 31 represents the control screen 2800 shown in FIG. 29. A lower left diagram in FIG. 31 represents the control screen 2800 shown in FIG. 28.

A screen transition (C3101) from the top screen 2400 shown in the upper left diagram in FIG. 31 to the top screen 2400 shown in the upper right diagram in FIG. 31 is the same as the screen transition (C3001) shown in FIG. 30.

When the user taps inside a region of the room icon 2421 with the description reading "bedroom 1" with the contact object 1100 on the floor plan 2420 on the top screen 2400 that is shown in the upper right diagram in FIG. 31, the touch panel control section 102 detects the tapping. As a result, the display control section 103 switches the display screen from the top screen 2400 shown in the upper right diagram in FIG. 31 to the control screen 2800 shown in the lower right diagram in FIG. 31 (C3102).

As shown in the upper right diagram in FIG. 31, the room icon 2421 (an example of the second room of the third aspect of the present disclosure) with the description reading "bedroom 1" is displayed with brightness lower than the initial brightness (an example of the first brightness). Therefore, as shown in the lower right diagram in FIG. 31, the display control section 103 displays the room screen 2603 (an example of the second room screen of the third aspect of the present disclosure) with brightness lower than the initial brightness (an example of the second brightness).

When the user taps inside a region of the room screen 2603 with the contact object 1100 on the control screen 2800 that is shown in the lower right diagram in FIG. 31, the touch panel control section 102 detects the tapping. As a result, the device control section 106 generates a control command (an example of the second control command of the third aspect of the present disclosure) for turning on power of all of the illumination devices that are installed in the room with the description reading "living room". The communication control section 107 transmits the generated control command to all of the illumination devices that are installed in the room with the description reading "living room". Accordingly, power of all of the illumination devices installed in the room with the description reading "living room" is turned on.

In addition, the display control section 103 switches the display screen from the control screen 2800 shown in the lower right diagram in FIG. 31 to the control screen 2800 shown in the lower left diagram in FIG. 31 (C3103). As shown in the lower left diagram in FIG. 31, the display control section 103 displays the room screen 2603 with brightness equal to the initial brightness.

Figure 32:
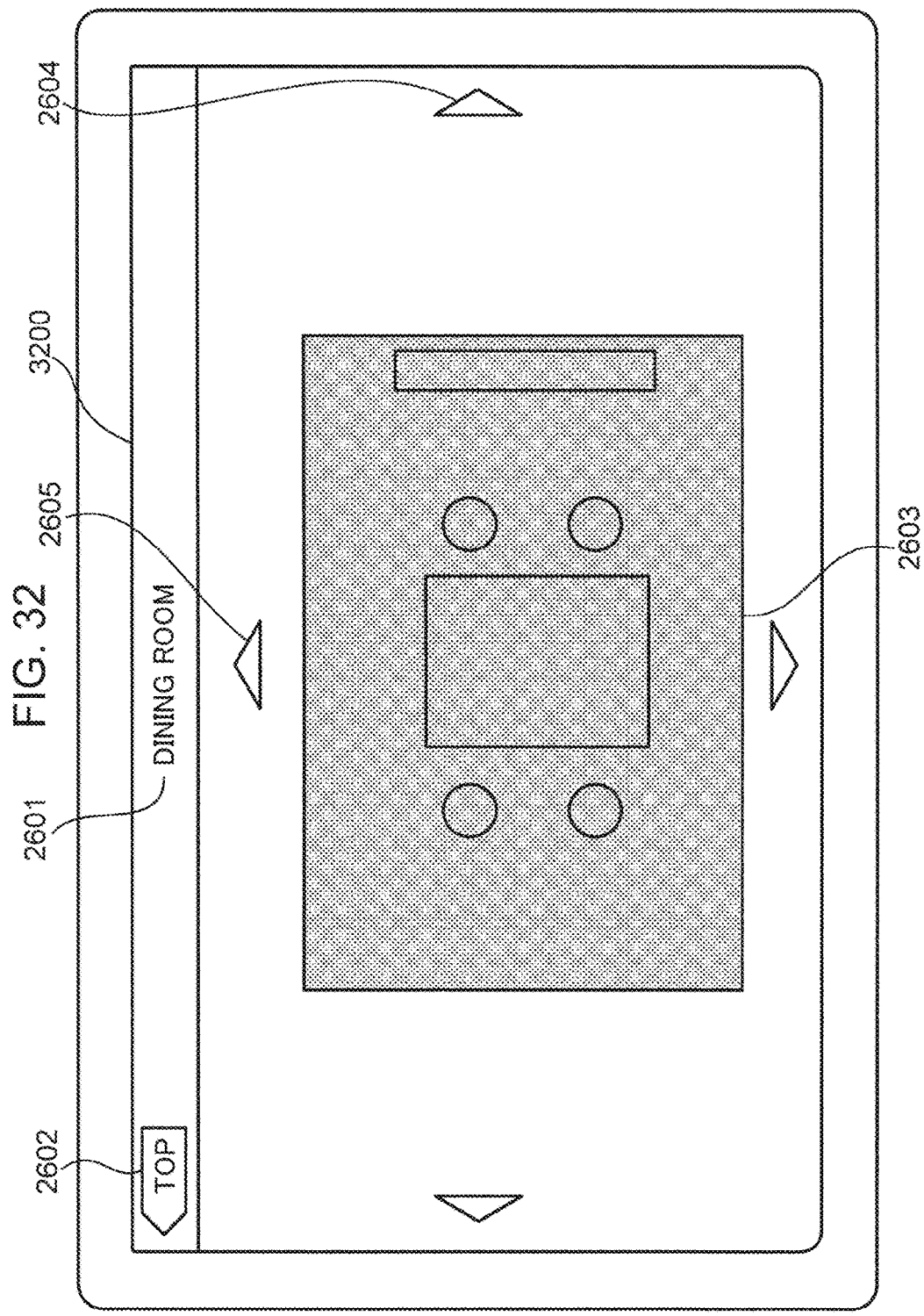
FIG. 32 is a diagram showing another example of a control screen in the third control pattern.

FIG. 32 is a diagram showing another example of a control screen displayed on the display 101 of the home controller 100. A control screen 3200 shown in FIG. 32 includes the room name 2601, the room screen 2603, the top screen switching button 2602, the room switching button 2604, and the floor switching button 2605 in a similar manner to the control screen shown in FIGS. 26 to 29. In the example shown in FIG. 32, "dining room" is described as the room name 2601. The control screen 3200 shown in FIG. 32 is displayed when the user taps the room icon 2421 which is second-from-left of the first floor shown in FIG. 25 and which includes a description reading "dining room".

The room icon 2421 which is second-from-left of the first floor shown in FIG. 25 and which includes a description reading "dining room" is displayed with brightness lower than the initial brightness. Therefore, as shown in FIG. 32, the display control section 103 displays the room screen 2603 on the control screen 3200 with brightness lower than the initial brightness.

FIG. 33A is a diagram showing an example of a transition due to the room switching button 2604 of the display screen on the display 101 of the home controller 100. A top diagram in FIG. 33A represents the control screen 2600 shown in FIG. 26. A bottom diagram in FIG. 33A represents the control screen 3200 shown in FIG. 32.

As described above, the control screen 2600 (FIG. 26) shown in the top diagram in FIG. 33A is displayed when the user taps the room icon 2421 which is at a left end of the first floor in FIG. 25 and which includes a description reading "living room". As described above, the control screen 3200 (FIG. 32) shown in the bottom diagram in FIG. 33A is displayed when the user taps the room icon 2421 which is second-from-left of the first floor in FIG. 25 and which includes a description reading "dining room".

When the user taps the right-side room switching button 2604 with the contact object 1100 on the control screen 2600 that is shown in the top diagram in FIG. 33A, the touch panel control section 102 detects the tapping. As a result, the display control section 103 switches the display screen from the control screen 2600 shown in the top diagram in FIG. 33A to the control screen 3200 shown in the bottom diagram in FIG. 33A (C3301). In other words, the display screen makes a transition from the control screen 2600 corresponding to the room icon 2421 which is at the left end of the first floor in FIG. 25 and which includes a description reading "living room" to the control screen 3200 corresponding to the room icon 2421 which is second-from-left of the first floor in FIG. 25 and which includes a description reading "dining room". As shown, when the right-side room switching button 2604 is tapped, the room icon 2421 corresponding to the displayed control screen moves rightward by one.

FIG. 33B is a diagram showing an example of a transition due to the floor switching button 2605 of the display screen on the display 101 of the home controller 100. A top diagram in FIG. 33B represents the control screen 2600 shown in FIG. 26. A bottom diagram in FIG. 33B represents the control screen 2800 shown in FIG. 29.

As described above, the control screen 2600 (FIG. 26) shown in the top diagram in FIG. 33B is displayed when the user taps the room icon 2421 which is at a left end of the first floor in FIG. 25 and which includes a description reading "living room". As described above, the control screen 2800 (FIG. 29) shown in the bottom diagram in FIG. 33B is displayed when the user taps the room icon 2421 which is at a left end of the second floor in FIG. 25 and which includes a description reading "bedroom 1".

When the user taps the upper floor switching button 2605 with the contact object 1100 on the control screen 2600 that is shown in the top diagram in FIG. 33B, the touch panel control section 102 detects the tapping. As a result, the display control section 103 switches the display screen from the control screen 2600 shown in the top diagram in FIG. 33B to the control screen 2800 shown in the bottom diagram in FIG. 33B (C3302). In other words, the display screen makes a transition from the control screen 2600 corresponding to the room icon 2421 which is at the left end of the first floor in FIG. 25 and which includes a description reading "living room" to the control screen 2800 corresponding to the room icon 2421 which is at the left end of the second floor in FIG. 25 and which includes a description reading "bedroom 1". As shown, when the upper room switching button 2604 is tapped, the room icon 2421 corresponding to the displayed control screen moves upward by one.

As described above, in the third control pattern, when the user taps the device type icon 2411 with the contact object 1100, the room icon 2421 is displayed on the display 101 with brightness in accordance with an on/off state of power of a device of the selected type. As a result, according to the third control pattern, an on/off state of power of a device installed in a room can be identified immediately.

In addition, when the room screen 2603 is tapped, on/off of power of a device installed in a room is switched. Accordingly, there is no need to separately provide an operation button for turning power on/off on the control screen 2600. As a result, display materials to be displayed on the control screen 2600 with a limited display area can be minimized.

(Dimming of Illumination Device)

FIG. 34 is a diagram showing a transition of a display screen according to an example of light quantity decrease control of an illumination device. An upper left diagram in FIG. 34 represents the control screen 2600 shown in FIG. 26.

The room screen 2603 on the control screen 2600 shown in the upper left diagram in FIG. 34 is displayed with brightness identical to brightness (initial brightness) of regions other than the room screen 2603. In other words, power of at least one illumination device among illumination devices installed in a room with the description reading "living room" is turned on.

In FIG. 34, brightness of the room screens 2603 is set to be highest for the room screen 2603 in the upper left diagram, lower in order of the upper right diagram and the lower right diagram, and lowest for the room screen 2603 in the lower left diagram.

The touch panel control section 102 detects that the user has touched inside a region of the room screen 2603 in the upper left diagram in FIG. 34 by the contact object 1100 and, at the same time, the touch panel control section 102 detects that the contact continues on the room screen 2603 and that a contact position moves downward. In addition, the touch panel control section 102 detects an amount of movement of the contact position between the contact object 1100 and the room screen 2603. As a result, the display control section 103 reduces the brightness of the room screen 2603 as the amount of movement increases (upper right diagram in FIG. 34, C3401).

The device control section 106 generates a control command that reduces a light quantity of an illumination device as the amount of movement increases. The communication control section 107 transmits the control command generated by the device control section 106 to all illumination devices whose power is in an on-state and which are installed in the room with the description reading "living room". Accordingly, the light quantity of illumination devices installed in the room with the description reading "living room" is reduced.

When the contact object 1100 separates from the home controller 100 in the state shown in the upper right diagram in FIG. 34, control by the display control section 103 and the device control section 106 ends in the state shown in the upper right diagram in FIG. 34.

On the other hand, when the contact made by the contact object 1100 continues on the room screen 2603 and the amount of movement of the contact position between the contact object 1100 and the room screen 2603 further increases, the display control section 103 further reduces the brightness of the room screen 2603 in accordance with the amount of movement (lower right diagram in FIG. 34, C3402).

The device control section 106 further generates a control command that reduces a light quantity of an illumination device in accordance with the amount of movement. The communication control section 107 transmits the control command generated by the device control section 106 to all illumination devices whose power is turned on and which are installed in the room with the description reading "living room". Accordingly, the light quantity of illumination devices installed in the room with the description reading "living room" is further reduced.

When the contact object 1100 separates from the home controller 100 in the state shown in the lower right diagram in FIG. 34, control by the display control section 103 and the device control section 106 ends in the state shown in the lower right diagram in FIG. 34.

On the other hand, when the contact made by the contact object 1100 continues on the room screen 2603 and the amount of movement of the contact position between the contact object 1100 and the room screen 2603 further increases and exceeds a value set in advance, the display control section 103 displays the room screen 2603 with brightness equal to minimum brightness set in advance (lower left diagram in FIG. 34, C3403). The minimum brightness is set in advance to brightness lower than predetermined brightness (the initial brightness or, in other words, the brightness of regions other than the room screen).

The device control section 106 generates a control command that turns off an illumination device when the amount of movement of the contact position between the contact object 1100 and the room screen 2603 exceeds a value set in advance. The communication control section 107 transmits the control command generated by the device control section 106 to all illumination devices whose power is turned on and which are installed in the room with the description reading "living room". Accordingly, power of all of the illumination devices installed in the room with the description reading "living room" changes to an off-state.

FIG. 35 is a diagram showing a transition of a display screen according to an example of light quantity increase control of an illumination device. An upper left diagram, an upper right diagram, a lower right diagram, and a lower left diagram in FIG. 35 are respectively the same as the lower left diagram, the lower right diagram, the upper right diagram, and the upper left diagram in FIG. 34.

The touch panel control section 102 detects that the user has touched inside a region of the room screen 2603 in the upper left diagram in FIG. 35 by the contact object 1100 and, at the same time, the touch panel control section 102 detects that the contact continues on the room screen 2603 and that a contact position moves upward. In addition, the touch panel control section 102 detects an amount of movement of the contact position between the contact object 1100 and the room screen 2603. As a result, the display control section 103 increases the brightness of the room screen 2603 as the amount of movement increases (upper right diagram in FIG. 35, C3501).

The device control section 106 generates a control command that increases a light quantity of an illumination device as the amount of movement increases. The communication control section 107 transmits the control command generated by the device control section 106 to all of the illumination devices that are installed in the room with the description reading "living room". Accordingly, the light intensities of all of the illumination devices installed in the room with the description reading "living room" increase.

When the contact object 1100 separates from the home controller 100 in the state shown in the upper right diagram in FIG. 35, control by the display control section 103 and the device control section 106 ends in the state shown in the upper right diagram in FIG. 35.

On the other hand, when the contact made by the contact object 1100 continues on the room screen 2603 and the amount of movement of the contact position between the contact object 1100 and the room screen 2603 further increases, the display control section 103 further increases the brightness of the room screen 2603 in accordance with the amount of movement (lower right diagram in FIG. 35, C3502).

The device control section 106 further generates a control command that increases a light quantity of an illumination device in accordance with the amount of movement. The communication control section 107 transmits the control command generated by the device control section 106 to all of the illumination devices that are installed in the room with the description reading "living room". Accordingly, the light quantity of illumination devices installed in the room with the description reading "living room" is increased.

When the contact object 1100 separates from the home controller 100 in the state shown in the lower right diagram in FIG. 35, control by the display control section 103 and the device control section 106 ends in the state shown in the lower right diagram in FIG. 35.

On the other hand, when the contact made by the contact object 1100 continues on the room screen 2603 and the amount of movement of the contact position between the contact object 1100 and the room screen 2603 further increases and exceeds a value set in advance, the display control section 103 sets the brightness of the room screen 2603 to the initial brightness (lower left diagram in FIG. 35, C3503).

The device control section 106 generates a control command that turns on an illumination device at 100% light quantity when the amount of movement of the contact position between the contact object 1100 and the room screen 2603 exceeds a value set in advance. The communication control section 107 transmits the control command generated by the device control section 106 to all of the illumination devices that are installed in the room with the description reading "living room". Accordingly, all of the illumination devices installed in the room with the description reading "living room" are turned on at 100% light quantity.

FIG. 36 is a diagram showing a transition of a display screen according to another example of light quantity decrease control of an illumination device. An upper left diagram, an upper right diagram, a lower right diagram, and a lower left diagram in FIG. 36 are respectively the same as the upper left diagram, the upper right diagram, the lower right diagram, and the lower left diagram in FIG. 34.

The touch panel control section 102 detects that the user has touched inside a region of the room screen 2603 on the control screen 2600 in the upper left diagram in FIG. 36 by the contact object 1100 and, at the same time, the touch panel control section 102 detects that the contact continues on the room screen 2603 and that a contact position moves leftward. In addition, the touch panel control section 102 detects an amount of movement of the contact position between the contact object 1100 and the room screen 2603. As a result, the display control section 103 reduces the brightness of the room screen 2603 in accordance with the amount of movement (upper right diagram in FIG. 36, C3601).

The device control section 106 generates a control command that reduces a light quantity of an illumination device in accordance with the amount of movement. The communication control section 107 transmits the control command generated by the device control section 106 to all illumination devices whose power is turned on and which are installed in the room with the description reading "living room". Accordingly, the light quantity of illumination devices installed in the room with the description reading "living room" is reduced.

When the contact object 1100 separates from the home controller 100 in the state shown in the upper right diagram in FIG. 36, control by the display control section 103 and the device control section 106 ends in the state shown in the upper right diagram in FIG. 36.

On the other hand, when the contact made by the contact object 1100 continues on the room screen 2603 and the amount of movement of the contact position between the contact object 1100 and the room screen 2603 further increases, the display control section 103 further reduces the brightness of the room screen 2603 in accordance with the amount of movement (lower right diagram in FIG. 36, C3602).

The device control section 106 further generates a control command that reduces a light quantity of an illumination device in accordance with the amount of movement. The communication control section 107 transmits the control command generated by the device control section 106 to all illumination devices whose power is turned on and which are installed in the room with the description reading "living room". Accordingly, the light quantity of illumination devices installed in the room with the description reading "living room" is reduced.

When the contact object 1100 separates from the home controller 100 in the state shown in the lower right diagram in FIG. 36, control by the display control section 103 and the device control section 106 ends in the state shown in the lower right diagram in FIG. 36.

On the other hand, when the contact made by the contact object 1100 continues on the room screen 2603 and the amount of movement of the contact position between the contact object 1100 and the room screen 2603 further increases and exceeds a value set in advance, the display control section 103 displays the room screen 2603 with brightness equal to minimum brightness set in advance (lower left diagram in FIG. 36, C3603).

The device control section 106 generates a control command that turns off an illumination device when the amount of movement of the contact position between the contact object 1100 and the room screen 2603 exceeds a value set in advance. The communication control section 107 transmits the control command generated by the device control section 106 to all illumination devices whose power is turned on and which are installed in the room with the description reading "living room". Accordingly, power of all of the illumination devices installed in the room with the description reading "living room" changes to an off-state.

Figure 37:
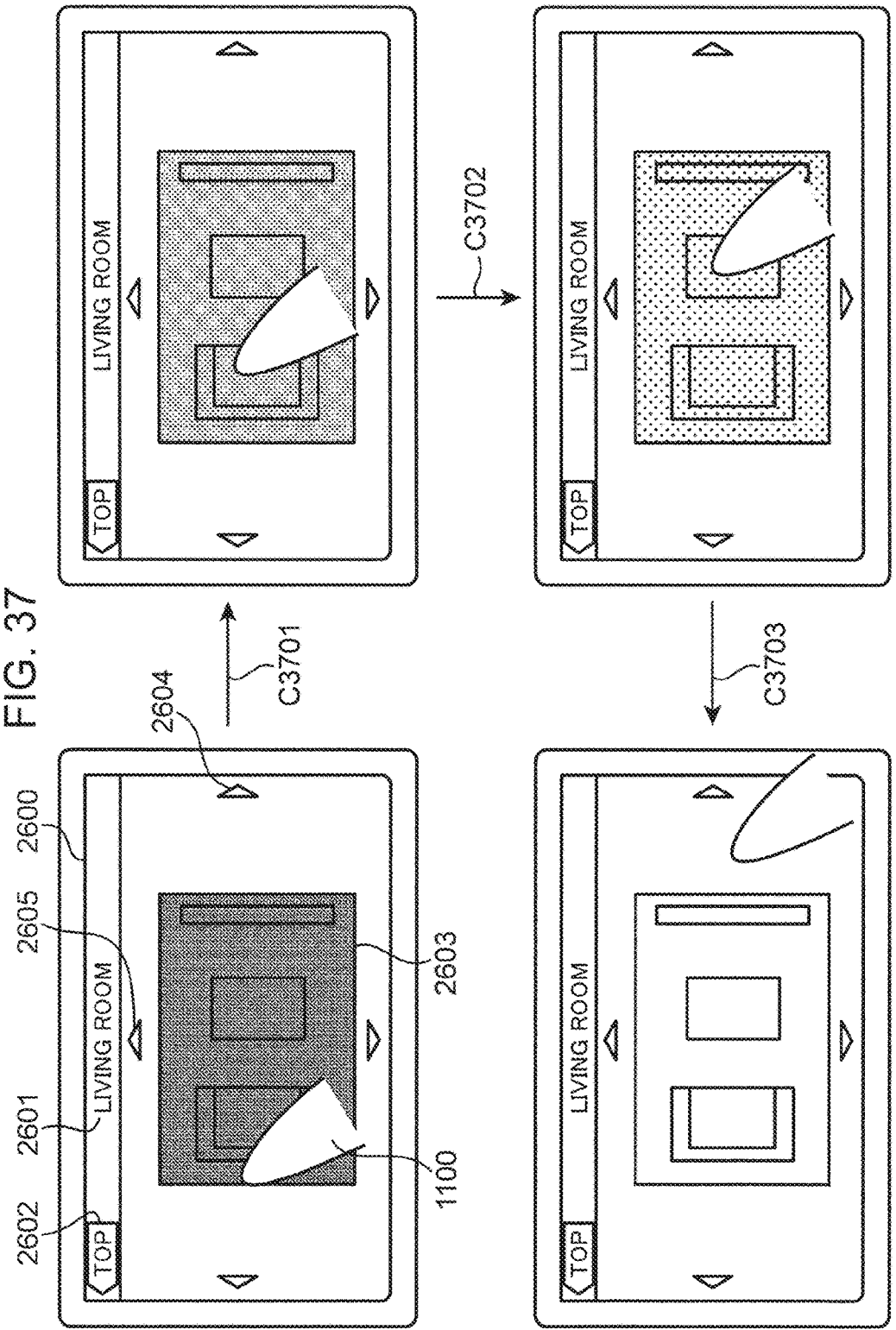
FIG. 37 is a diagram showing a transition of a display screen according to another example of light quantity increase control of an illumination device.

FIG. 37 is a diagram showing a transition of a display screen according to another example of light quantity increase control of an illumination device. An upper left diagram, an upper right diagram, a lower right diagram, and a lower left diagram in FIG. 37 are respectively the same as the upper left diagram, the upper right diagram, the lower right diagram, and the lower left diagram in FIG. 35.

The touch panel control section 102 detects that the user has touched inside a region of the room screen 2603 in the upper left diagram in FIG. 37 by the contact object 1100 and, at the same time, the touch panel control section 102 detects that the contact continues on the room screen 2603 and that a contact position moves rightward. In addition, the touch panel control section 102 detects an amount of movement of the contact position between the contact object 1100 and the room screen 2603. As a result, the display control section 103 increases the brightness of the room screen 2603 in accordance with the amount of movement (upper right diagram in FIG. 37, C3701).

The device control section 106 generates a control command that increases a light quantity of an illumination device in accordance with the amount of movement. The communication control section 107 transmits the control command generated by the device control section 106 to all of the illumination devices that are installed in the room with the description reading "living room". Accordingly, light intensities of all of the illumination devices installed in the room with the description reading "living room" increase.

When the contact object 1100 separates from the home controller 100 in the state shown in the upper right diagram in FIG. 37, control by the display control section 103 and the device control section 106 ends in the state shown in the upper right diagram in FIG. 37.

On the other hand, when the contact made by the contact object 1100 continues on the room screen 2603 and the amount of movement of the contact position between the contact object 1100 and the room screen 2603 further increases, the display control section 103 further increases the brightness of the room screen 2603 in accordance with the amount of movement (lower right diagram in FIG. 37, C3702).

The device control section 106 further generates a control command that increases a light quantity of an illumination device in accordance with the amount of movement. The communication control section 107 transmits the control command generated by the device control section 106 to all of the illumination devices that are installed in the room with the description reading "living room". Accordingly, the light intensities of illumination devices installed in the room with the description reading "living room" are increased.

When the contact object 1100 separates from the home controller 100 in the state shown in the lower right diagram in FIG. 37, control by the display control section 103 and the device control section 106 ends in the state shown in the lower right diagram in FIG. 37.

On the other hand, when the contact made by the contact object 1100 continues on the room screen 2603 and the amount of movement of the contact position between the contact object 1100 and the room screen 2603 further increases and exceeds a value set in advance, the display control section 103 sets the brightness of the room screen 2603 to the initial brightness (lower left diagram in FIG. 37, C3703).

The device control section 106 generates a control command that turns on an illumination device at 100% light quantity when the amount of movement of the contact position between the contact object 1100 and the room screen 2603 exceeds a value set in advance. The communication control section 107 transmits the control command generated by the device control section 106 to all of the illumination devices that are installed in the room with the description reading "living room". Accordingly, all of the illumination devices installed in the room with the description reading "living room" are turned on at 100% light quantity.

As shown in the upper left diagrams in FIGS. 34 to 37, when the touch panel control section 102 detects that a start point of the contact position between the contact object 1100 and the home controller 100 is inside the region of the room screen 2603, the display control by the display control section 103 and the light quantity control by the device control section 106 described above are started. On the other hand, as shown in the lower left diagrams in FIGS. 34 to 37, an end point of the contact position between the contact object 1100 and the home controller 100 may be outside the region of the room screen 2603. In other words, even when the contact between the contact object 1100 and the home controller 100 continues to the outside of the region of the room screen 2603, detection of an amount of movement by the touch panel control section 102 is continued and the display control by the display control section 103 and the light quantity control by the device control section 106 in accordance with the amount of movement are continued.

As described above, by continuing a contact made by the contact object 1100 to the room screen 2603 and moving the contact position, dimmer control of an illumination device is performed. Therefore, an operation button or the like for performing dimming of an illumination device need not be separately provided on the room screen 2603. As a result, a plurality of controls including turning on/off control of power and dimmer control can be realized on the room screen 2603 with a limited display area while minimizing display materials to be displayed.

In the upper left diagrams in FIGS. 34 and 36, the room screen 2603 at the start of dimmer control is displayed with brightness identical to the brightness of other regions (initial brightness). In the upper left diagrams in FIGS. 35 and 37, the room screen 2603 at the start of dimmer control is displayed with brightness equal to minimum brightness set in advance. However, the brightness of the room screens 2603 at the start of dimmer control is not limited to those described above. When an illumination device at the start of dimmer control is in an on-state at a light quantity lower than 100%, for example, as shown in the upper right diagram in FIG. 34 or the lower right diagram in FIG. 34, the room screen 2603 may be displayed with brightness between the brightness of other regions (initial brightness) and the minimum brightness.

In FIGS. 34 to 37, dimming of an illumination device is described using the control screen 2600 (FIG. 26) of the third control pattern. However, dimmer control may be performed in a similar manner with the control screen 700 (FIG. 7) of the first control pattern and the control screen 1600 (FIG. 16) of the second control pattern.

(Data Structure)

FIG. 38 is a diagram showing a configuration of a device list 3800 that is managed by the server 300. As shown in FIG. 38, the device list 3800 includes a device ID 3801, a device type 3802, a model number 3803, an arrangement 3804, capability information 3805, a control command transmission destination 3806, an IP address 3807, and a status 3808.

The device ID 3801 is an identifier of the device 200. The device type 3802 indicates a device type of the device 200.

The model number 3803 indicates a model number of the device 200. The arrangement 3804 indicates a room in which the device 200 is installed.

The capability information 3805 indicates a content in which the device 200 can be controlled and a state that can be acquired from the device 200. For example, on/off of power and dimming can be controlled with respect to an illumination device whose device ID is A. For example, on/off of power, a temperature, a mode, an air direction, and an air flow can be controlled with respect to an air conditioner whose device ID is F. The control command transmission destination 3806 indicates a transmission destination of a control command for controlling the device 200. For example, with respect to the illumination device whose device ID is A, since the control command transmission destination 3806 is a device, the control command is directly transmitted from the home controller 100 to the device 200. A control command is a command for operating the device 200 and confirming a state of the device 200.

The IP address 3807 is acquired from the device 200 by the device management section 105 of the home controller 100. The server 300 receives the IP address 3807 from the home controller 100 and manages the IP address 3807. The status 3808 indicates a current state of the device 200. For example, in FIG. 38, it is shown that the illumination device whose device ID is A is turned on at 100% light quantity. It is also shown that an illumination device whose device ID is B is turned on at 70% light quantity. The air conditioner whose device ID is F is shown to be operating as a cooler at a set temperature of 27° C. An electric shutter apparatus whose device ID is G is shown to be closed.

The device management section 105 of the home controller 100 also manages the device list 3800. In this case, the device management section 105 may acquire contents other than the IP address 3807 from the server 300 or directly from the device 200.

Using the device list 3800 shown in FIG. 38, the display control section 103 of the home controller 100 performs brightness control of the simple control button 604 shown in, for example, FIG. 6, brightness control of the room icon 2421 shown in FIG. 25, and the like.

Figure 39:
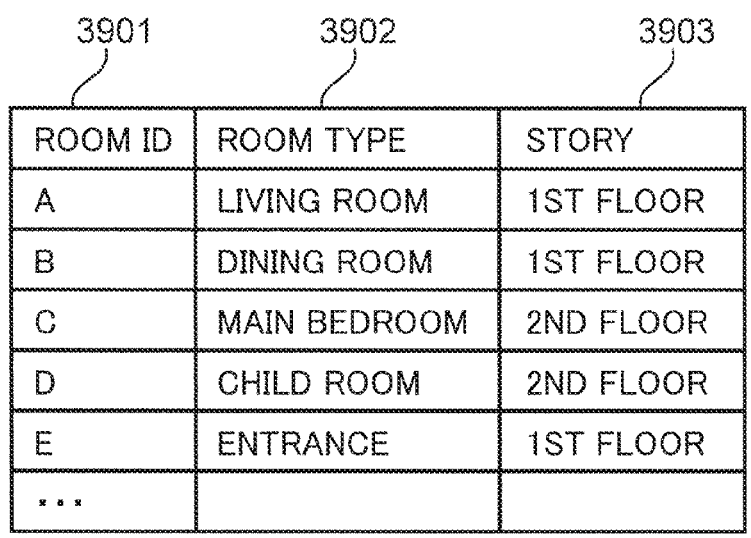
FIG. 39 is a diagram showing a configuration of room information.

FIG. 39 is a diagram showing a configuration of the room information 3900 that is managed by the server 300. As shown in FIG. 39, the room information 3900 includes a room ID 3901, a room type 3902, and a story 3903. The room ID 3901 is an identifier for identifying a room. The room type 3902 indicates a room type. The story 3903 indicates a floor on which the room is located.

The device management section 105 of the home controller 100 also manages the room information 3900. In this case, the device management section 105 of the home controller 100 acquires the room information 3900 from the server 300 and manages the acquired room information 3900.

Using the room information 3900 shown in FIG. 39, the display control section 103 of the home controller 100 decides an arrangement of the room icons 2421 shown in, for example, FIG. 24.

(System Operation)

Figure 40:
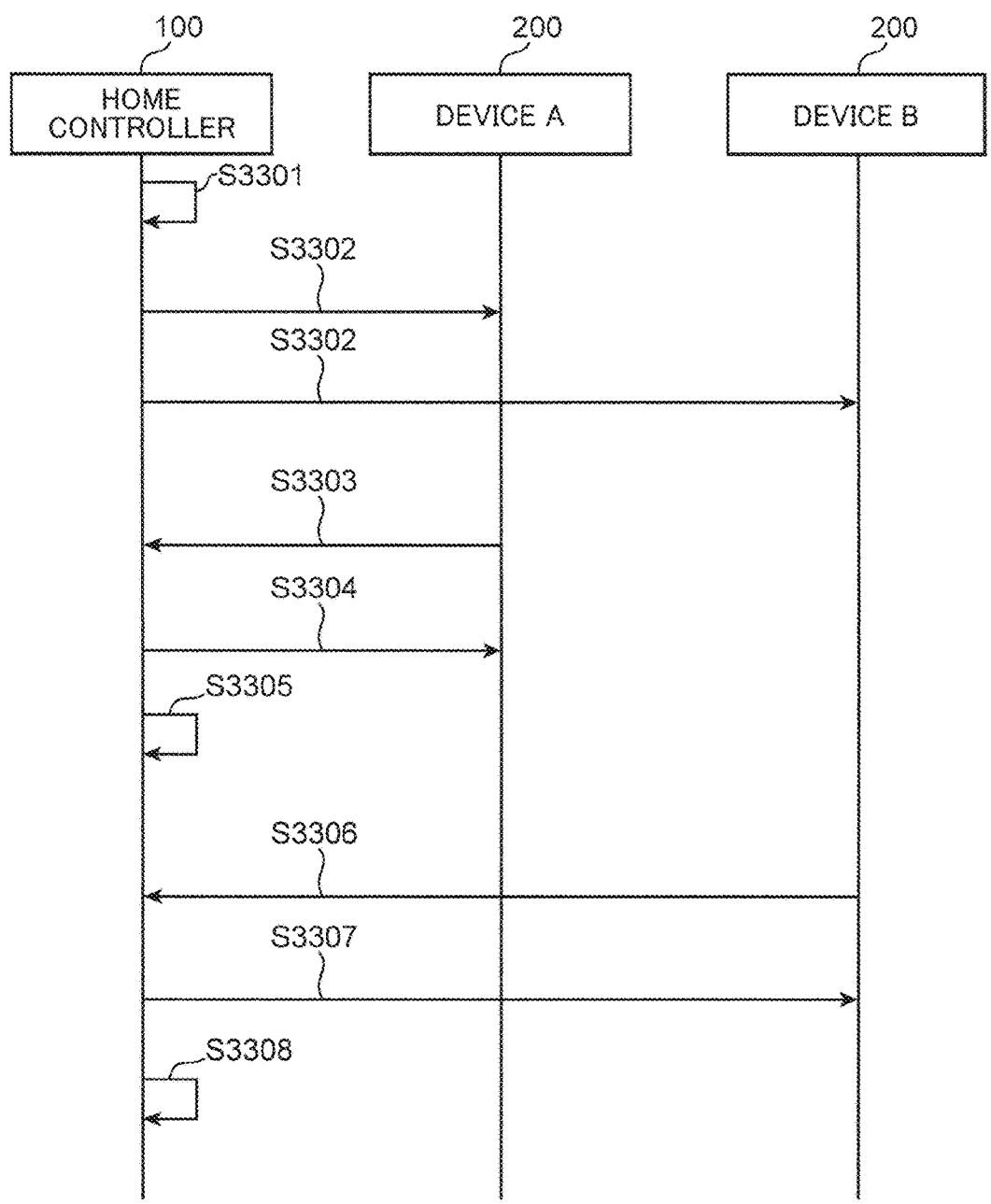
FIG. 40 is a sequence diagram showing a flow of processes by which a home controller detects a device on a network upon connecting to the network.

FIG. 40 is a sequence diagram of a flow of processes by which the home controller 100 detects a device 200 on a network after the home controller 100 connects to the network. FIG. 40 will be described on the assumption that a device A 200 whose device ID is A and a device B 200 whose device ID is B shown in FIG. 38 are connected to the network.

When the home controller 100 connects to the network upon initial use or activation of the home controller 100 (S3301), the device management section 105 of the home controller 100 broadcasts a device search request to all of the devices 200 on the network (S3302). The device A 200 having received the device search request sends a device search response to the home controller 100 (S3303). The home controller 100 having received the device search response acquires device information from the device A 200 (S3304) and updates the display screen (S3305).

In a similar manner, the device B 200 having received the device search request sends a device search response to the home controller 100 (S3306). The home controller 100 having received the device search response acquires device information from the device B 200 (S3307) and updates the display screen (S3308). In this case, device information refers to information indicating a device type, a model, capability information, and the like of the device 200. Based on the device information, the device management section 105 of the home controller 100 generates the device list 3800 (refer to FIG. 38).

Figure 41:
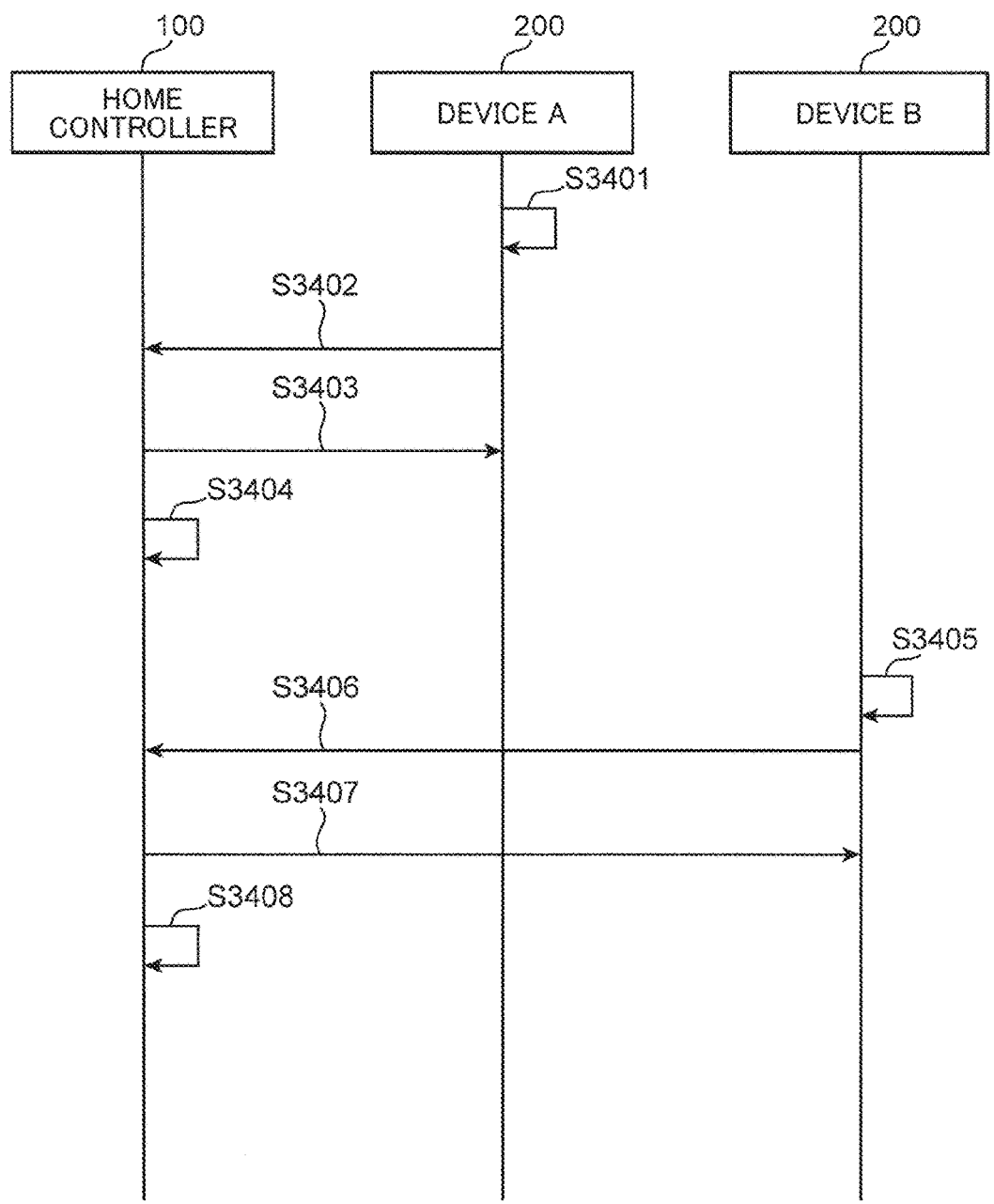
FIG. 41 is a sequence diagram showing a flow of processes by which a home controller detects a device on a network when the device connects to the network.

FIG. 41 is a sequence diagram of a flow of processes by which the home controller 100 detects a device 200 on a network when the device 200 connects to the network. When the device A 200 connects to the network upon initial use or activation (S3401), the device A 200 broadcasts a network connection notification to all of the home controllers 100 on the network (S3402). In the home controller 100 having received the network connection notification, the device management section 105 acquires device information from the device A 200 (S3403) and the display control section 103 updates the display screen (S3404). A process that is performed upon connection of the device B 200 to the network is similar to that of the device A 200 (S3405 to S3408).

Figure 42:
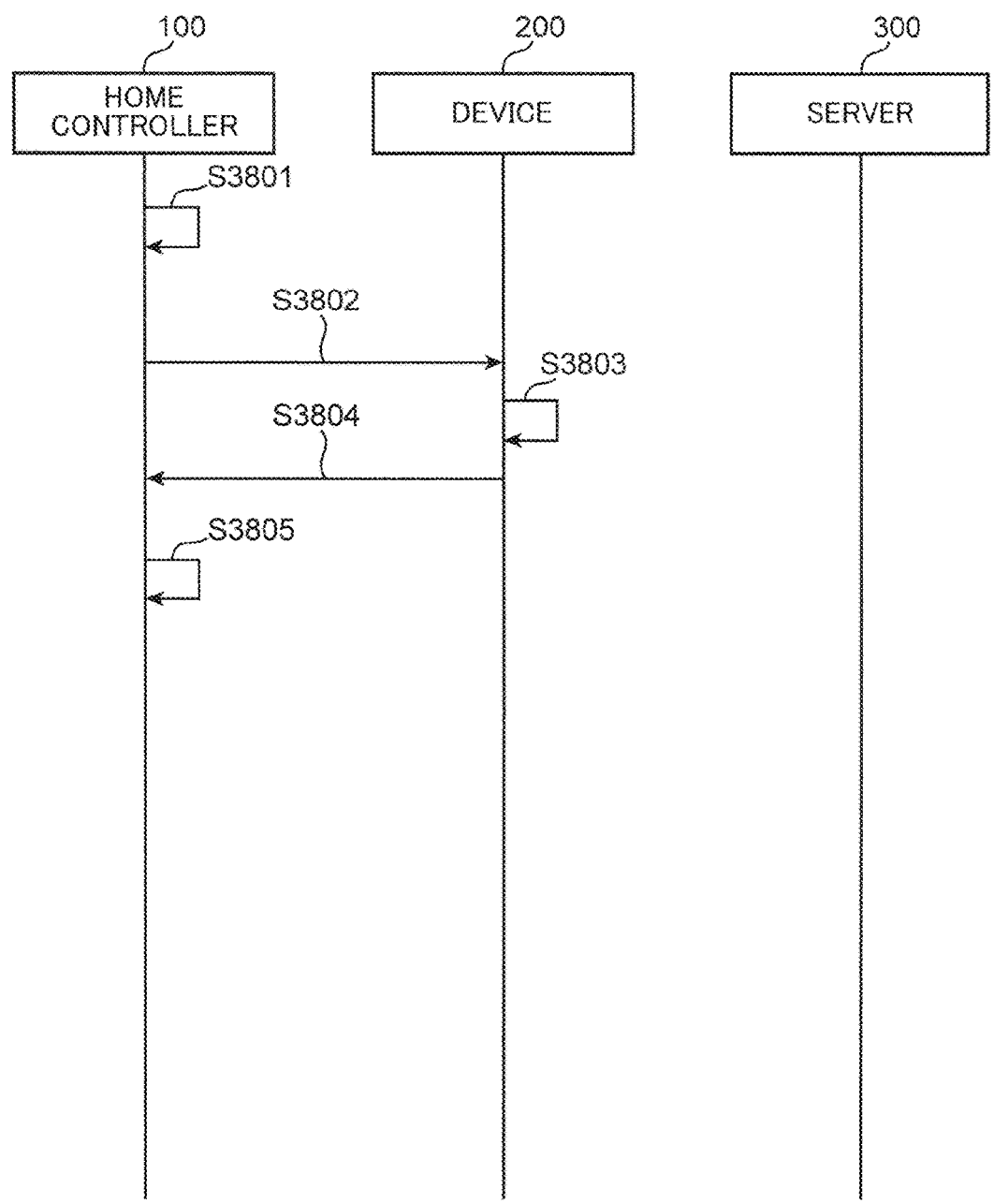
FIG. 42 is a sequence diagram showing a flow of processes by which a home controller directly controls a device.

FIG. 42 is a sequence diagram showing a flow of processes by which the home controller 100 directly controls the device 200. First, the touch panel control section 102 of the home controller 100 detects an operation of the simple control button 503 or the room screen 703 (FIG. 7 for instance), 1603 (FIG. 16 for instance), 2603 (FIG. 26 for instance) by the user (S3801). Next, the device control section 106 of the home controller 100 generates a control command corresponding to the operation by the user and transmits the control command to the device 200 (S3802).

The device 200 having received the control command executes the control command (S3803) and transmits a control result to the home controller 100 (S3804). The display control section 103 of the home controller 100 having received the control result updates the display screen according to the control result (S3805).

Figure 43:
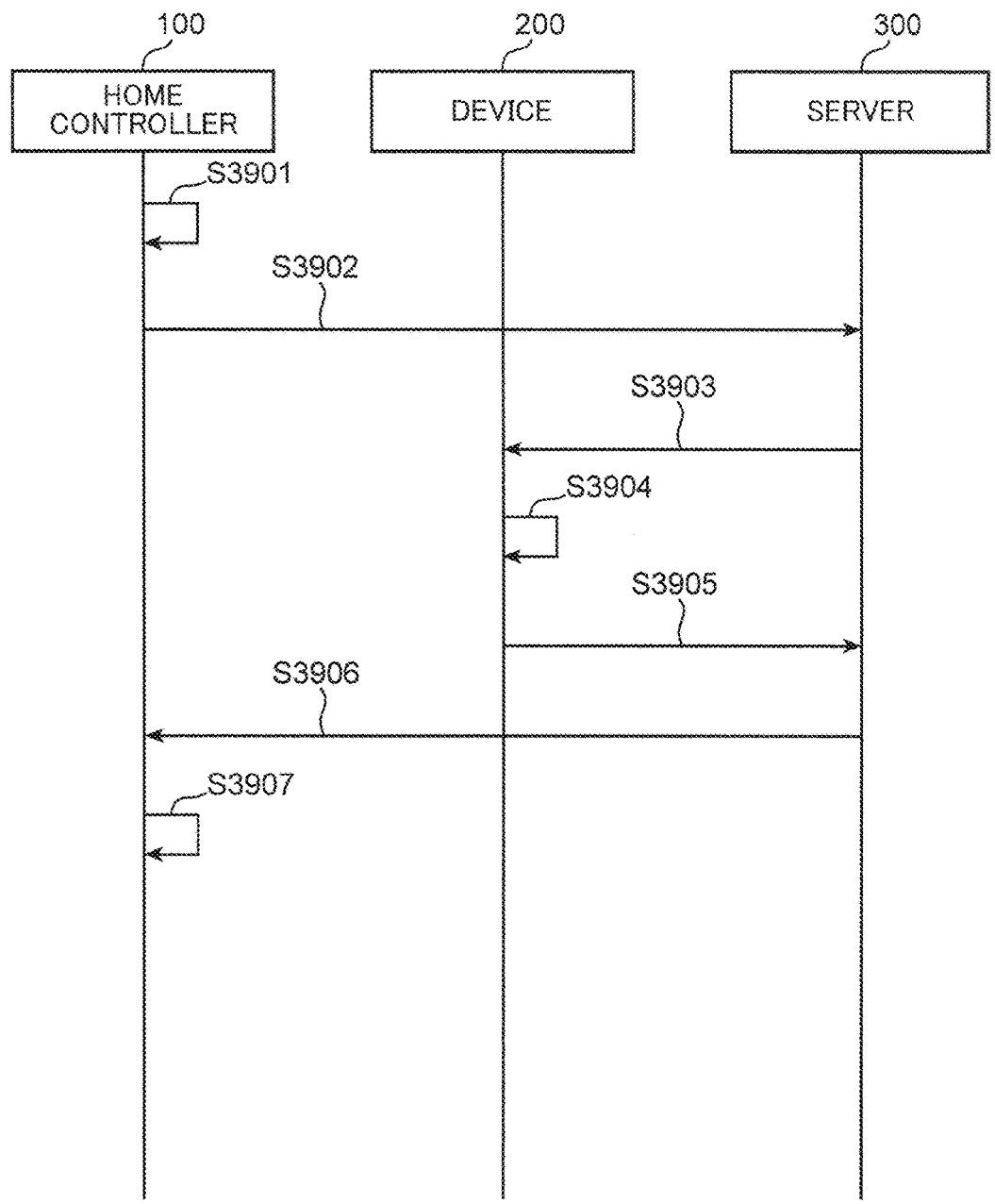
FIG. 43 is a sequence diagram showing a flow of processes by which a home controller controls a device via a server.

FIG. 43 is a sequence diagram showing a flow of processes by which the home controller 100 controls the device 200 via the server 300. First, the touch panel control section 102 of the home controller 100 detects an operation of the simple control button 503 or the room screen 703 (FIG. 7 for instance), 1603 (FIG. 16 for instance), 2603 (FIG. 26 for instance) by the user (S3901). Next, the device control section 106 of the home controller 100 generates a control command corresponding to the operation by the user and transmits the control command to the server 300 (S3902).

The server 300 having received the control command transmits the relevant control command to the device 200 (S3903). The device 200 having received the control command executes the control command (S3904) and transmits a control result to the server 300 (S3905). The server 300 having received the control result transmits the control result to the home controller 100 (S3906). The display control section 103 of the home controller 100 having received the control result updates the display screen according to the control result (S3907).

Figure 44:
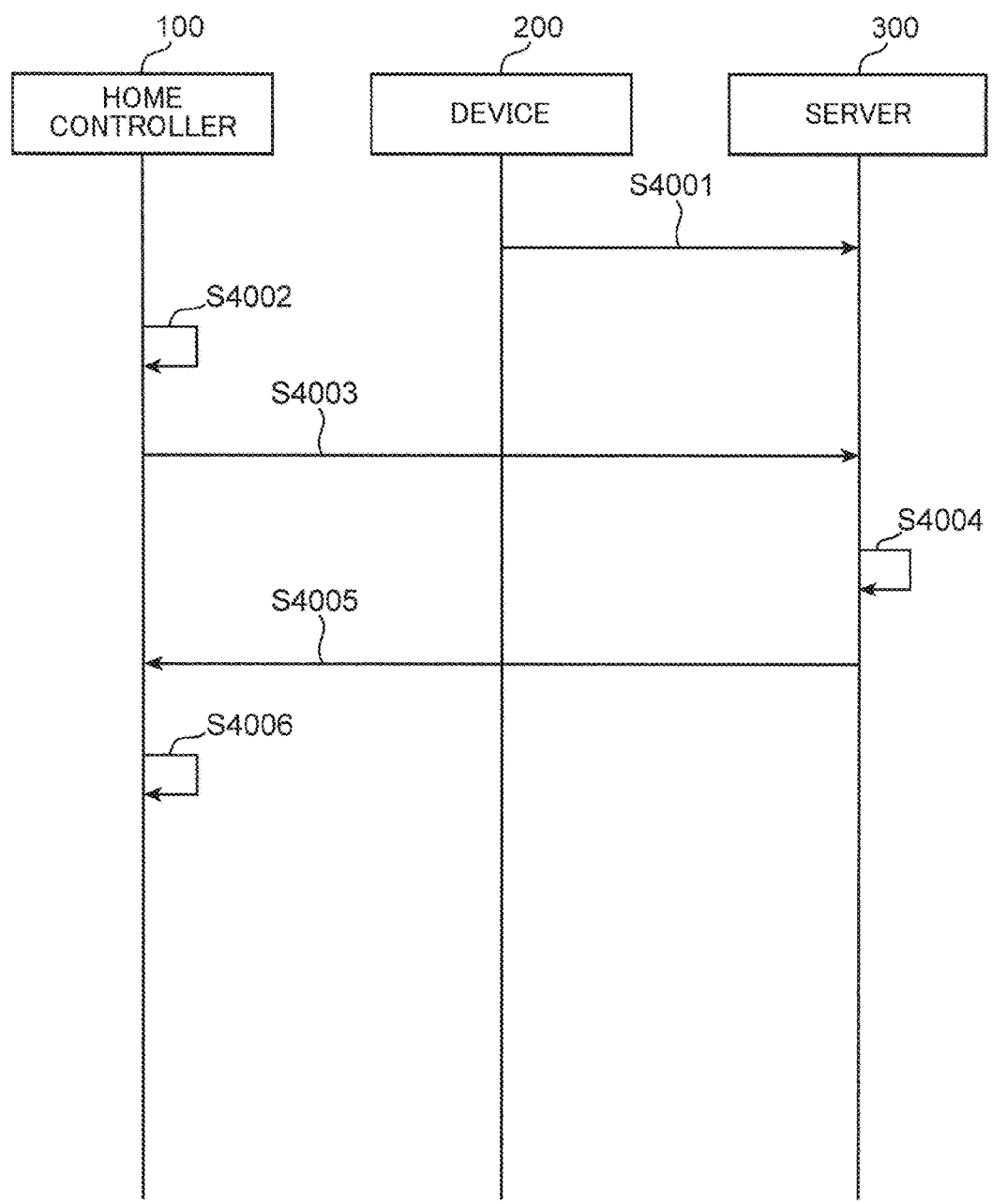
FIG. 44 is a sequence diagram showing a flow of processes by which a home controller acquires a state of a device from a server.

FIG. 44 is a sequence diagram showing a flow of processes by which the home controller 100 checks a device state of the device 200 via the server 300. First, the device 200 transmits a current device state to the server 300 (S4001). In this case, the device 200 transmits a device state to the server 300 when turned on, when turned off, when the device state changes, or periodically, and causes the server 300 to store device states. Moreover, the process of S4001 may be asynchronously executed with respect to processes of S4002 to S4006.

Next, the touch panel control section 102 of the home controller 100 detects an operation of the controller application icon 501 (FIG. 5) by the user (S4002). The device control section 106 of the home controller 100 then generates a control command corresponding to the operation by the user and transmits the control command to the server 300 (S4003). In this case, a control command for checking the device state of the device 200 is generated.

The server 300 having received the control command searches for a current device state of the relevant device 200 (S4004) and transmits the device state of the relevant device 200 as a control result to the home controller 100 (S4005). The display control section 103 of the home controller 100 having received the control result updates the display screen according to the control result (S4006). For example, when displaying the top screen 600 (FIG. 6), 1500 (FIG. 15) and the like, the display control section 103 controls brightness of the simple control button 604 in accordance with the status of the device.

Figure 45:
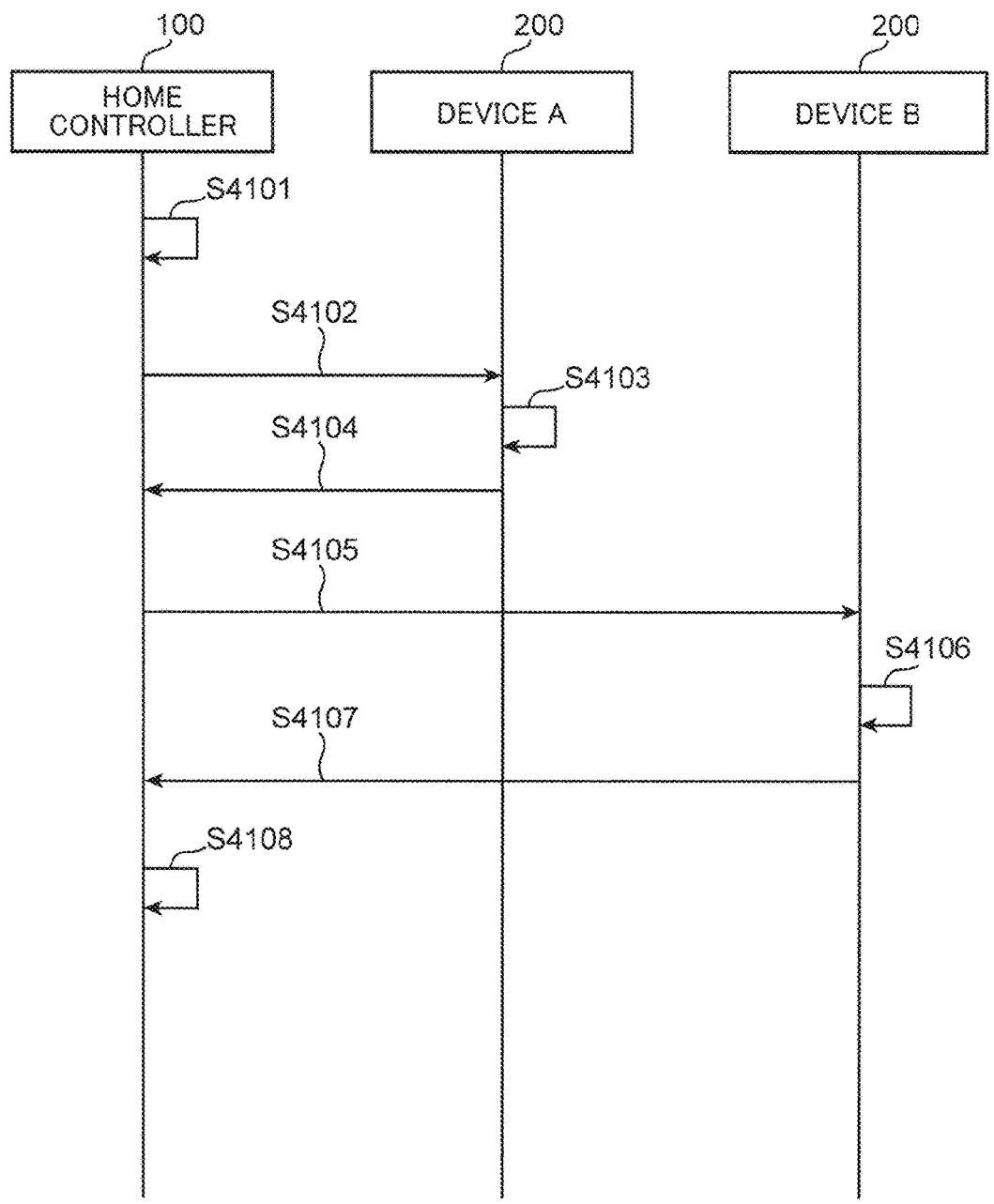
FIG. 45 is a sequence diagram showing a flow of processes by which a home controller directly controls a device in a case where the home controller controls a plurality of devices by a single operation.

FIG. 45 is a sequence diagram showing a flow of processes by which the home controller 100 directly controls the device 200 in a case where the home controller 100 controls a plurality of devices 200 by a single operation. A description will now be given using a case where the home controller 100 controls a device A 200 and a device B 200. In addition, it is assumed that the device A 200 and the device B 200 are, for instance, illumination devices which are installed in one room and which are controlled by an operation made on the simple control button 604 (FIG. 15) in the second control pattern, on the room screen 1603 (FIG. 16 for instance) in the second control pattern, or on the room screen 2603 (FIG. 26 for instance) in the third control pattern.

First, the touch panel control section 102 of the home controller 100 detects an operation of the simple control button 604, the room screen 1603, or the room screen 2603 by the user (S4101). Next, the device control section 106 of the home controller 100 generates a control command corresponding to the operation by the user and transmits the control command to the device A 200 (S4102).

The device A 200 having received the control command executes the control command (S4103) and transmits a control result to the home controller 100 (S4104).

Next, the device control section 106 of the home controller 100 transmits, to the device B 200, a same control command as the control command transmitted to the device A 200 (S4105). The device B 200 having received the control command executes the control command (S4106) and transmits a control result to the home controller 100 (S4107).

The display control section 103 of the home controller 100 having received the control result updates the display screen according to the control result (S4108). In this case, for example, the brightness of the simple control button 604, the room screen 1603, or the room screen 2603 is updated according to the control result.

Figure 46:
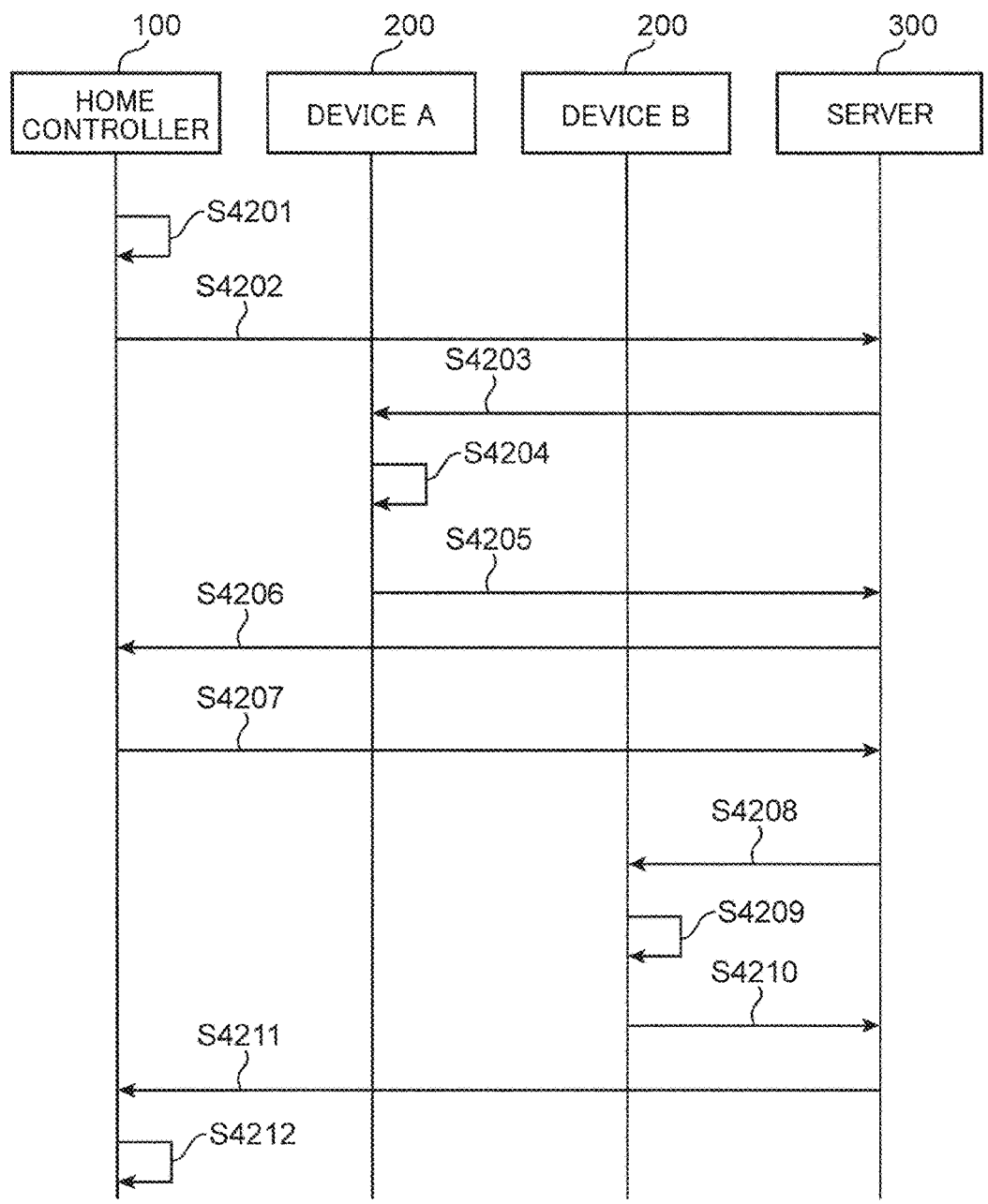
FIG. 46 is a sequence diagram showing a flow of processes by which a home controller controls a device via a server in a case where the home controller controls a plurality of devices by a single operation.

FIG. 46 is a sequence diagram showing a flow of processes by which the home controller 100 controls the device 200 via the server 300 in a case where the home controller 100 controls a plurality of devices 200 by a single operation. A description will now be given using a case where the home controller 100 controls a device A 200 and a device B 200. In addition, it is assumed that the device A 200 and the device B 200 are, for instance, illumination devices which are installed in one room and which are controlled by an operation made on the simple control button 604 (FIG. 15) in the second control pattern, on the room screen 1603 (FIG. 16 for instance) in the second control pattern, or on the room screen 2603 (FIG. 26 for instance) in the third control pattern.

First, the touch panel control section 102 of the home controller 100 detects an operation of the simple control button 604, the room screen 1603, or the room screen 2603 by the user (S4201).

Next, the device control section 106 of the home controller 100 generates a control command for the device A 200 which corresponds to the operation by the user and transmits the control command to the server 300 (S4202).

The server 300 having received the control command for the device A 200 transmits the control command to the device A 200 (S4203). The device A 200 having received the control command executes the control command (S4204) and transmits a control result to the server 300 (S4205). The server 300 having received the control result transmits the control result to the home controller 100 (S4206).

In a similar manner, the device control section 106 of the home controller 100 generates a control command for the device B 200 which corresponds to the operation by the user and transmits the control command to the server 300 (S4207).

The server 300 having received the control command transmits the control command to the device B 200 (S4208). The device B 200 having received the control command executes the control command (S4209) and transmits a control result to the server 300 (S4210). The server 300 having received the control result transmits the control result to the home controller 100 (S4211).

Subsequently, the display control section 103 of the home controller 100 updates the display screen according to the control result in the same way as S4108 in FIG. 45 (S4212).

Figure 47:
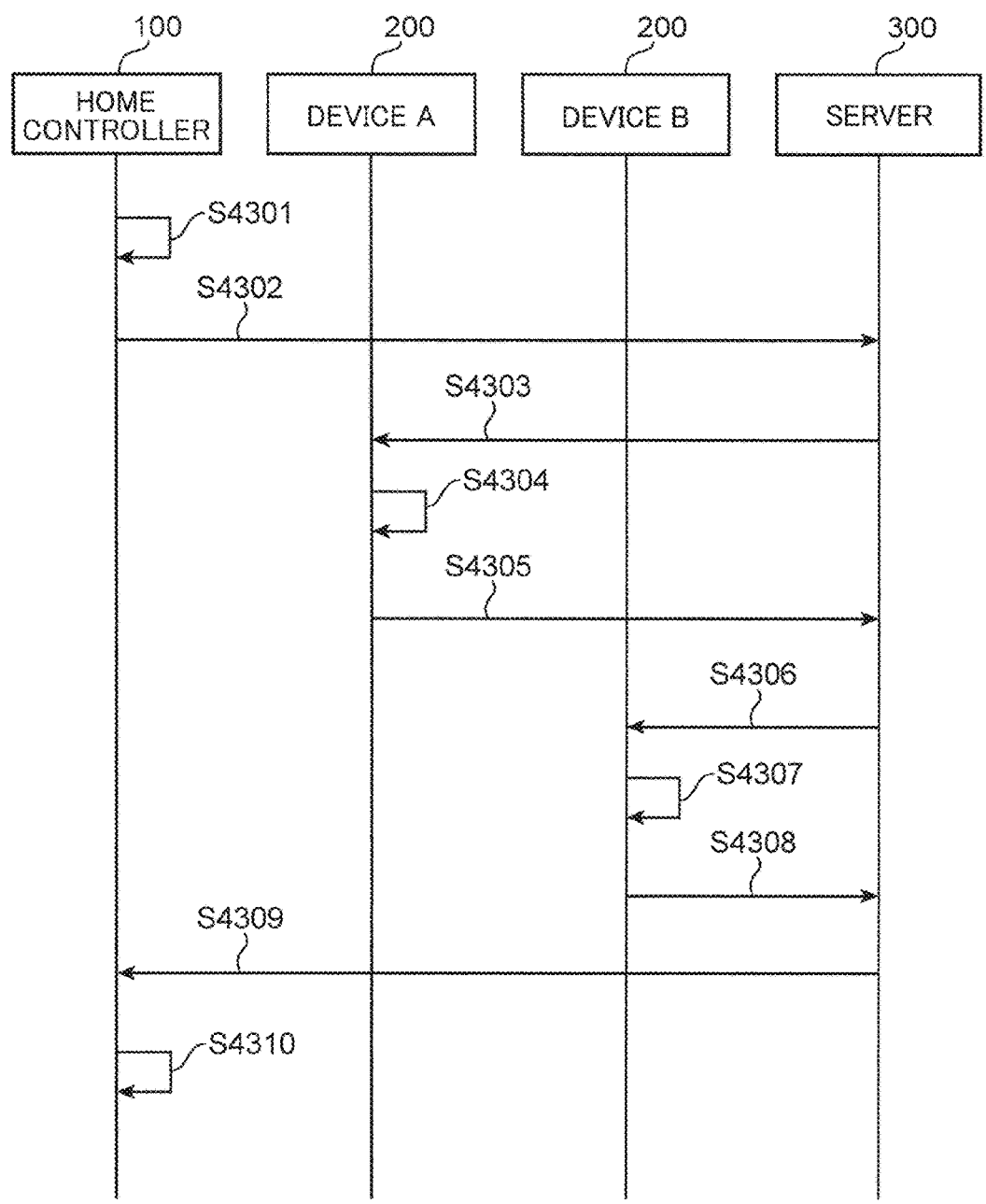
FIG. 47 is a sequence diagram showing a flow of processes by which a home controller controls a device via a server in a case where the home controller controls a plurality of devices by a single operation.

FIG. 47 is a sequence diagram showing a flow of processes by which the home controller 100 controls the device 200 via the server 300 in a case where the home controller 100 controls a plurality of devices 200 by a single operation. A description will now be given using a case where the home controller 100 controls a device A 200 and a device B 200. In addition, it is assumed that the device A 200 and the device B 200 are, for instance, illumination devices which are installed in one room and which are controlled by an operation made on the simple control button 604 (FIG. 15) in the second control pattern, on the room screen 1603 (FIG. 16 for instance) in the second control pattern, or on the room screen 2603 (FIG. 26 for instance) in the third control pattern.

First, the touch panel control section 102 of the home controller 100 detects an operation of the simple control button 604, the room screen 1603, or the room screen 2603 by the user (S4301).

Next, the device control section 106 of the home controller 100 generates a control command for the device A 200 and the device B 200 in accordance with the operation by the user and transmits the control command to the server 300 (S4302).

The server 300 having received the control command transmits the control command to the device A 200 (S4303). The device A 200 having received the control command executes the control command (S4304) and transmits a control result to the server 300 (S4305).

In a similar manner, the server 300 transmits the control command to the device B 200 (S4306). The device B 200 having received the control command executes the control command (S4307) and transmits a control result to the server 300 (S4308). The server 300 having received the control results of the device A 200 and the device B 200 transmits the control results to the home controller 100 (54309).

Subsequently, the display control section 103 of the home controller 100 updates the display screen according to the control result in the same way as S4108 in FIG. 45 (S4310).

Figure 48:
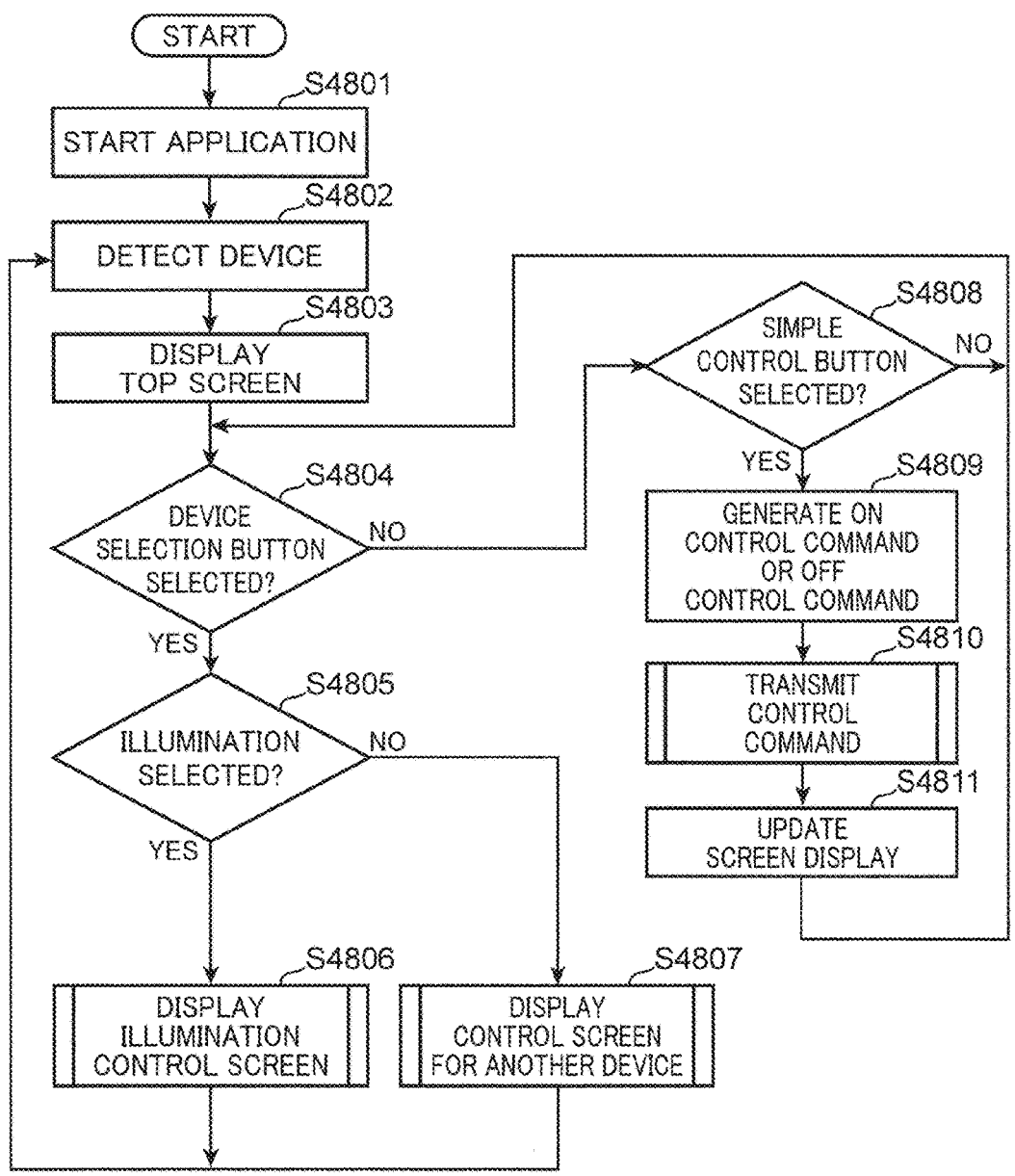
FIG. 48 is a flow chart showing an overall process of a home controller in the first control pattern.

FIG. 48 is a flow chart showing an overall process of the home controller 100. FIG. 48 shows a process of the home controller 100 according to the first control pattern described earlier with reference to FIGS. 6 to 14.

In S4801, the controller application icon 501 on the basic screen 500 (FIG. 5) of the home controller 100 is tapped to start up an application of the home control system.

In S4802, the device management section 105 of the home controller 100 detects a device 200 connected to a network through a process shown in, for example, the sequence diagrams in FIGS. 40 and 41. At this point, since device information is acquired (for example, S3304 in FIG. 40), the device management section 105 of the home controller 100 may generate the device list 3800 (FIG. 38).

In S4803, the display control section 103 displays the top screen 600 (FIG. 6) on the display 101. Using the device information acquired in S4802, the display control section 103 controls brightness of the simple control button 604 on the top screen 600 in accordance with an on/off state of power of each device.

In S4804, the touch panel control section 102 determines whether or not the device selection button 601 on the top screen 600 has been selected. If the device selection button 601 has been selected (YES in S4804), the touch panel control section 102 determines whether or not an illumination device has been selected (S4805). In S4805, a determination is made on whether or not the device name 602 of the selected device selection button 601 is "illumination".

If an illumination device has been selected (YES in S4805), in S4806, an illumination control screen display process (FIGS. 52 and 53 to be described later) is executed and the process returns to S4802. If an illumination device has not been selected (NO in S4805), in S4807, a control screen display process of another device (FIG. 54 to be described later) is executed and the process returns to S4802.

In S4804, if the device selection button 601 is not selected (NO in S4804), in S4808, the touch panel control section 102 determines whether or not the simple control button 604 on the top screen 600 has been selected. If the simple control button 604 has not been selected (NO in S4808), the process returns to S4804.

When the simple control button 604 is selected (YES in S4808), the device control section 106 generates a control command that controls a corresponding device to an on-state or an off-state (S4809). In S4810, a control command transmission process (FIG. 55 to be described later) is executed. In S4811, the display control section 103 updates a screen display based on a control result. Subsequently, the process returns to S4804.

By tapping a home button (not shown) or an end application button (not shown) displayed on the display 101 of the home controller 100, the user can end the application of the home control system shown in FIG. 48 at an arbitrary timing. This also applies to the processes shown in FIGS. 49 and 50 to be described later.

Figure 49:
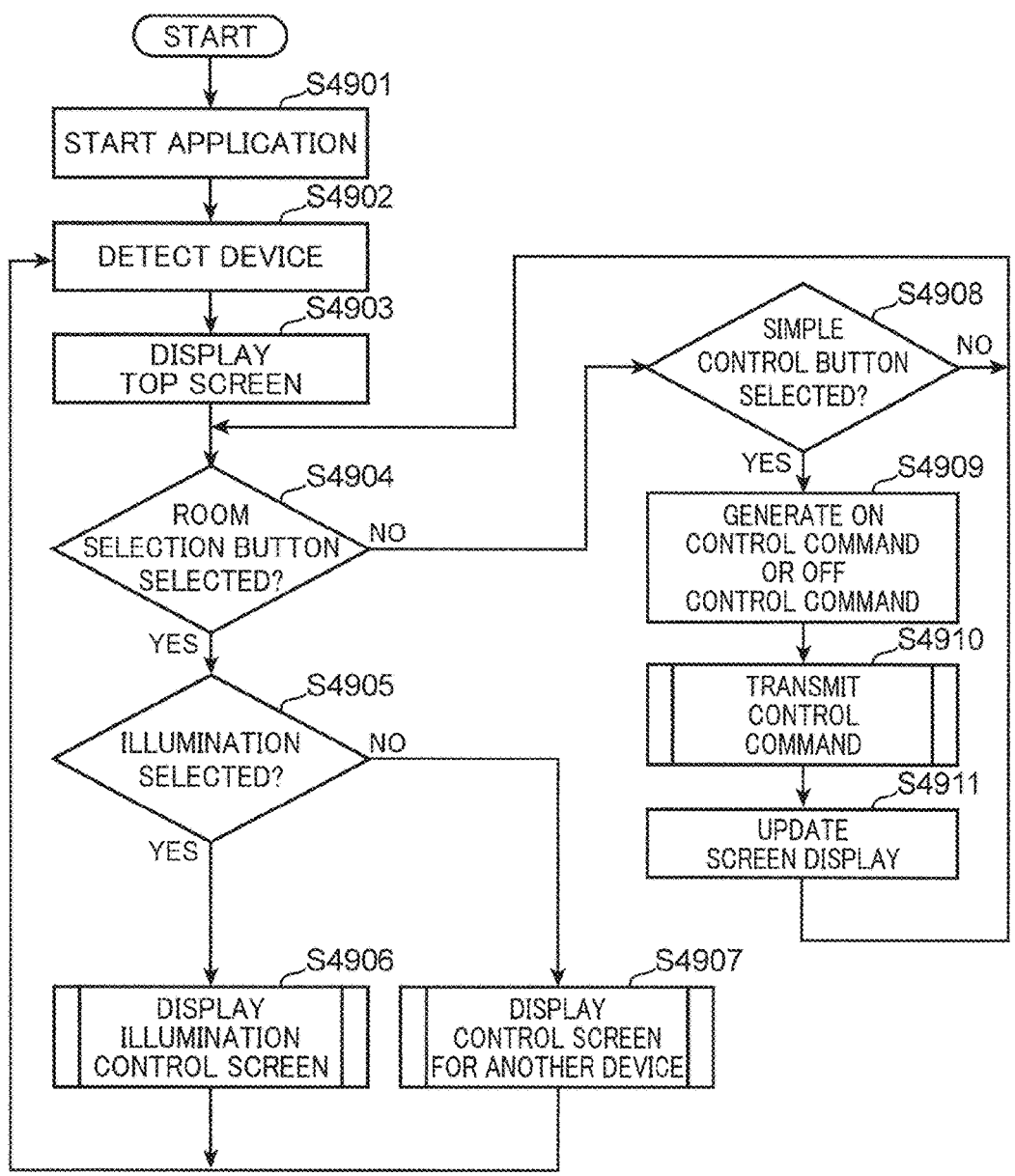
FIG. 49 is a flow chart showing an overall process of a home controller in the second control pattern.

FIG. 49 is a flow chart showing an overall process of the home controller 100. FIG. 49 shows a process of the home controller 100 according to the second control pattern described earlier with reference to FIGS. 15 to 23.

S4901 and S4902 are the same as S4801 and S4802 in FIG. 48. In S4903, the display control section 103 displays the top screen 1500 (FIG. 15) on the display 101. Using the device information acquired in S4902, the display control section 103 controls brightness of the simple control button 604 on the top screen 1500 in accordance with an on/off state of power of each device.

In S4904, the touch panel control section 102 determines whether or not the room selection button 1501 on the top screen 1500 has been selected. If the room selection button 1501 has been selected (YES in S4904), the touch panel control section 102 determines whether or not an illumination device has been selected (S4905). In other words, in S4905, a determination is made on whether or not the device name 1503 of the selected room selection button 1501 is "illumination".

Figure 52:
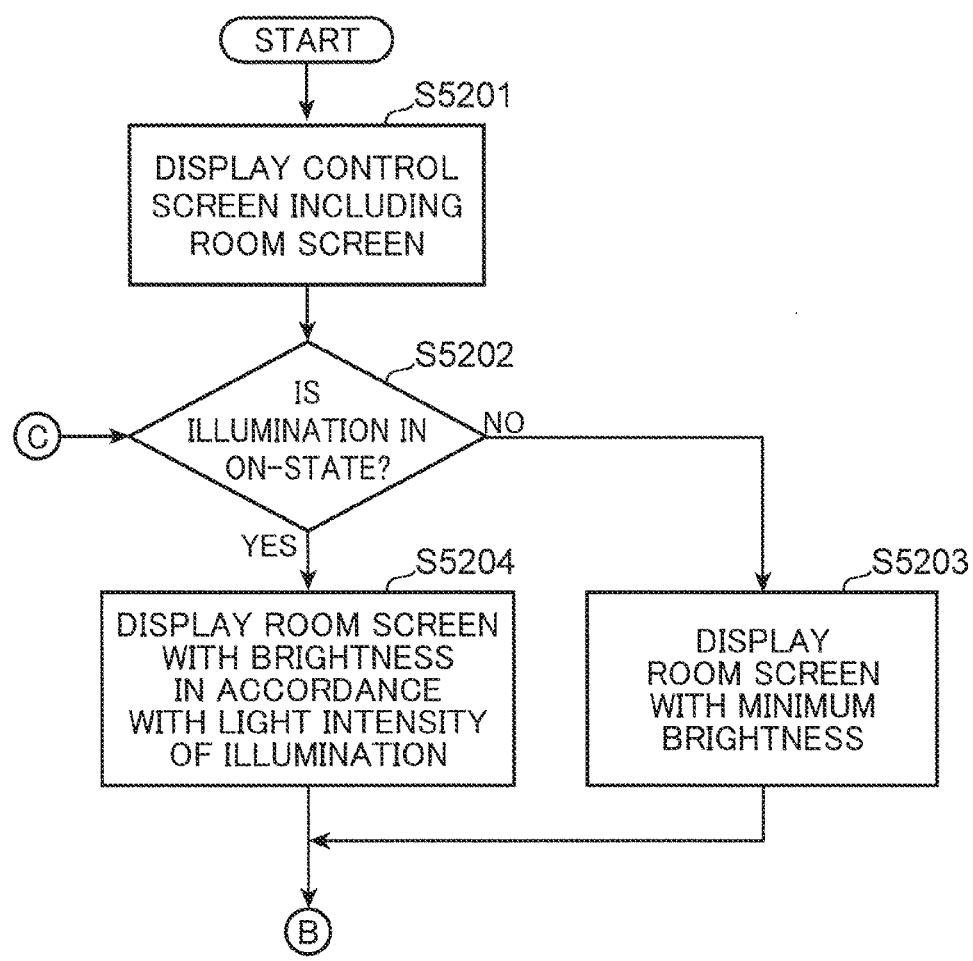
FIG. 52 is a flow chart showing an illumination control screen display process that is executed in S4806 in FIG. 48, S4906 in FIG. 49, and S5009 in FIG. 50.
Figure 53:
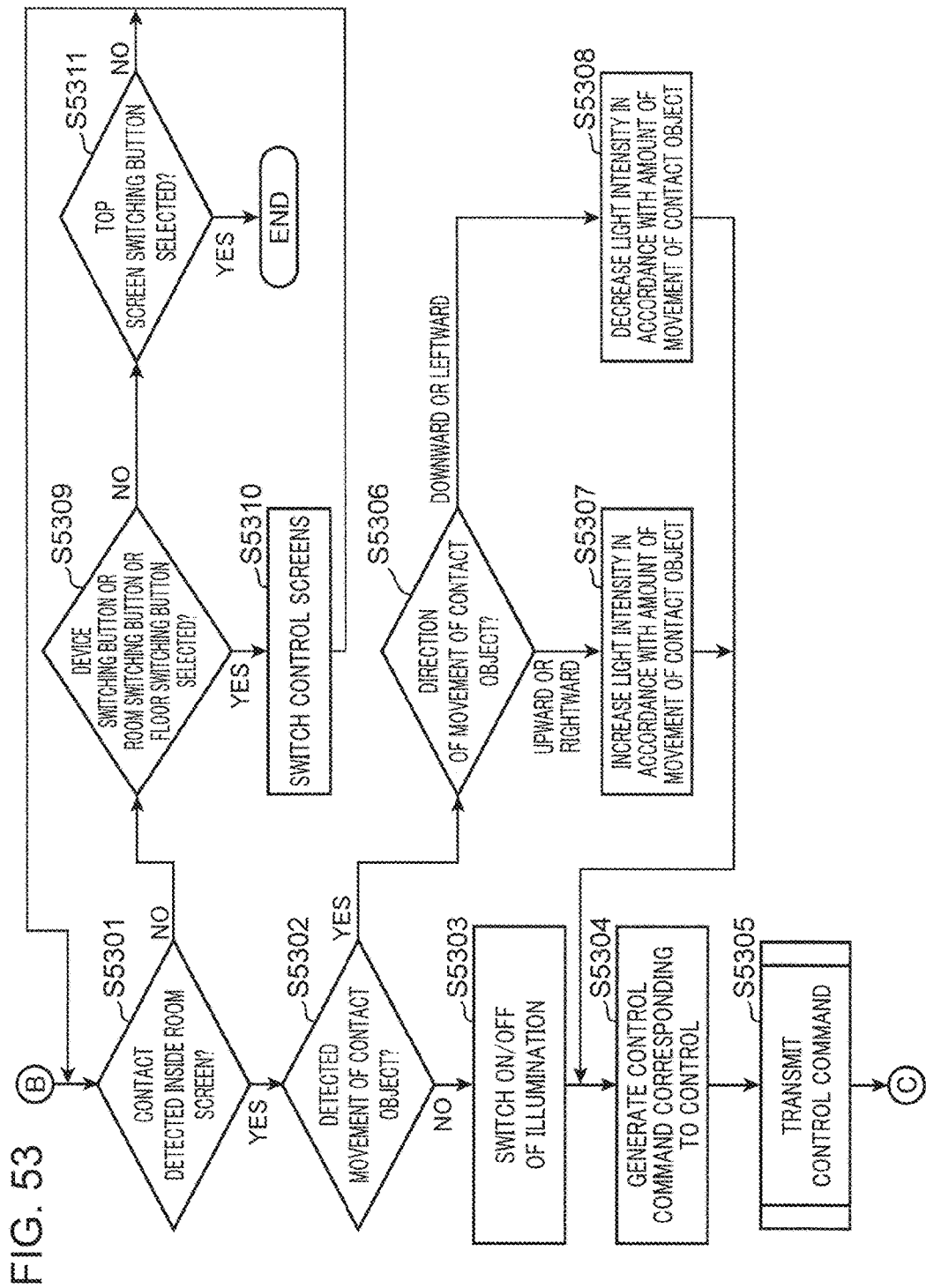
FIG. 53 is a flow chart showing an illumination control screen display process that is executed in S4806 in FIG. 48, S4906 in FIG. 49, and S5009 in FIG. 50.

If an illumination device has been selected (YES in S4905), the illumination control screen display process (S4906: FIGS. 52 and 53 to be described later) is executed and the process returns to S4902. If an illumination device has not been selected (NO in S4905), in S4907, a control screen display process of another device (FIG. 54 to be described later) is executed and the process returns to S4902.

In S4904, if the device selection button 601 is not selected (NO in S4904), in S4908, the touch panel control section 102 determines whether or not the simple control button 604 on the top screen 1500 has been selected. Subsequent steps S4909 to S4911 are the same as S4809 to S4811 in FIG. 48.

Figure 50:
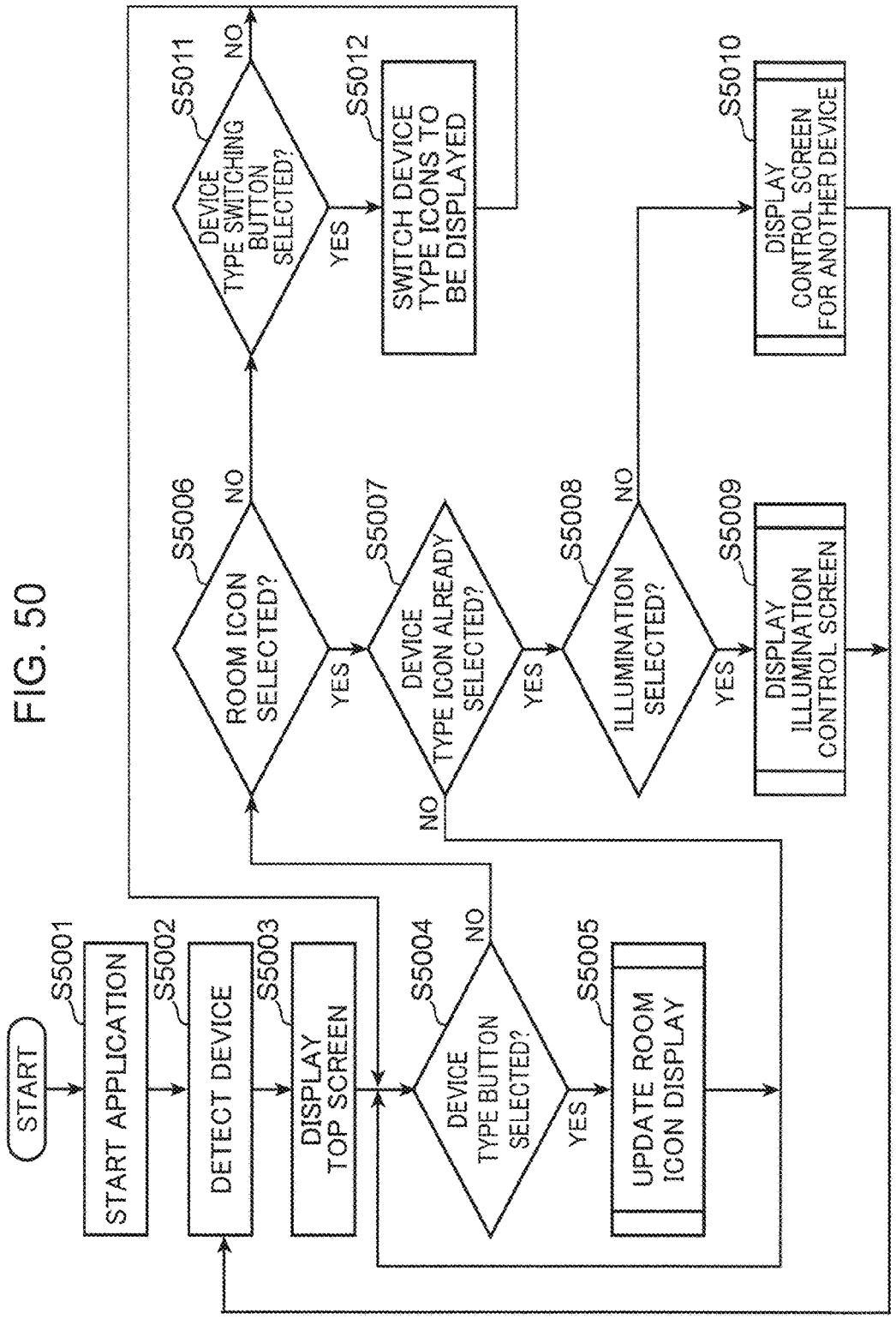
FIG. 50 is a flow chart showing an overall process of a home controller in the third control pattern.

FIG. 50 is a flow chart showing an overall process of the home controller 100. FIG. 50 shows a process of the home controller 100 according to the third control pattern described earlier with reference to FIGS. 24 to 33B.

S5001 and S5002 are the same as S4801 and S4802 in FIG. 48. In S5003, the display control section 103 displays the top screen 2400 (FIG. 24) on the display 101.

In S5004, the touch panel control section 102 determines whether or not the device type icon 2411 on the top screen 2400 has been selected. When the device type icon 2411 is selected (YES in S5004), the display control section 103 executes a room icon display update process (FIG. 51 to be described later) in S5005 and the process returns to S5004.

In S5004, if the device type icon 2411 is not selected (NO in S5004), in S5006, the touch panel control section 102 determines whether or not the room icon 2421 on the top screen 2400 has been selected. When the room icon 2421 is selected (YES in S5006), the touch panel control section 102 determines whether or not the device type icon 2411 has already been selected (S5007). If the device type icon 2411 has not been selected yet (NO in S5007), the process returns to S5004. At this point, the display control section 103 may display a message prompting the user to select the device type icon 2411.

If the device type icon 2411 has already been selected (YES in S5007), in S5008, the touch panel control section 102 determines whether or not the device type icon 2411 representing an illumination device has been selected.

If the device type icon 2411 representing an illumination device has been selected (YES in S5008), in S5009, the illumination control screen display process (FIGS. 52 and 53 to be described later) is executed and the process returns to S5002. If the device type icon 2411 representing an illumination device has not been selected (NO in S5008), in S5010, a control screen display process of another device (FIG. 54 to be described later) is executed and the process returns to S5002.

In S5006, if the room icon 2421 is not selected (NO in S5006), in S5011, the touch panel control section 102 determines whether or not the device type switching button 2412 on the top screen 2400 has been selected. If the device type switching button 2412 has been selected (YES in S5011), the display control section 103 switches device type icons 2411 to be displayed in the device selection region 2410. If the device type switching button 2412 has not been selected (NO in S5011), the process returns to S5004.

Figure 51:
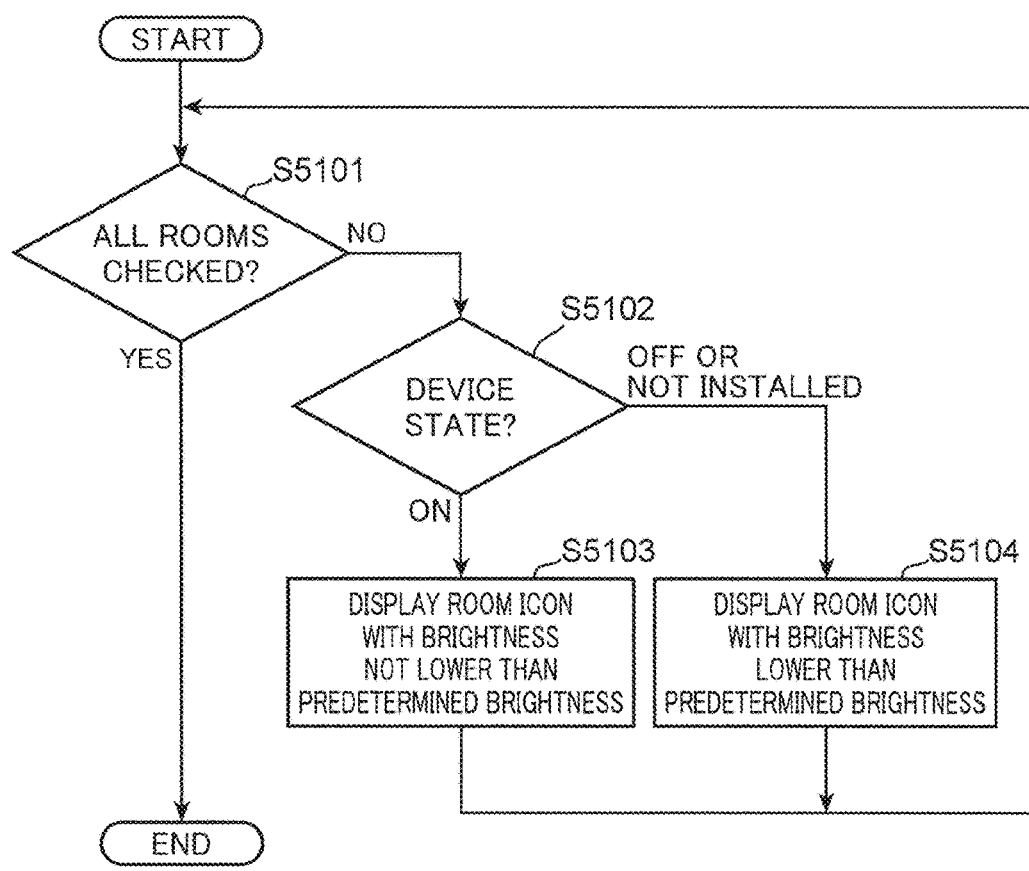
FIG. 51 is a flow chart showing a room icon display update process that is executed in S5005 in FIG. 50.

FIG. 51 is a flow chart showing a room icon display update process that is executed in S5005 in FIG. 50.

In S5101, the display control section 103 determines whether or not rooms corresponding to all room icons 2421 displayed on the top screen 2400 (FIG. 24) have been checked. If the rooms corresponding to all of the room icons 2421 have been checked (YES in S5101), the display control section 103 ends the process shown in FIG. 51.

If the rooms corresponding to all of the room icons 2421 have not been checked (NO in S5101), in S5102, the display control section 103 determines a state of a device which is represented by the device type icon 2411 selected in S5004 in FIG. 50 and which is installed in a room corresponding to one room icon 2421. At this point, when a plurality of devices are installed in the room of concern, the display control section 103 determines the states of all of the devices.

When power of at least one device installed in the room of concern is turned on (ON in S5102), in S5103, the display control section 103 displays the room icon 2421 with brightness not lower than predetermined brightness. On the other hand, when power of all of the devices installed in the room of concern is turned off or when no devices are installed in the room of concern (OFF or NOT INSTALLED in S5102), in S5104, the display control section 103 displays the room icon 2421 with brightness lower than the predetermined brightness.

Due to the process shown in FIG. 51, the display control section 103 displays the top screen 2400 shown in FIG. 25 on the display 101 of the home controller 100. In the example shown in FIG. 25, in S5103, the display control section 103 displays the room icon 2421 with brightness equal to the predetermined brightness (initial brightness).

In S5102, the display control section 103 may acquire a current state from the device 200 to perform the determination of S5102. Alternatively, in S5102, the display control section 103 may perform the determination of S5102 using the state of the device 200 acquired in S5002 in FIG. 50.

FIGS. 52 and 53 are flow charts showing an illumination control screen display process that is executed in S4806 in FIG. 48, S4906 in FIG. 49, and S5009 in FIG. 50.

In S5201, the display control section 103 displays a control screen including a room screen representing a room in which an illumination device is installed on the display 101. In the case of the process of S4806 in FIG. 48, the display control section 103 displays the control screen 700 (for example, FIG. 7) including the room screen 703 on the display 101. In the case of the process of S4906 in FIG. 49, the display control section 103 displays the control screen 1600 (for example, FIG. 16) including the room screen 1603 on the display 101. In the case of the process of S5009 in FIG. 50, the display control section 103 displays the control screen 2600 (for example, FIG. 26) including the room screen 2603 on the display 101.

In S5202, the display control section 103 acquires device information from the illumination device installed in the room represented by the room screen and determines whether or not power of the illumination device is in an on-state. If the power of the illumination device is in an off-state (NO in S5202), in S5203, the display control section 103 displays the room screen at minimum brightness set in advance.

On the other hand, if the power of the illumination device is in an on-state (YES in S5202), in S5204, the display control section 103 displays the room screen with brightness in accordance with a light quantity of the illumination device. If the illumination device is in an on-state and the light quantity thereof is set to 100%, the display control section 103 displays the room screen at maximum brightness (to be described later) set in advance. If the illumination device is in an on-state and the light quantity thereof is set lower than 100%, the display control section 103 displays the room screen with brightness between the maximum brightness and the minimum brightness in accordance with the light quantity of the illumination device.

In the case of the processes of S4906 in FIG. 49 and S5009 in FIG. 50, the display control section 103 makes a determination of NO in S5202 if power of all illumination devices is in an off-state and makes a determination of YES in S5202 if power of at least one illumination device is in an on-state.

In S5301, the touch panel control section 102 determines whether a contact made by the contact object 1100 has been detected inside a region of the room screen. When a contact made by the contact object 1100 is detected (YES in S5301), in S5302, the touch panel control section 102 determines whether or not the contact made by the contact object 1100 has continued and a movement of the contact object 1100 has been detected.

Figure 55:
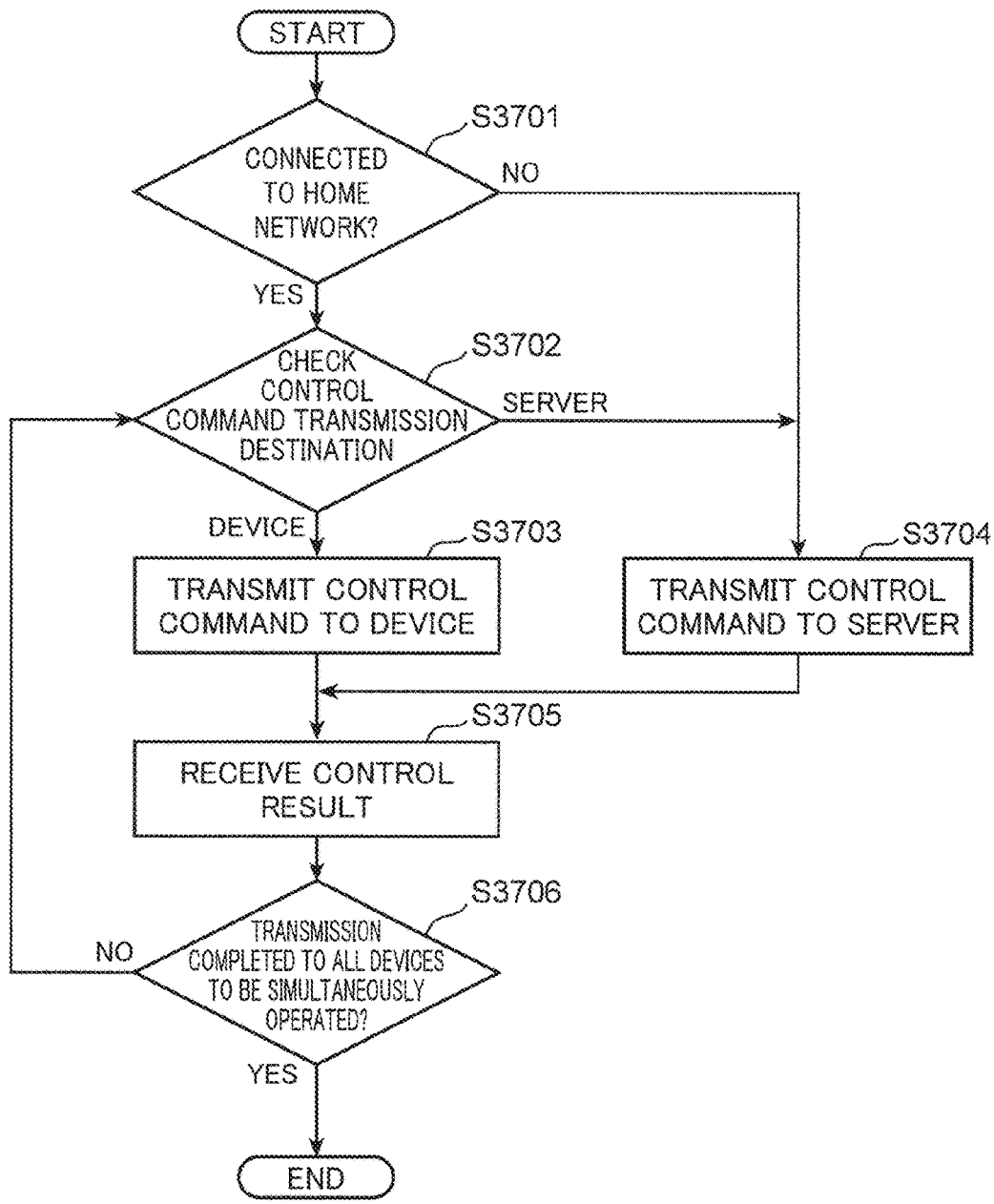
FIG. 55 is a flow chart showing a control command transmission process that is executed in S5305 in FIG. 53 and S5404 in FIG. 54.

A failure to detect a movement of the contact object 1100 (NO in S5302) means that tapping by the contact object 1100 has been detected. Therefore, in S5303, the device control section 106 decides on a control for switching between on and off states of an illumination device. In S5304, the device control section 106 generates a control command corresponding to the decided control. In S5305, the communication control section 107 executes a control command transmission process (FIG. 55 to be described later). Subsequently, the process returns to S5202. In S5202 to S5204, the display control section 103 changes the brightness of the room screen in accordance with a control result.

In S5302, when the touch panel control section 102 detects a movement of the contact object 1100 (YES in S5302), the touch panel control section 102 calculates an amount of movement of the contact object 1100 from a detection point resulting from a previously performed S5302. In S5306, the touch panel control section 102 determines a direction of movement of the contact object 1100. If the direction of movement of the contact object 1100 is upward or rightward in S5306, in S5307, the device control section 106 decides on control for increasing a light quantity of the illumination device in accordance with the amount of movement of the contact object 1100 and the process advances to S5304. If the direction of movement of the contact object 1100 is downward or leftward in S5306, in S5308, the device control section 106 decides on control for decreasing a light quantity of the illumination device in accordance with the amount of movement of the contact object 1100 and the process advances to S5304.

In S5301, if a contact made by the contact object 1100 is not detected inside the region of the room screen (NO in S5301), in S5309, the touch panel control section 102 determines whether or not the device switching button or the room switching button or the floor switching button has been selected.

When the device switching button or the room switching button or the floor switching button has been selected (YES in S5309), the display control section 103 switches control screens to be displayed in S5310. Subsequently, the process returns to S5301.

In S5309, when the right-side device switching button 704 is selected as shown in, for example, the upper left diagram in FIG. 14, in S5310, the display control section 103 switches the control screen to be displayed from the control screen 700 (upper left diagram in FIG. 14) to the control screen 1400 (upper right diagram in FIG. 14).

In S5309, when the right-side room switching button 1604 is selected as shown in, for example, the upper left diagram in FIG. 23, in S5310, the display control section 103 switches the control screen to be displayed from the control screen 1600 (upper left diagram in FIG. 23) to the control screen 2200 (upper right diagram in FIG. 23).

In S5309, when the upper floor switching button 2605 is selected as shown in, for example, the upper diagram in FIG. 33B, in S5310, the display control section 103 switches the control screen to be displayed from the control screen 2600 (upper diagram in FIG. 33B) to the control screen 2800 (lower diagram in FIG. 33B).

In S5309, when none of the device switching button, the room switching button, and the floor switching button has been selected (NO in S5309), in S5311, the touch panel control section 102 determines whether or not the top screen switching button 702 or 1602 or 2602 has been selected. In S5311, if the top screen switching button 702 or 1602 or 2602 is not selected (NO in S5311), the process returns to S5301.

In S5311, if the top screen switching button 702 or 1602 or 2602 is selected (YES in S5311), the processes shown in FIGS. 52 and 53 are ended.

The "minimum brightness" as used in S5203 in FIG. 52 is set in advance to brightness that is lower than the predetermined brightness (the initial brightness or, in other words, the brightness of regions other than the room screen). The "maximum brightness" as used in S5204 in FIG. 52 is set in advance to brightness that is equal to the predetermined brightness (the initial brightness or, in other words, the brightness of regions other than the room screen).

In S5306 in FIG. 53, "upward" refers a direction of movement of the contact object in which an upward component is greater than a leftward component and a rightward component. "Downward" refers a direction of movement of the contact object in which a downward component is greater than a leftward component and a rightward component. "Rightward" refers a direction of movement of the contact object in which a rightward component is greater than an upward component and a downward component. "Leftward" refers a direction of movement of the contact object in which a leftward component is greater than an upward component and a downward component.

The processes shown in FIGS. 52 and 53 are executed at a cycle of, for example, 10 msec. In other words, in S5302 in FIG. 53, the touch panel control section 102 calculates the amount of movement of the contact object 1100 at intervals of 10 msec. In S5305 in FIG. 53, the device control section 106 transmits a control command to an illumination device at intervals of 10 msec. In S5204 in FIG. 52, the display control section 103 controls brightness of a room screen at intervals of 10 msec.

As a result, as shown in, for example, FIG. 34, screen transitions C3401, C3402, and C3403 of display screens are performed smoothly. Moreover, the cycle of processes is not limited to 10 msec. Any cycle may be adopted as long as a screen transition of display screens and dimmer control of an illumination device are performed smoothly.

Figure 54:
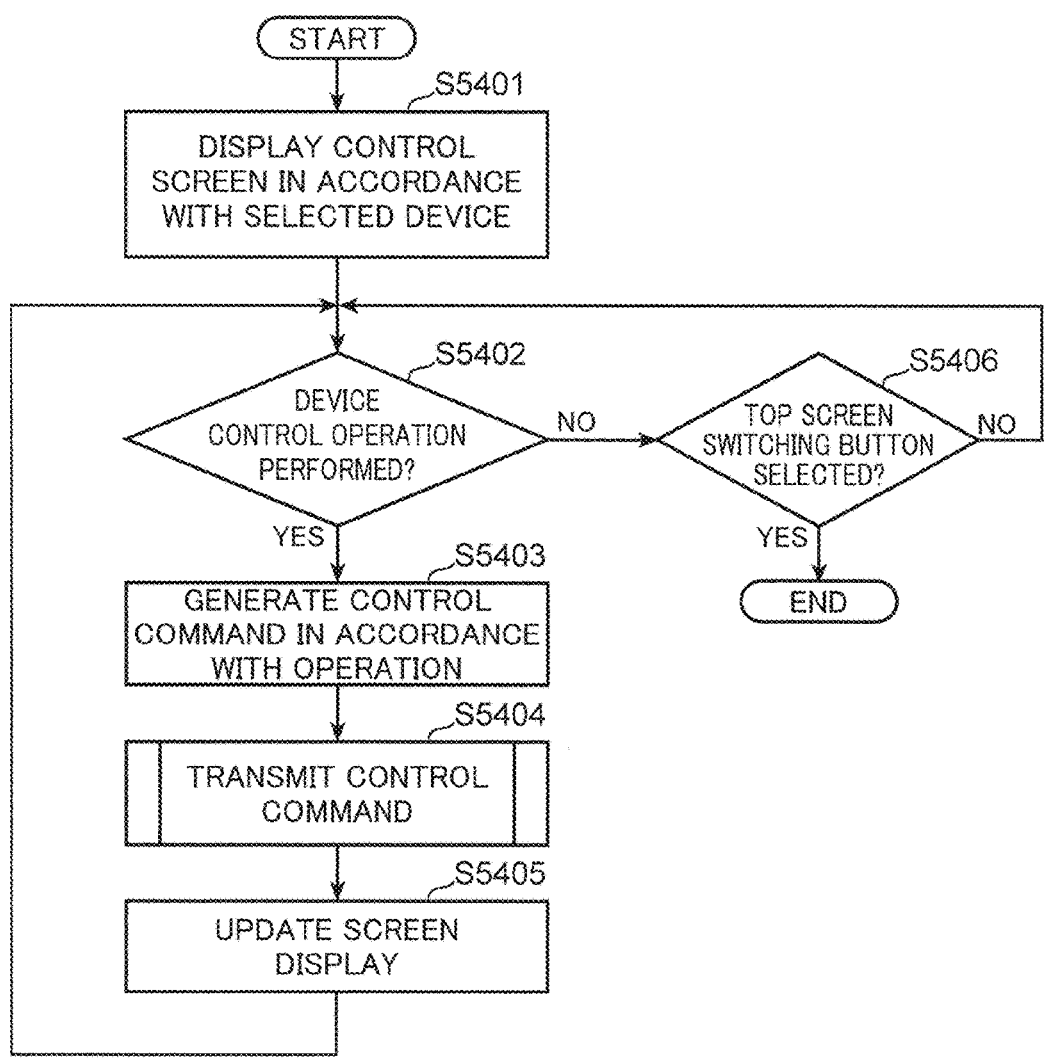
FIG. 54 is a flow chart showing a control screen display process of another device that is executed in S4807 in FIG. 48, S4907 in FIG. 49, and S5010 in FIG. 50.

FIG. 54 is a flow chart showing a control screen display process of another device that is executed in S4807 in FIG. 48, S4907 in FIG. 49, and S5010 in FIG. 50.

In S5401, the display control section 103 displays a control screen in accordance with a selected device on the display 101. For example, if the device is an air conditioner, the display control section 103 displays a control screen capable of setting a mode, a temperature, an air direction, and an air flow.

In S5402, the touch panel control section 102 determines whether or not an operation for controlling the device has been performed with respect to the control screen. When an operation for controlling the device has been performed with respect to the control screen (YES in S5402), in S5403, the device control section 106 generates a control command in accordance with the operation. In S5404, the communication control section 107 executes a control command transmission process (FIG. 55 to be described later). In S5405, the display control section 103 updates a screen display in accordance with a control result. Subsequently, the process returns to S5402.

In S5402, when an operation for controlling the device is not performed with respect to the control screen (NO in S5402), the touch panel control section 102 determines whether or not the top screen switching button 702 or 1602 or 2602 has been selected in S5406.

If the top screen switching button 702 or 1602 or 2602 is not selected (NO in S5406), the process returns to S5402. In S5406, if the top screen switching button 702 or 1602 or 2602 is selected (YES in S5406), the process shown in FIG. 54 is ended.

FIG. 55 is a flow chart showing the control command transmission process that is executed in S5305 in FIG. 53 and in S5404 in FIG. 54. First, the device control section 106 determines whether or not the home controller 100 is connected to a home network (S3701). If the home controller 100 is connected to the home network (YES in S3701), the device control section 106 checks a transmission destination of a control command according to contents of the control command transmission destination 3806 in the device list 3800 shown in FIG. 38 (S3702).

In this case, a home network refers to a network in the home of the user. Therefore, if the user is operating the home controller 100 from outside of the home, a determination of NO is made in S3701, and if the user is operating the home controller 100 from inside the home, a determination of YES is made in S3701.

In S3702, if the transmission destination of the control command is a "device", the device control section 106 transmits the control command to the relevant device 200 (S3703). On the other hand, in S3702, if the transmission destination of the control command is a "server", the device control section 106 transmits the control command to the server 300 (S3704).

For example, in the device list 3800 (FIG. 38), since the control command transmission destination 3806 for an illumination device is "device", the device control section 106 transmits the control command to the illumination device. On the other hand, in the device list 3800, since the control command transmission destination 3806 for an air conditioner is "server", the device control section 106 transmits the control command to the server 300. In addition, even when it is determined in S3701 that the home controller 100 is not connected to the home network (NO in S3701), the process of S3704 is performed. In other words, when the home controller 100 is outside of home, the device 200 is controlled via the server 300.

In S3705, the device control section 106 receives a control result from the device 200 or the server 300. Next, when transmission of the control command has been completed to all of the devices 200 to be simultaneously operated (YES in S3706), the process of FIG. 55 is ended. On the other hand, when transmission of the control command has not been completed to all of the devices 200 to be simultaneously operated (NO in S3706), the device control section 106 returns to the process of S3702 and repeats the processes of S3702 and thereafter.

For example, when two illumination devices are installed in a same room and the two illumination devices are simultaneously operated as in the above second control pattern or the third control pattern, the device control section 106 transmits the control command to each of the two illumination devices as shown in FIGS. 45 to 47 for example. Moreover, a determination of NO is not made in S3706 for a device 200 that is not operated at the same time as other devices 200.

INDUSTRIAL APPLICABILITY

The present disclosure is useful as a control method and a program for controlling one or more illumination devices connected to a network.

What is claimed is:

1. A method for controlling an information apparatus having a display and being connected to a network, one or more target devices being controlled over the network,
the method causing a computer of the information apparatus to:
display, on the display, a display image, which specifies a plurality of illumination devices in room units;
in response to detecting a selection of an illumination device, of the plurality of illumination devices, in a first room unit on the display image, display, on the display, a first room screen including a first room corresponding to the first room unit in which the selection of the illumination device is detected, the first room being displayed with first brightness not lower than second brightness of a background image when a first illumination device arranged in the first room is in an on-state, the first room screen including the first room and not including a room other than the first room;
in response to detecting a selection of the illumination device in the first room unit on the display image, display, on the display, the first room screen including the first room being displayed with third brightness lower than the second brightness of the background image when the first illumination device arranged in the first room is in an off-state;
output, to the network, a first control command for turning off power of the first illumination device arranged in the first room, when selection within the first room in the first room screen is detected while the first room screen including the first room with the first brightness not lower than the second brightness of the background image is being displayed on the display; and
output, to the network, a second control command for turning on power of the first illumination device arranged in the first room, when selection within the first room in the first room screen is detected while the first room screen including the first room with the third brightness lower than the second brightness of the background image is being displayed on the display.

2. The method according to claim 1, further causing the computer of the information apparatus to:
in response to detecting a selection of an illumination device, of the plurality of illumination devices, in a second room unit on the display image, display, on the display, a second room screen including a second room corresponding to the second room unit in which the selection of the illumination device is detected, the second room being displayed with the first brightness not lower than the second brightness of the background image when a second illumination device arranged in the second room is in an on-state, the second room screen including the second room and not including a room other than the second room;
in response to detecting a selection of the illumination device in the second room unit on the display image, display, on the display, the second room screen including the second room being displayed with the third brightness lower than the second brightness of the background image when the second illumination device arranged in the second room is in an off-state;
output, to the network, a third control command for turning off power of the second illumination device arranged in the second room, when selection within the second room in the second room screen is detected while the second room screen including the second room with the first brightness not lower than the second brightness of the background image is being displayed on the display; and
output, to the network, a fourth control command for turning on power of the second illumination device arranged in the second room, when selection within the second room in the second room screen is detected while the second room screen including the second room with the third brightness lower than the second brightness of the background image is being displayed on the display.

3. The method according to claim 1, wherein
when two or more illumination devices are arranged in the first room, the first control command is used to turn off power of the two or more illumination devices, and the second control command is used to turn on power of the two or more illumination devices.

4. The method according to claim 1, wherein
the display comprises a touch panel display.

5. The method according to claim 1, wherein
the display comprises a touch panel display, and
the method further causes the computer of the information apparatus to:
output, to the network, a fifth control command when a contact with the display is detected on the first room screen and when it is detected that the contact with the display moves on the first room screen, the fifth control command changing a light quantity of the first illumination device arranged in the first room in accordance with an amount of movement of the contact with the display.

6. The method according to claim 5, wherein the fifth control command changes the light quantity of the first illumination device more as the amount of the movement increases.

7. The method according to claim 1, wherein the display comprises a touch panel display, and the method further causes the computer of the information apparatus to:

output, to the network, a sixth control command when a contact with the display is detected on the first room screen and when it is detected that the contact with the display moves on the first room screen, the sixth control command changing a light quantity of the first illumination device arranged in the first room in accordance with a direction of movement of the contact with the display.

8. The method according to claim 7, wherein the sixth control command increases the light quantity of the first illumination device arranged in the first room when the direction of the movement is upward on the first room screen, and decreases the light quantity of the first illumination device arranged in the first room when the direction of the movement is downward on the first room screen.

9. The method according to claim 2, wherein the first room screen displayed on the display includes the first room with brightness equal to the second brightness of the background image when the first illumination device arranged in the first room is in an on-state, and the second room screen displayed on the display includes the second room with brightness equal to the second brightness of the background image when the second illumination device arranged in the second room is in an on-state.

10. A non-transitory computer-readable recording medium which stores a program to be executed by an information apparatus having a display and being connected to a network, one or more target devices being controlled over the network, the program causing a computer of the information apparatus to:

display, on the display, a display image, which specifies a plurality of illumination devices in room units;

in response to detecting a selection of an illumination device, of the plurality of illumination devices, in a first room unit on the display image, display, on the display, a first room screen including a first room corresponding to the first room unit in which the selection of the illumination device is detected, the first room being displayed with first brightness not lower than second brightness of a background image when a first illumination device arranged in the first room is in an on-state, the first room screen including the first room and not including a room other than the first room;

in response to detecting a selection of the illumination device in the first room unit on the display image, display, on the display, the first room screen including the first room being displayed with third brightness lower than the second brightness of the background image when the first illumination device arranged in the first room is in an off-state;

output, to the network, a first control command for turning off power of the first illumination device arranged in the first room, when selection within the first room in the first room screen is detected while the first room screen including the first room with the first brightness not lower than the second brightness of the background image is being displayed on the display; and output, to the network, a second control command for turning on power of the first illumination device arranged in the first room, when selection within the first room in the first room screen is detected while the first room including the first room with the third brightness lower than the second brightness of the background image is being displayed on the display.

* * * * *